US011525840B2

(12) United States Patent
Shinder et al.

(10) Patent No.: US 11,525,840 B2
(45) Date of Patent: Dec. 13, 2022

(54) NON-NULLING GAS VELOCITY MEASUREMENT APPARATUS AND PERFORMING NON-NULLING MEASUREMENT OF GAS VELOCITY PARAMETERS

(71) Applicant: Government of the United States of America, as represented by the Secretary of Commerce, Gaithersburg, MD (US)

(72) Inventors: Iosif Isaakovich Shinder, Gaithersburg, MD (US); Aaron Nathaniel Johnson, Gaithersburg, MD (US); Bernard James Filla, Nederland, CO (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 56 days.

(21) Appl. No.: 17/231,468

(22) Filed: Apr. 15, 2021

(65) Prior Publication Data

US 2021/0325421 A1    Oct. 21, 2021

Related U.S. Application Data

(60) Provisional application No. 63/011,004, filed on Apr. 16, 2020.

(51) Int. Cl.
*G01P 5/16* (2006.01)
*G01P 5/165* (2006.01)
(Continued)

(52) U.S. Cl.
CPC .............. *G01P 5/16* (2013.01); *G01F 1/34* (2013.01); *G01F 1/46* (2013.01); *G01P 5/165* (2013.01)

(58) Field of Classification Search
USPC .......................................... 702/50
See application file for complete search history.

(56) References Cited

U.S. PATENT DOCUMENTS 3,318,146 A    5/1967  De Leo et al.
5,423,209 A    6/1995  Nakaya et al.
(Continued)

OTHER PUBLICATIONS

U.S. EPA, "Preliminary Test Method 007 for the Determination of Cyclonic Flow Velocity Components Using a Calculation Approach to Method 2F", doi: https://www3.epa.gov/ttnemc01/prelim/pre-007.pdf.

*Primary Examiner* — Paul D Lee
(74) *Attorney, Agent, or Firm* — Office of Chief Counsel for National Institute of Standards and Technology

(57) ABSTRACT

A non-nulling gas velocity measurement apparatus performs a non-nulling measurement of gas velocity parameters and includes: a non-nulling pitot probe; gas valves in fluid communication with a different entrant aperture of the non-nulling pitot probe via a different pressure channel; receives stagnant gas from the respective entrant aperture; receives a reference gas; receives a valve control signal; and produces a valve-selected gas based on the valve control signal, the valve-selected gas consisting essentially of the reference gas or the stagnant gas; and a plurality of differential pressure transducers, such that each differential pressure transducer: is separately and independently in fluid communication with a different gas valve, and that gas valve communicates the valve-selected gas to the differential pressure transducer; receives the valve-selected gas from the gas valve; and produces a differential pressure signal from (Continued)

comparison of the pressure of the valve-selected gas to a reference gas pressure.

24 Claims, 48 Drawing Sheets

(51) Int. Cl.
*G01F 1/46* (2006.01)
*G01F 1/34* (2006.01)

(56) References Cited

U.S. PATENT DOCUMENTS

| | | | | |
|---|---|---|---|---|
| 7,212,953 | B1* | 5/2007 | Artiuch | G01F 25/15 |
| | | | | 702/100 |
| 2015/0377662 | A1* | 12/2015 | Ray | G01P 5/14 |
| | | | | 73/861.47 |
| 2018/0259380 | A1* | 9/2018 | Birch | A61B 5/087 |

* cited by examiner

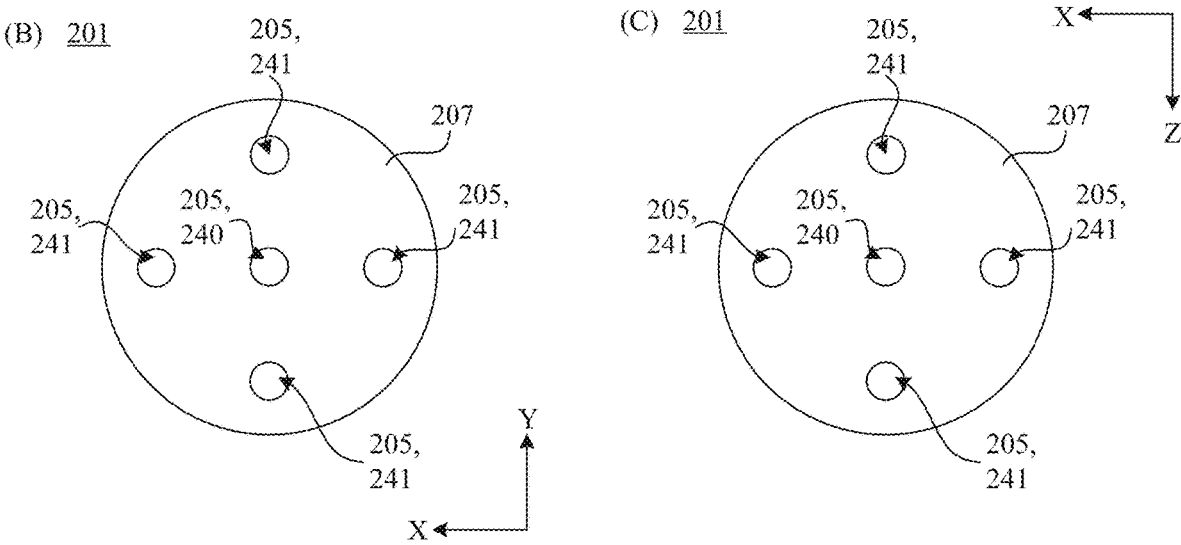
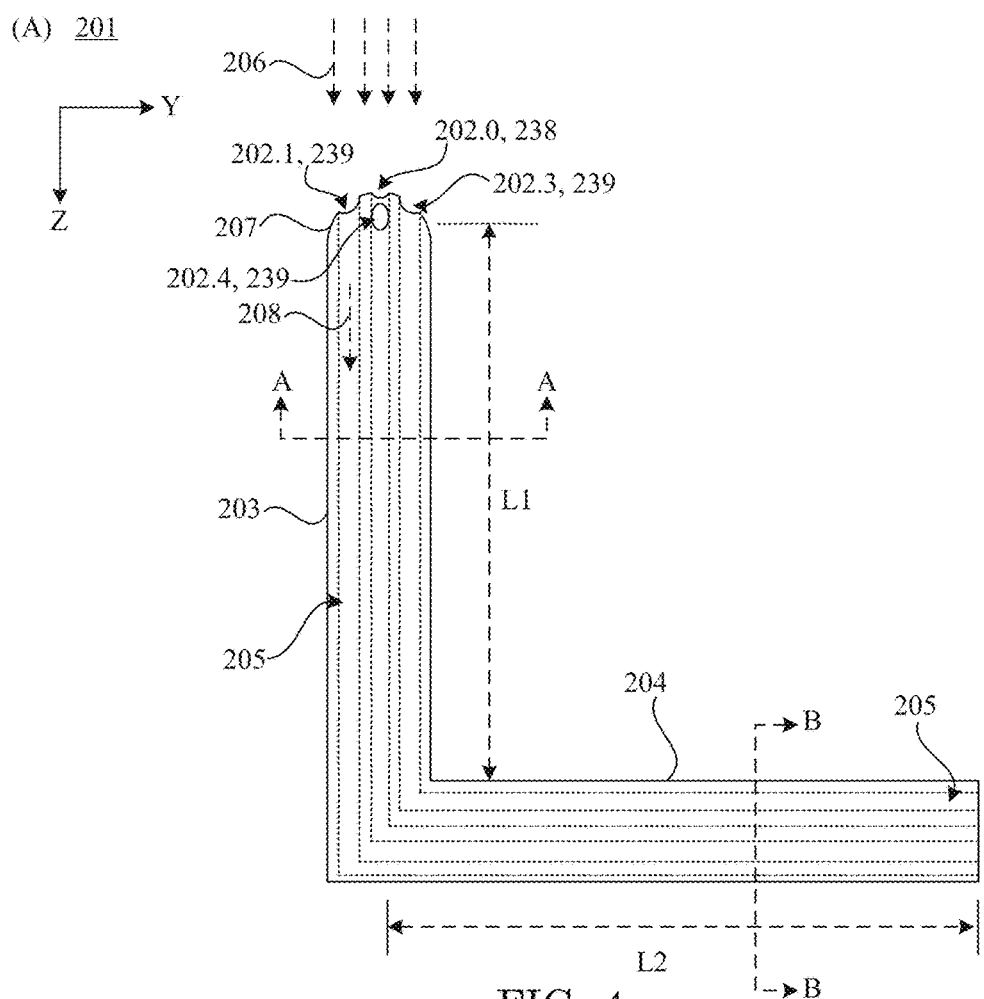
FIG. 4

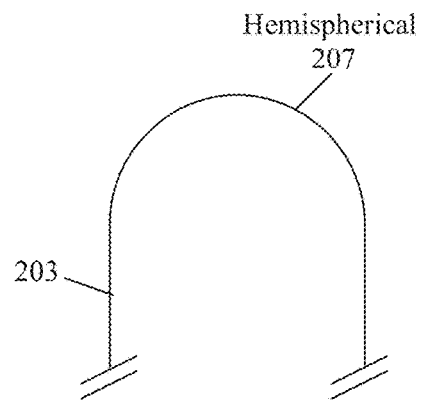
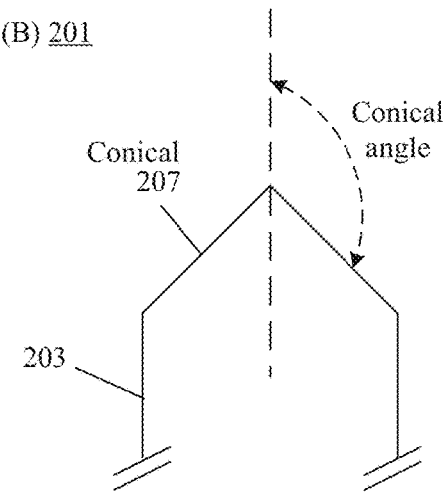
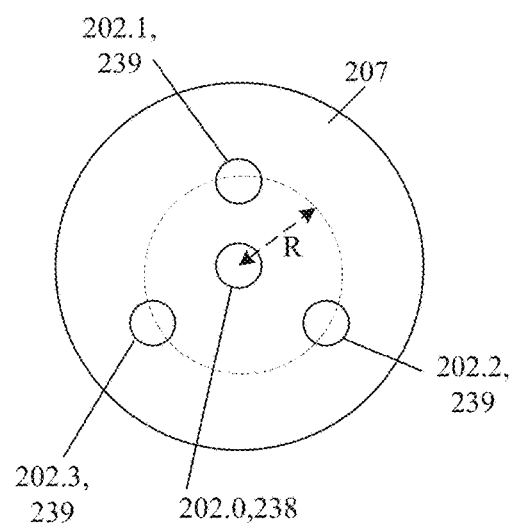
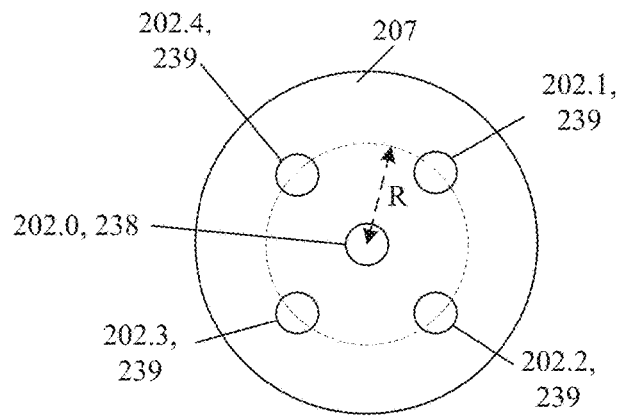
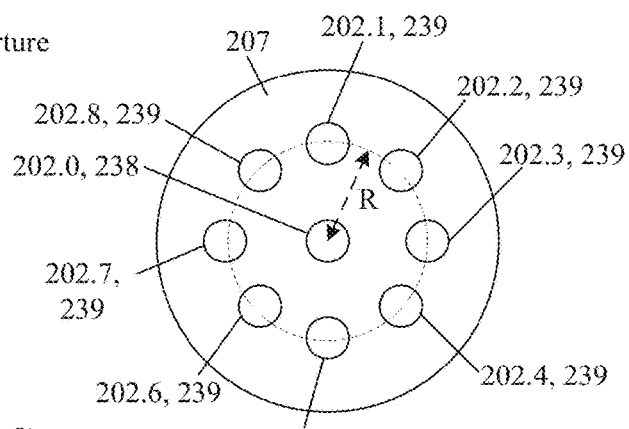
FIG. 7

(A)  209  Reference flow configuration
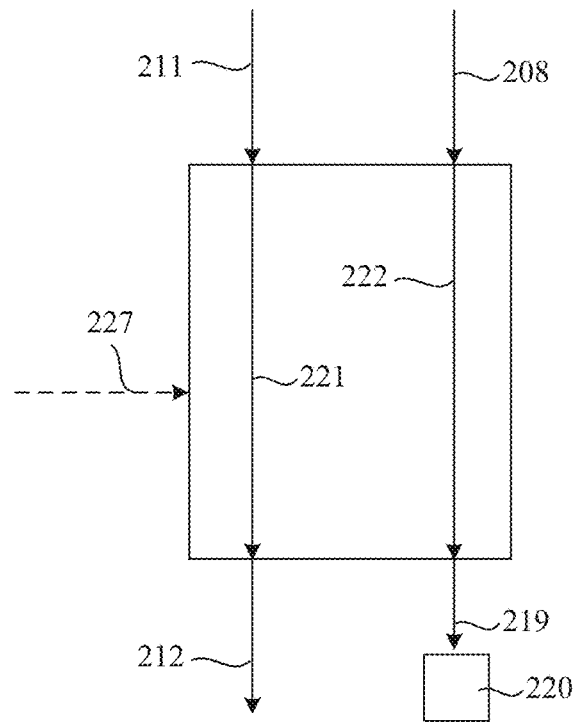
(B)  209  Sample flow configuration
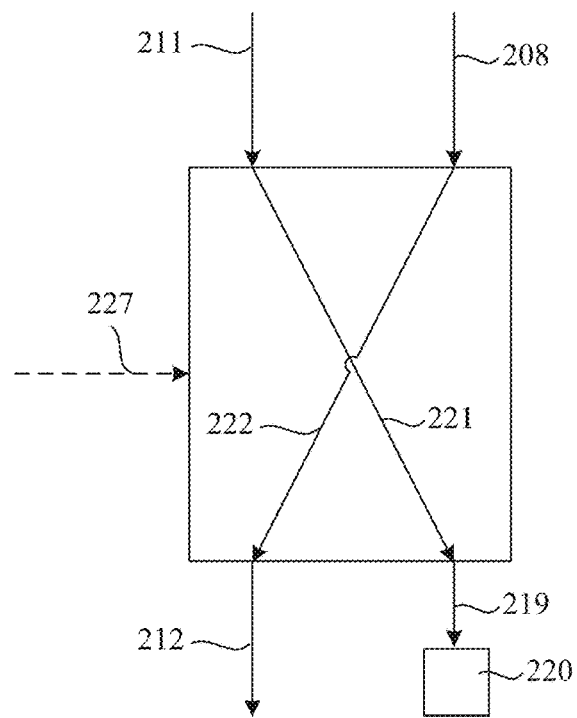
FIG. 8

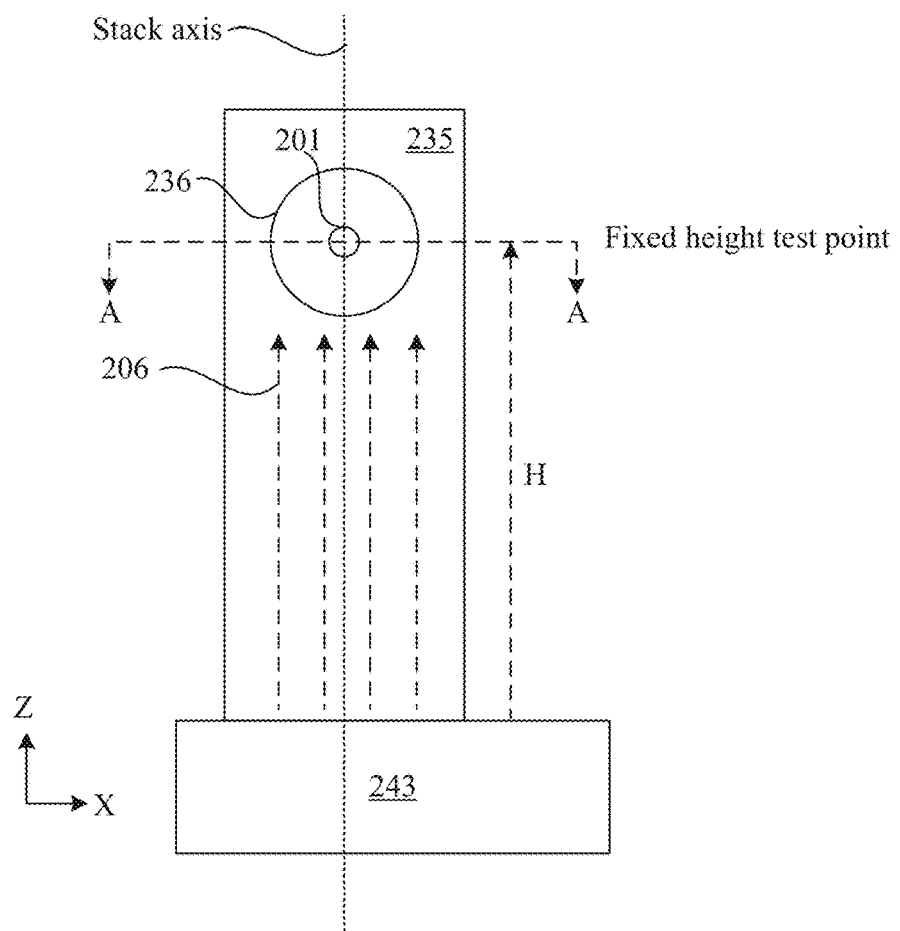
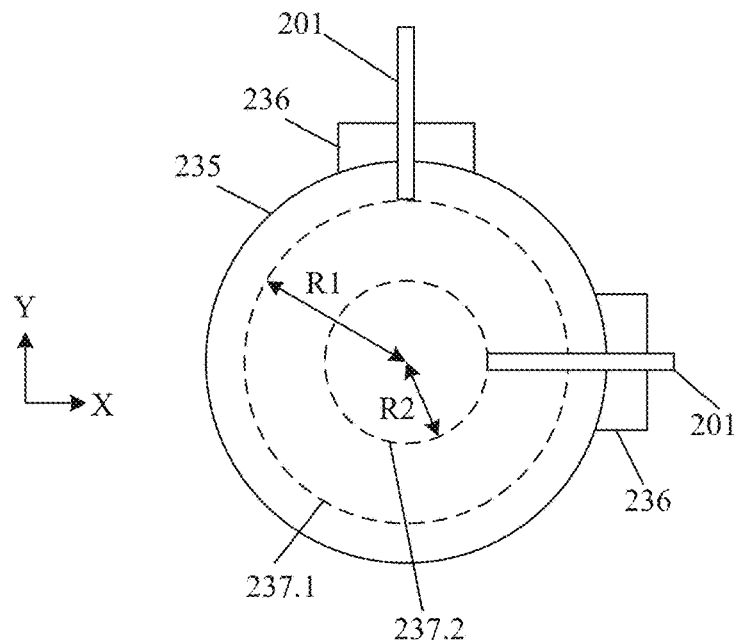
FIG. 11

300

301: receiving, by an analyzer, differential pressure signal 214.0, differential pressure signal 214.1, differential pressure signal 214.2, and differential pressure signal 214.3

↓

302: producing zeroth calibrated pressure CP0 from differential pressure signal 214.0, first calibrated pressure CP1 from differential pressure signal 214.1, second calibrated pressure CP2 from differential pressure signal 214.2, and third calibrated pressure CP3 from differential pressure signal 214.3

↓

303: removing a dependence of a pressure P0 of a reference gas from zeroth calibrated pressure CP0, first calibrated pressure CP1, second calibrated pressure CP2, and third calibrated pressure CP3 to produce, respectively, first adjusted pressure AP1, second adjusted pressure AP2, and third adjusted pressure AP3
//by pair-wise subtracting CPi from CP0   // to provide for off-axis velocity vector

↓

304: combining first adjusted pressure AP1, second adjusted pressure AP2, and third adjusted pressure AP3 to obtain a pseudo-dynamic pressure scalar

↓

305: individually normalizing first adjusted pressure AP1, second adjusted pressure AP2, and third adjusted pressure AP3 with the pseudo-dynamic pressure scalar to produce, respectively, first reduced pressure RP1, second reduced pressure RP2, and third reduced pressure RP3

↓                                                           ↓

306: determining real dynamic pressure from first reduced pressure RP1, second reduced pressure RP2, and third reduced pressure RP3

307: determining a yaw angle or a pitch angle of the gas flow from first reduced pressure RP1, second reduced pressure RP2, and third reduced pressure RP3

↓                                                           ↓

311: determining velocity

FIG. 12

| Run No. | $V_{M2F}$ | $V_{NN}$ | % Diff [c] |
|---|---|---|---|
| Low Load (7 m/s) | | | |
| 1 | 7.09 | 7.06 | 0.4 |
| 2 | 7.04 | 7.18 | -1.9 |
| 3 | 7.06 | 7.21 | -2.1 |
| 4 | 7.10 | 7.17 | -1 |
| 5 | 7.03 | 7.21 | -2.5 |
| 6 | 7.50 | 7.14 | 5.0 |
| Avg [a] | 7.14 | 7.16 | -0.3 |
| % Std Dev [b] | 2.5 | 0.8 | |
| High Load (16 m/s) | | | |
| 1 | 16.44 | 16.29 | 0.9 |
| 2 | 16.48 | 16.24 | 1.5 |
| 3 | 15.84 | 16.23 | -2.4 |
| 4 | 16.37 | 16.27 | 0.6 |
| Avg [a] | 16.28 | 16.26 | 0.1 |
| % Std Dev [b] | 1.8 | 0.2 | | a) Avg is the average of the 4 or 6 runs
b) % Std Dev = 100×(Std. Dev. of 4 or 6 runs)/Avg
c) % Diff = $100(V_{M2F}/V_{NN} - 1)$

FIG. 17

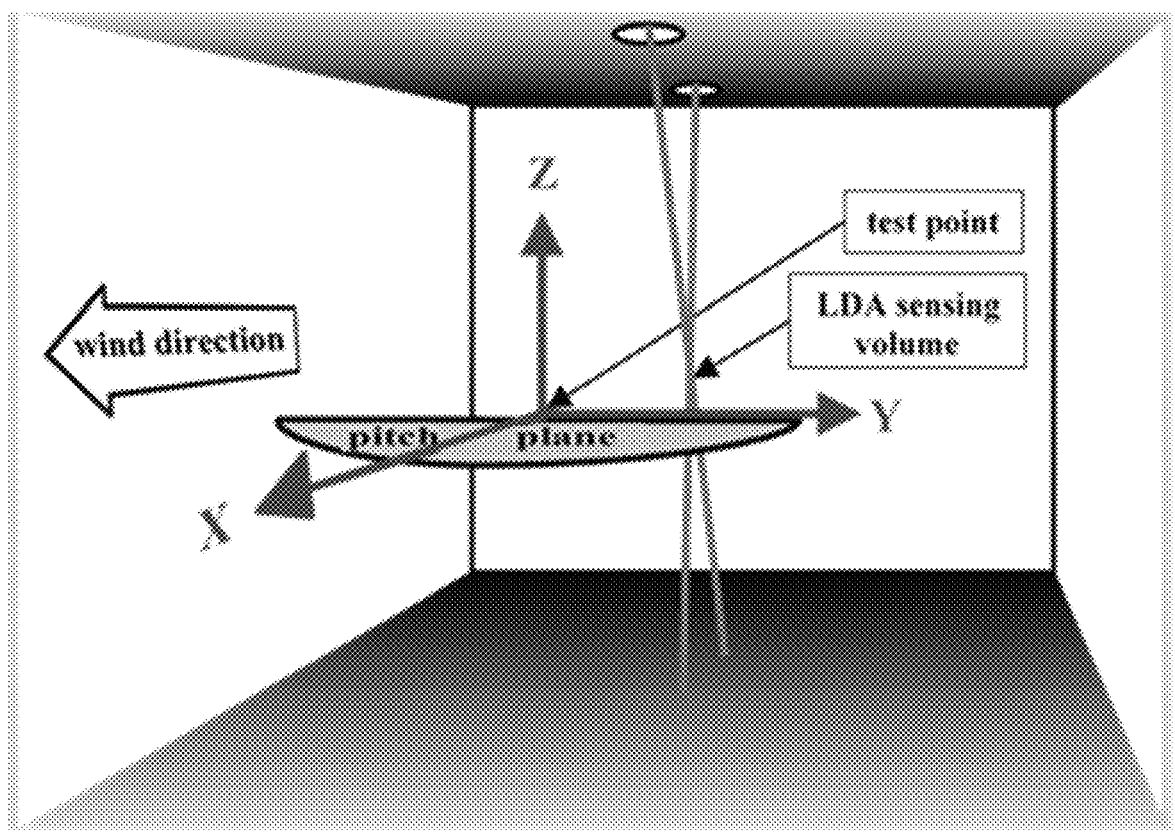
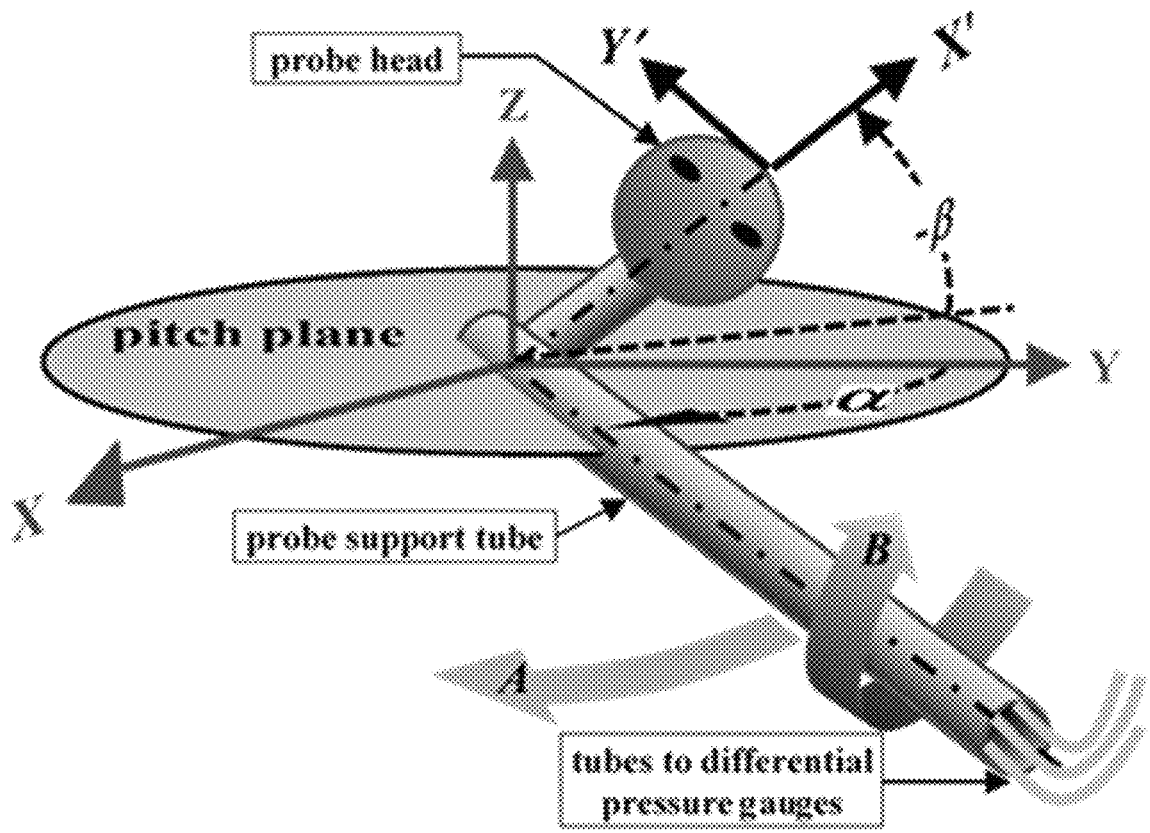
FIG. 23

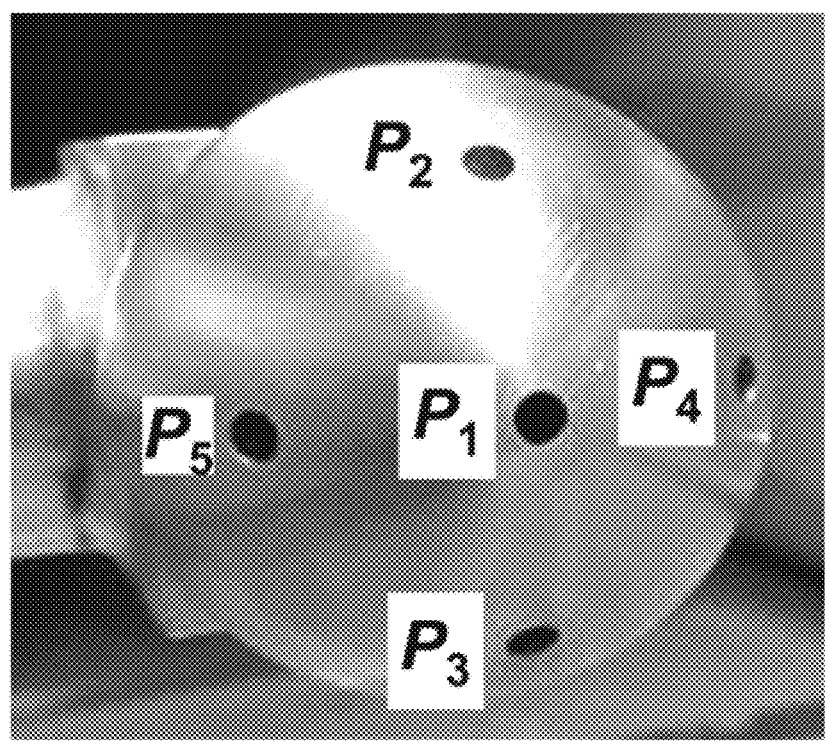
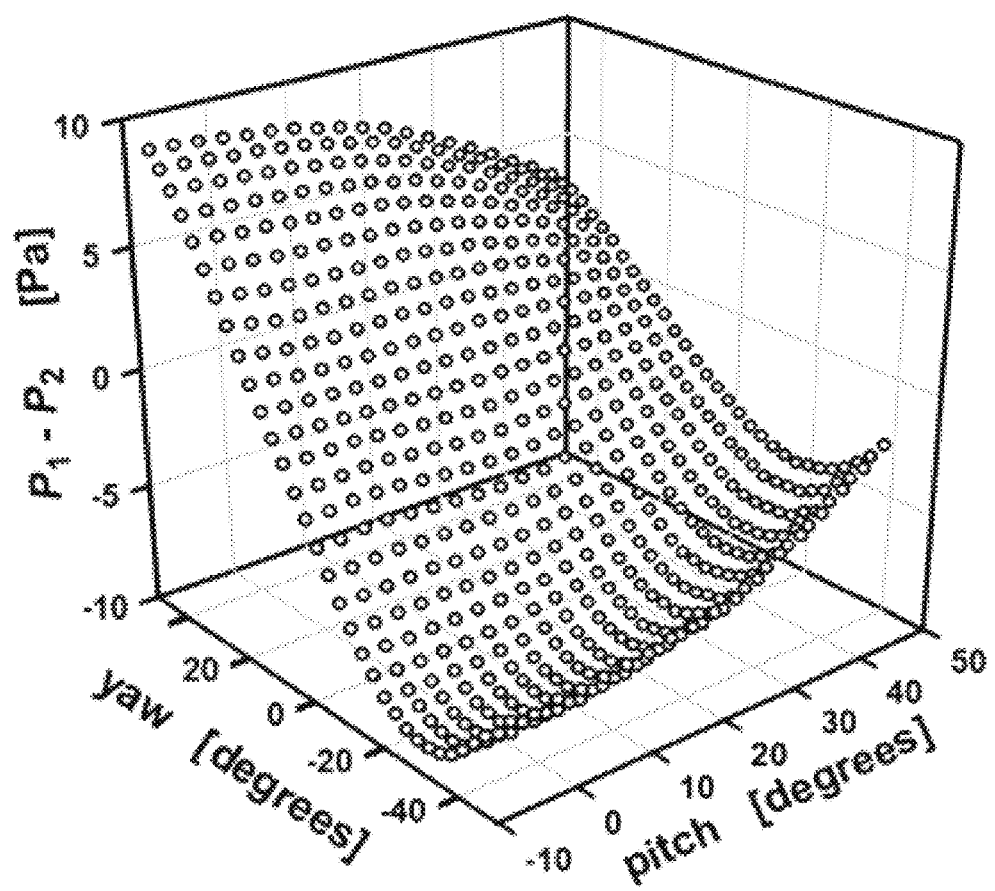
FIG. 33

| Probe Types | Load (Repeats) | M2F | NN ($\beta = 0$) | M2F/NN-1 |
|---|---|---|---|---|
| Spherical Probes (SP) | High (4)[a] | 0.993 (2.1 %)[b] | 0.994 (0.4 %)[b] | -0.1 %[c] |
| Custom Probes (CP) | High (4) | 1.053 (0.4 %) | 0.990 (0.7 %) | +5.9 % |
| CP/SP-1 | High | 6.0 % | -0.4 % | |
| Spherical Probes (SP) | Low (6) | 1.02 (1.3 %) | 1.02 (1.7 %) | 0 % |
| Custom Probes (CP) | Low (6) | 1.108 (2.0 %) | 0.997 (1.6 %) | +10 % |
| CP/SP-1 | Low | 8.6 % | -2.3 % | | a) Number of repeated RATA traverses for the same probe at the same flow
b) Standard deviation of normalized RATA velocity expressed as a percent
c) Percent difference computed using 100 (M2F/NN -1)

(4) The CFPP test results are summarized in Table 1. The tabulated RATA velocities are normalized by the CEMS velocity ($V_{RATA}/V_{CEMS}$) to help account for flow variations during and between measurements. The data in column "M2F" are the normalized flow velocities for Method 2F; the data in column "NN ( = 0)" are the normalized non-nulling velocities obtained with the probe at a zero yaw angle.

FIG. 37

| Test No. | Probe Types | Load | Repeat Runs | Port 1 | Port 2 | Port 3 | Port 4 |
|---|---|---|---|---|---|---|---|
| 1 | Spherical Probes | High | 4 | Sphere 2 | Sphere 3 | Sphere 5 | Sphere 6 |
| 2 | Custom Probes | High | 4 | Hemi-sphere 1 | Conical 1 | Hemi-sphere 1 | Conical 2 |
| 3 | Custom Probes | Low | 6 | Hemi-sphere 1 | Conical 1 | Hemi-sphere 1 | Conical 2 |
| 4 | Spherical Probes | Low | 6 | Sphere 2 | Sphere 3 | Sphere 5 | Sphere 6 |

FIG. 41

| Run No | $\dfrac{V_{M2F}}{V_{CEMS}}$ | $\dfrac{V_{NN@0yaw}}{V_{CEMS}}$ | % Diff[c] |
|---|---|---|---|
| 1 | 1.008 | 0.999 | 0.9 % |
| 2 | 1.009 | 0.993 | 1.6 % |
| 3 | 0.965 | 0.991 | -2.6 % |
| 4 | 0.988 | 0.992 | -0.4 % |
| Avg[a] | 0.993 | 0.994 | -0.1 %[c] |
| %Std | 2.1 % | 0.4 % | | a) Avg is the average of the 4 runs
b) %Std Dev is 100 times the standard deviation of the 4 runs dividing by the average
c) %Diff is calculated by $100(V_{M2F}/V_{NN@0yaw}-1)$

FIG. 43

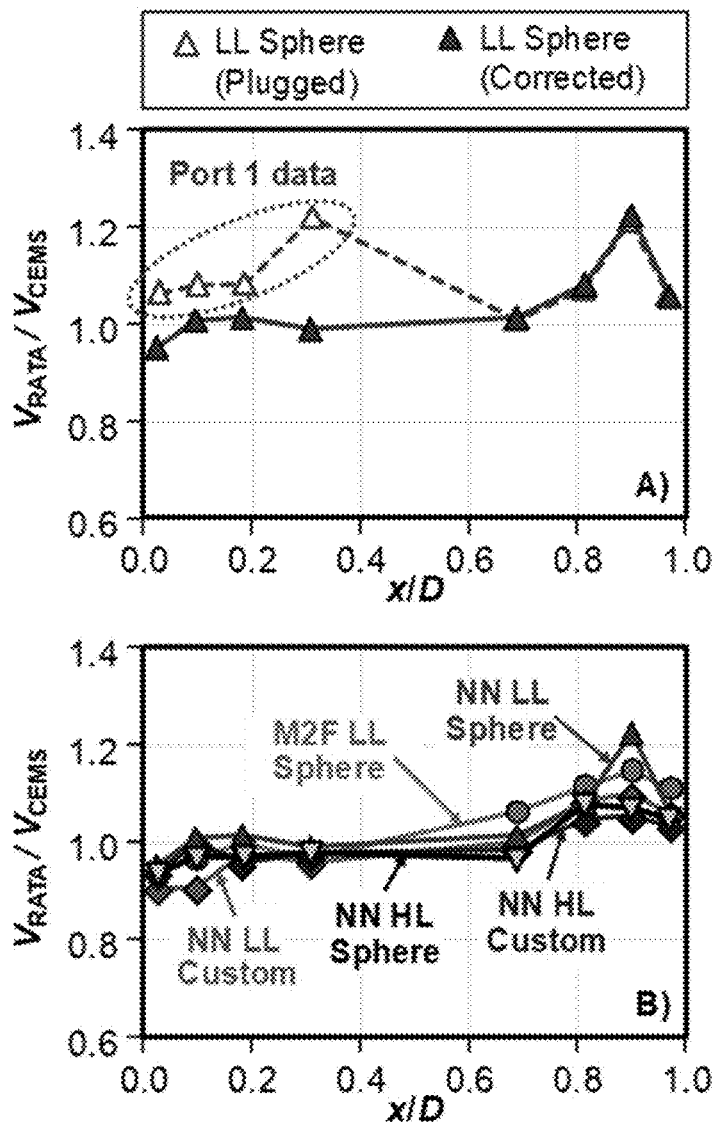

Normalized axial velocity profiles plotted against the dimensionless distance from port 1 to port 3:

A) △ Low Load Spherical profile with plugged probe ports; ▲ same profile recalculated with plugged data removed.

B) Five profiles not significantly affected by plugging:

1) ◆ NN LL Custom non-nulling low load,
2) ◆ NN HL Custom non-nulling high;
3) ▽ NN HL Sphere non-nulling high load,
4) ● M2F LL Sphere, Method 2F low load
5) ▲ NN LL Sphere, non-nulling, low load

FIG. 48

NON-NULLING GAS VELOCITY MEASUREMENT APPARATUS AND PERFORMING NON-NULLING MEASUREMENT OF GAS VELOCITY PARAMETERS

CROSS REFERENCE TO RELATED APPLICATIONS

The application claims priority to U.S. Provisional Patent Application Ser. No. 63/011,004 filed Apr. 16, 2020, the disclosure of which is incorporated herein by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in the invention. Licensing inquiries may be directed to the Technology Partnerships Office, NIST, Gaithersburg, Md., 20899; voice (301) 975-2573; email tpo@nist.gov; reference NIST Docket Number 20-040US1.

BRIEF DESCRIPTION

Disclosed is a non-nulling gas velocity measurement apparatus for non-nulling measurement of gas velocity parameters, the non-nulling gas velocity measurement apparatus comprising: a non-nulling pitot probe comprising: an aerodynamic flow head comprising a plurality of entrant apertures that comprises a central entrant aperture and a plurality of peripheral entrant aperture arranged radially from the central entrant aperture, such that the entrant apertures receive a gas flow from a gas source; an entrant body tube disposed on the aerodynamic flow head; an extensor body tube disposed on the entrant body tube such that the entrant body tube is interposed between the aerodynamic flow head and the extensor body tube, such that extensor body tube is arranged at an oblique angle to the entrant body tube; and a plurality of pressure channels disposed in the aerodynamic flow head, the entrant body tube, and the extensor body tube, such that each entrant aperture is separately and independently in fluid communication with one of the pressure channels, and each pressure channel independently receives and communicates the gas flow as stagnant gas from the entrant aperture of which the pressure channel is in communication; and a plurality of gas valves such that each gas valve: is in fluid communication with a different entrant aperture of the non-nulling pitot probe via a different pressure channel; receives stagnant gas from the respective entrant aperture; receives a reference gas; receives a valve control signal; and produces a valve-selected gas based on the valve control signal, the valve-selected gas consisting essentially of the reference gas or the stagnant gas; and a plurality of differential pressure transducers, such that each differential pressure transducer: is separately and independently in fluid communication with a different gas valve, and that gas valve communicates the valve-selected gas to the differential pressure transducer; receives the valve-selected gas from the gas valve; receives the reference gas at a reference gas pressure; compares a pressure of valve-selected gas to the pressure of the reference gas; and produces a differential pressure signal from comparison of the pressure of the valve-selected gas to the reference gas pressure.

Disclosed is a process for performing non-nulling measurement of gas velocity parameters, the process comprising: receiving, by an analyzer, a zeroth differential pressure signal, first differential pressure signal, a second differential pressure signal, and third differential pressure signal; producing a zeroth calibrated pressure from the zeroth differential pressure signal, a first calibrated pressure from the first differential pressure signal, a second calibrated pressure from the second differential pressure signal, and a third calibrated pressure from the third differential pressure signal; removing a dependence of a reference gas pressure of a reference gas from the zeroth calibrated pressure, the first calibrated pressure, the second calibrated pressure, and the third calibrated pressure to produce, respectively, a first adjusted pressure, a second adjusted pressure, and a third adjusted pressure; combining the first adjusted pressure, the second adjusted pressure, and the third adjusted pressure to obtain a pseudo-dynamic pressure scalar; individually normalizing the first adjusted pressure, the second adjusted pressure, and the third adjusted pressure with the pseudo-dynamic pressure scalar to produce, respectively, a first reduced pressure, a second reduced pressure, and a third reduced pressure; determining a real dynamic pressure from the first reduced pressure, the second reduced pressure, and the third reduced pressure; determining a yaw angle or a pitch angle of the gas flow from the first reduced pressure, the second reduced pressure, and the third reduced pressure; and determining velocity of the gas flow from the real dynamic pressure to perform non-nulling measurement of gas velocity parameters.

BRIEF DESCRIPTION OF THE DRAWINGS

The following description cannot be considered limiting in any way. With reference to the accompanying drawings, like elements are numbered alike.

FIG. 4 shows, in panel A, a side view of the non-nulling pitot probe shown in B of FIG. 3; in panel B, a cross-section along line A-A of the non-nulling pitot probe shown in panel A; and in panel B, a cross-section along line B-B of the non-nulling pitot probe in panel A;

FIG. 7 shows a hemispherical aerodynamic flow head of a non-nulling pitot probe in panel A; a conical aerodynamic flow head of a non-nulling pitot probe in panel B; a plan view of an aerodynamic flow head of a non-nulling pitot probe that has four entrant apertures in panel C; a plan view of an aerodynamic flow head of a non-nulling pitot probe that has five entrant apertures in panel D; and a plan view of an aerodynamic flow head of a non-nulling pitot probe that has eight entrant apertures in panel E;

FIG. 8 shows a gas valve in a reference flow configuration in panel A; and a gas valve in a stagnant flow configuration in panel B;

FIG. 11 shows side view in panel A and a plan view in panel B of non-nulling pitot probe disposed on an emission stack in communication with an emission source;

FIG. 12 shows steps in a process for performing non-nulling measurement of gas velocity parameters;

FIG. 17 shows RATA velocities determined by Method 2F and by the Non-Nulling Method for 6 repeated runs at low flow and 4 repeated runs at high flow according to Example 1;

FIG. 23 shows the wind tunnel coordinate system. The origin of the coordinate system is the "test point" which is usually set ~12 cm downstream from the LDA's sensing volume. BOTTOM: Coordinate system for orienting a multi-hole pressure probe. The pitch angle $\alpha$ is in the XY plane. The angle $\alpha$ increases from zero as the probe's support tube is rotated from the Y-axis in the direction of the arrow "A". The yaw angle $\beta$ specifies the orientation of the center-line of probe's head in the plane that includes both the Z-axis and the center-line. When the center-line is in the pitch plane, $\beta=0$; $\beta$ increases as the support tube is rotated about its axis in the direction of the arrow "B". The axes X' and Y' are attached to the probe being calibrated;

FIG. 33 shows: (Top) 5-hole spherical probe with labels on pressure-sensing ports. Bottom: Pressure difference between ports $P_1$ and $P_2$ as a function of pitch and yaw angles. Data were taken at intervals of 2° at 5 m/s;

FIG. 37 shows normalized flow velocity ($V_{RATA}/V_{CEMS}$) for Method 2F (M2F) and for the non-nulling method at zero yaw angle (NN, $\beta=0$) at a high load of 16 m/s and a low load of 7 m/s.

FIG. 41 shows Test matrix for 16-point flow RATAs performed in CFPP stack.

FIG. 43 shows normalized flow velocities determined by Method 2F and by the non-nulling method for the 4 repeated runs measured with spherical probe at high load (16 m/s);

FIG. 48 shows normalized axial velocity profiles plotted against the dimensionless distance from port 1 to port 3: A) Open triangles indicate low load spherical profile with plugged probe ports; closed triangles indicate the same profile recalculated with plugged data removed. B) Five profiles not significantly affected by plugging.

DETAILED DESCRIPTION

A detailed description of one or more embodiments is presented herein by way of exemplification and not limitation.

Accurately quantifying hazardous emissions from industrial emission stacks involves accurate gas velocity measurements made at various points on a cross-section of the emission stack. Conventional probes for such measurement involve a time-consuming nulling procedure, wherein the conventional probe is rotated about its axis at each point to find a yaw component of velocity at that point. It should be appreciated that non-nulling gas velocity measurement apparatus 200 and process for performing non-nulling measurement of gas velocity parameters that reduces time and cost of such measurements as compared with conventional probes. Non-nulling pitot probe 201 measures the velocity more accurately than conventional probes, including conventional probes sanctioned by the US Environmental Protection Agency (EPA). A diameter of pressure-sensing holes in non-nulling pitot probe 201, referred to as entrant apertures 202, can be three times to six times larger than pressure-sensing holes in conventional EPA-sanctioned 3-dimensional probes, and the size increase in non-nulling pitot probe 201 mitigates plugging of the holes that occur when flue gas has water droplets or other particles. Conventional EPA-sanctioned probes are calibrated in laminar wind tunnel flows and are used in turbulent stack flows without accounting for turbulence intensity, but this overestimates stack emissions by 5%, e.g., when the turbulence intensity is 10%. Non-nulling gas velocity measurement apparatus 200 and process for performing non-nulling measurement of gas velocity parameters determine the turbulence intensity of the flue gas velocity and correct the measurements for the turbulence intensity.

Figure 1:
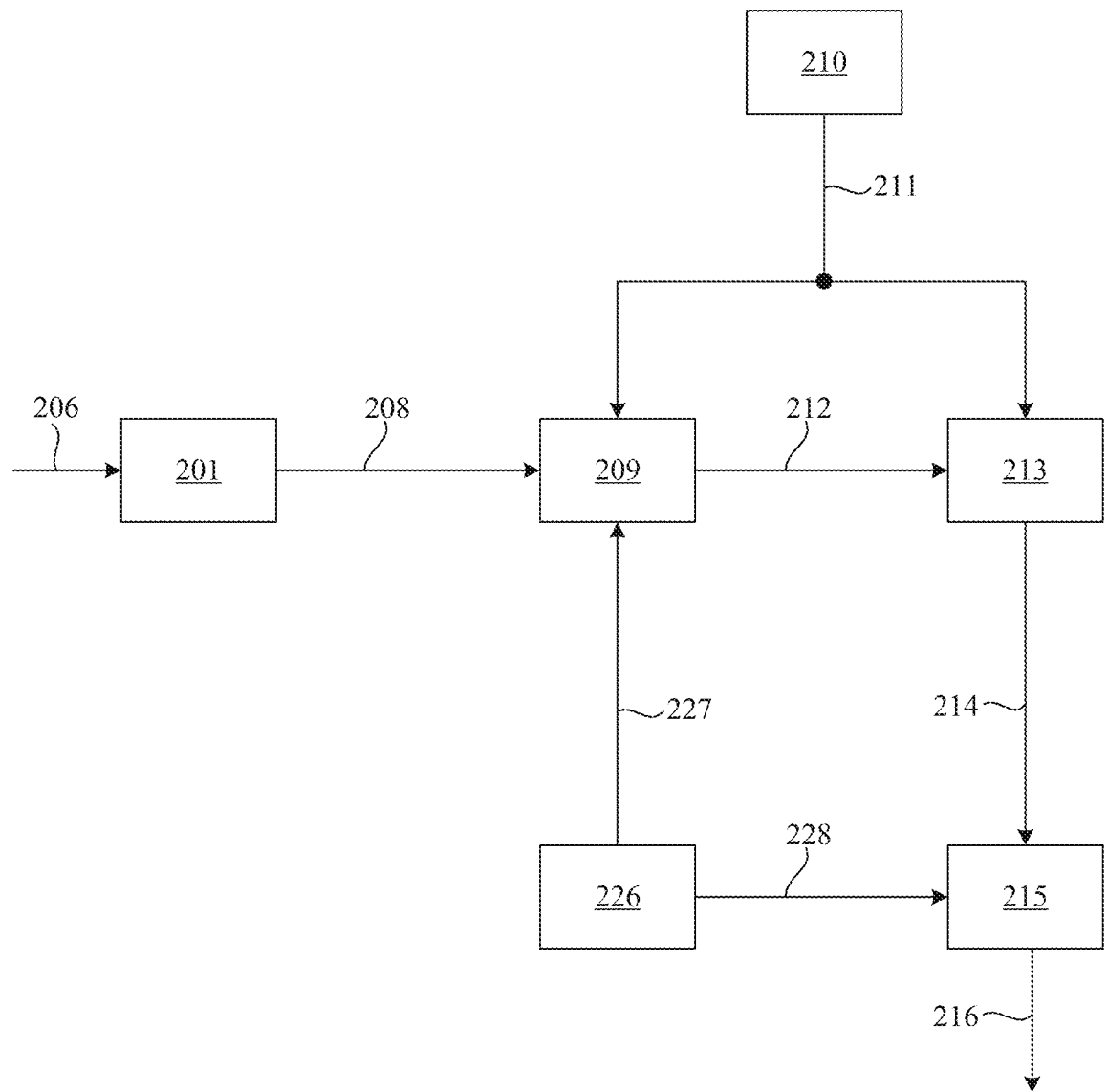
FIG. 1 shows a non-nulling gas velocity measurement apparatus.
Figure 2:
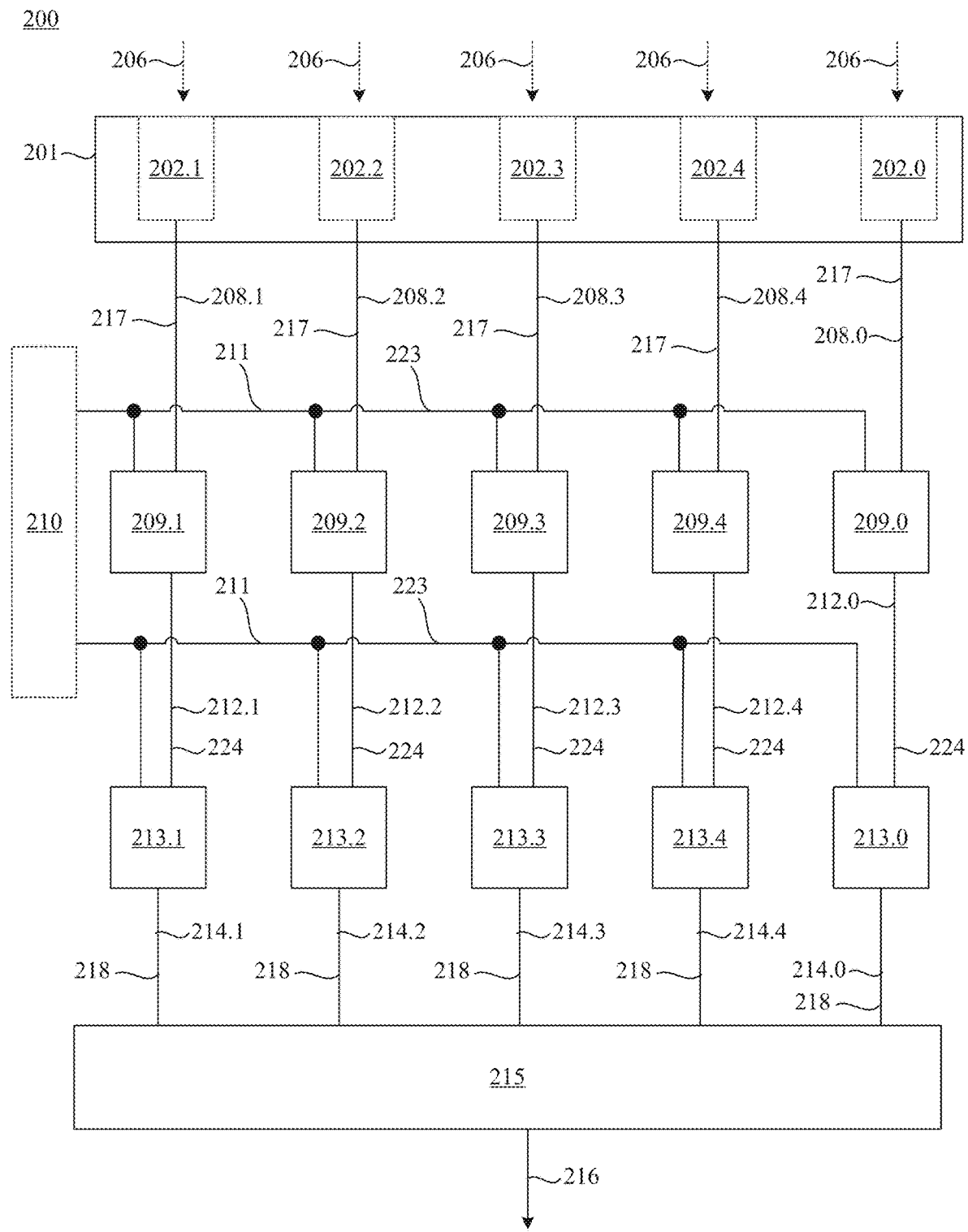
FIG. 2 shows a non-nulling gas velocity measurement apparatus.

Non-nulling gas velocity measurement apparatus 200 performs non-nulling measurement of gas velocity parameters of gas flow 206. In an embodiment, with reference to FIG. 1, non-nulling gas velocity measurement apparatus 200 includes: non-nulling pitot probe 201 that receives gas flow 206 and produces stagnant gas 208 from gas flow 206; reference pressure source 210 that produces reference gas 211; controller 226 that produces valve control signal 227 and control signal 228; gas valve 209 in fluid communication with non-nulling pitot probe 201 and reference pressure source 210 and in electrical communication with controller 226 and that receives stagnant gas 208 from non-nulling pitot probe 201, receives reference gas 211 from reference pressure source 210, receives valve control signal 227 from controller 226, and produces valve-selected gas 212 that includes reference gas 211 or stagnant gas 208 based on valve control signal 227; differential pressure transducer 213 in fluid communication with reference pressure source 210 and gas valve 209 and that produces differential pressure signal 214 by comparing valve-selected gas 212 with reference gas 211; and analyzer 215 in electrical communication with differential pressure transducer 213 and controller 226 and that receives differential pressure signal 214 from differential pressure transducer 213 and control signal 228 from controller 226 and produces gas velocity parameters 216 from analysis of differential pressure signal 214 in view of control signal 228.

In an embodiment, with reference to FIG. 1, FIG. 2, FIG. 3, and FIG. 4, non-nulling gas velocity measurement apparatus 200 includes: a non-nulling pitot probe 201 including: aerodynamic flow head 207 including a plurality of entrant apertures 202 that includes central entrant aperture 238 and a plurality of peripheral entrant aperture 239 arranged radially from central entrant aperture 238, such that entrant apertures 202 receive gas flow 206 from a gas source; entrant body tube 203 disposed on aerodynamic flow head 207; extensor body tube 204 disposed on entrant body tube 203 such that entrant body tube 203 is interposed between aerodynamic flow head 207 and extensor body tube 204, such that extensor body tube 204 is arranged at an oblique angle to entrant body tube 203; and a plurality of pressure channels 205 disposed in aerodynamic flow head 207, entrant body tube 203, and extensor body tube 204, such that each entrant aperture 202 is separately and independently in fluid communication with one of pressure channels 205, and each pressure channel 205 independently receives and communicates gas flow 206 as stagnant gas 208 from entrant aperture 202 of which pressure channel 205 is in communication; and a plurality of gas valves 209 such that each gas valve 209: is in fluid communication with a different entrant aperture 202 of non-nulling pitot probe 201 via a different pressure channel 205; receives stagnant gas 208 from the respective entrant aperture 202; receives reference gas 211; receives valve control signal 227; and produces valve-selected gas 212 based on valve control signal 227, valve-selected gas 212 consisting essentially of reference gas 211 or stagnant gas 208; and a plurality of differential pressure transducers 213, such that each differential pressure transducer 213: is separately and independently in fluid communication with a different gas valve 209, and that gas valve 209 communicates valve-selected gas 212 to differential pressure transducer 213; receives valve-selected gas 212 from gas valve 209; receives reference gas 211 at reference gas pressure P0; compares a pressure of valve-selected gas 212 to reference gas pressure P0; and produces a differential pressure signal 214 from comparison of the pressure of the valve-selected gas 212 to the reference gas pressure.

In an embodiment, non-nulling gas velocity measurement apparatus 200 includes a plurality of stagnant gas lines 217, such that each stagnant gas line 217 separately interconnects one pressure channel 205 with one of the gas valves 209 for communicating gas flow 206 received by the respective entrant aperture 202 to the respective gas valve 209 as stagnant gas 208.

In an embodiment, non-nulling gas velocity measurement apparatus 200 includes a plurality of valve outlet gas lines 224, such that each valve outlet gas line 224 separately interconnects one gas valve 209 with one of the differential pressure transducers 213 for communicating valve-selected gas 212 from gas valve 209 to the respective differential pressure transducer 213.

In an embodiment, non-nulling gas velocity measurement apparatus 200 includes reference gas line 223 in communication with each gas valve 209 and that communicates reference gas 211 to gas valves 209.

In an embodiment, non-nulling gas velocity measurement apparatus 200 includes reference gas line 223 in communication with each differential pressure transducer 213 and that communicates reference gas 211 to differential pressure transducers 213.

In an embodiment, non-nulling gas velocity measurement apparatus 200 includes reference pressure source 210 that provides reference gas 211 to each gas valve 209.

In an embodiment, non-nulling gas velocity measurement apparatus 200 includes reference pressure source 210 that provides reference gas 211 to each differential pressure transducer 213.

In an embodiment, non-nulling gas velocity measurement apparatus 200 includes analyzer 215 in communication with each differential pressure transducer 213 and that: receives each differential pressure signal 214 from each differential pressure transducer 213; and produces gas velocity parameters 216 from differential pressure signal 214.

In an embodiment, non-nulling gas velocity measurement apparatus 200 controller 226 in communication with each gas valve 209 and that: produces a plurality of valve control signals 227; and communicates valve control signals 227, such that each gas valve 209 receives one of valve control signals 227 from controller 226 and produces valve-selected gas 212 based on valve control signal 227. In an embodiment, non-nulling gas velocity measurement apparatus 200 controller 226 produces control signal 228 and communicates control signal 228 to analyzer 215, such that control signal 228 indicates whether each gas valve 209 produces valve-selected gas 212 from stagnant gas 208 or reference gas 211.

Non-nulling gas velocity measurement apparatus 200 can be made from various elements and components. With reference to FIG. 3, FIG. 4, FIG. 5, FIG. 6, and FIG. 7, non-nulling pitot probe 201 receives gas flow 206 at aerodynamic flow head 207 that includes a plurality of entrant apertures 202, wherein entrant apertures 202 include central entrant aperture 238, referred to a zeroth entrant aperture 202.0, around which is disposed a plurality of peripheral entrant apertures 239, referred to as first entrant aperture 202.1, second entrant aperture 202.2, . . . , to n-th entrant aperture 202.n, wherein n is an arbitrary integer. A number of peripheral entrant apertures 239 is arbitrary but selected to adequately characterize gas flow 206. At a minimum, three peripheral entrant apertures 239 are included as shown in FIG. 7C, for characterization of gas flow 206. Peripheral entrant apertures 239 are disposed at radial distance R with respect to a center of central entrant aperture 238 that is centrally position on aerodynamic flow head 207 and can be spaced apart by an equal amount of space at a selected pitch, such as for a distribution of four peripheral entrant apertures 239 for a total of five entrant apertures 202 as shown in FIG. 7D or for a distribution of eight peripheral entrant apertures 239 for a total of nine entrant apertures 202 as shown in FIG. 7E. Radial distance R can be selected based on a size, e.g., a diameter, of aerodynamic flow head 207 and diameter D of individual entrant apertures 202. It is contemplated that radial distance can be from 1 micrometer (μm) to 1 meter (m), specifically from 1 millimeter (mm) to 50 centimeters (cm), and more specifically from 1 mm to 10 cm. Diameter D is selected to maximize acceptance of gas flow 206 by each entrant aperture 202 while being connecting each pressure channel 205 to a stagnant gas line 217. Diameter D can as large as possible without interference among adjacent entrant apertures 202 so that individual entrant apertures 202 are physically separate, including the particular pressure channel 205 that is in fluid communication with the individual entrant aperture 202. Diameter D can be from 1 micrometer (μm) to 1 meter (m), specifically from 1 millimeter (mm) to 50 centimeters (cm), and more specifically from 1 mm to 10 cm.

Gas flow 206 received by entrant apertures 202 is communicated to pressure channels 205, wherein each entrant aperture 202 is connected to one pressure channel 205 in an absence of fluid communication among pressure channels 205. That is, pressure channels 205 are isolated from one another. Pressure channel 205 extends from entrant aperture 202 in aerodynamic flow head 207 through entrant body tube 203 and terminates at extensor body tube 204 disposed distal from aerodynamic flow head 207.

Figure 6:
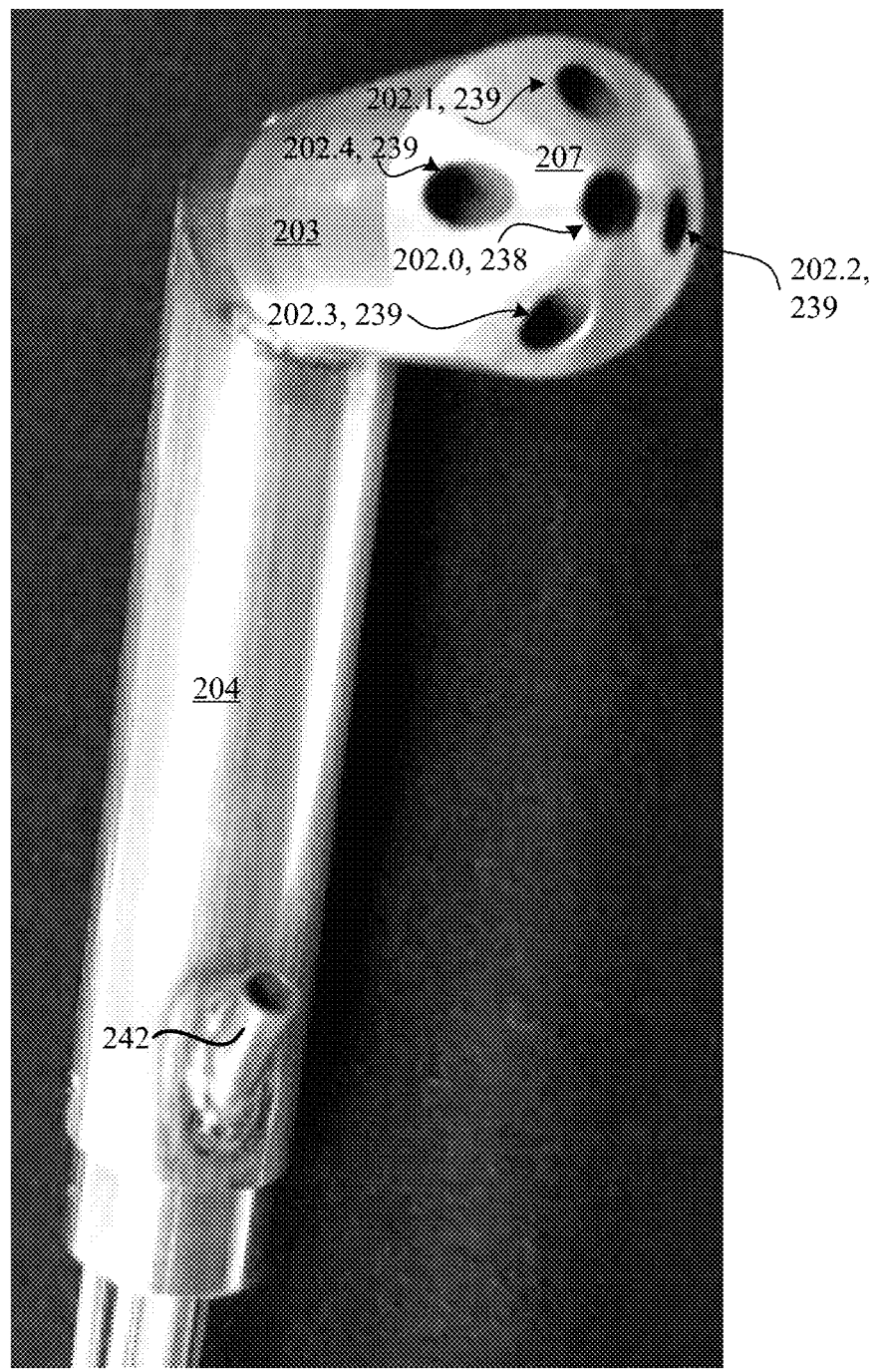
FIG. 6 shows a non-nulling pitot probe including a conical aerodynamic flow head.

Non-nulling gas velocity measurement apparatus 200, including aerodynamic flow head 207, entrant body tube 203, and extensor body tube 204, can be made of a material that is physically or chemically resilient in an environment of the source of gas flow 206 such as emission stack 235. Exemplary materials include a metal (e.g., nickel, stainless steel, and the like), ceramic, thermoplastic, glass, and the like. Aerodynamic flow head 207, entrant body tube 203, and extensor body tube 204 can be made of the same or different material and can be monolithic in a single physical body or can be separate members that are physically joined. An aerodynamic shape of aerodynamic flow head 207 as experience by gas flow 206 can be selected to not cause disruption of gas flow 206 over aerodynamic flow head 207 or creation of eddies from gas flow 206. The shape can be, e.g., hemispherical as shown in FIG. 3, FIG. 4, FIG. 5, and FIG. 7A or conical as shown in FIG. 6 and FIG. 7B. For a conical aerodynamic flow head 207, the surface of aerodynamic flow head 207 can have an arbitrary conical angle with respect to a length axis of entrant body tube 203, the conical angle can be from slightly greater than 90° to slightly less than 180°, specifically from 95° to 175°, and more specifically from 95° to 135°.

Entrant body tube 203 is interposed between aerodynamic flow head 207 and extensor body tube 204 and communicates gas flow 206 received by entrant aperture 202 via pressure channel 205. Extensor body tube 204 is arranged at an oblique angle to entrant body tube 203, which can be around 90°, specifically from 60° to 120°. It is contemplated that, no matter the oblique angle between entrant body tube 203 and extensor body tube 204, central entrant aperture 238 and its pressure channel 205 can be aligned to be coaxial, e.g., with a stack axis of emission stack 235. Length L1 of entrant body tube 203 can be long enough to ensure non-eddy formation of gas flow 206 as residual gas flow 206 not received through entrant apertures 202 flows over external surface of non-nulling gas velocity measurement apparatus 200. Length L1 can be, e.g., from 1 cm to 10 m, specifically from 5 cm to 1 m, and more specifically from 10 cm to 100 cm.

Extensor body tube 204 provides interconnection of non-nulling pitot probe 201 to differential pressure transducer 213, reference pressure source 210, and the like. Moreover, non-nulling pitot probe 201 can be mounted to a flange or other bulkhead member for disposal of non-nulling pitot probe 201 in a test configuration such as a gas source, e.g., emission stack 235, via extensor body tube 204. Length L2 of extensor body tube 204 can be long enough to ensure disposal of aerodynamic flow head 207 at selected positions in a sampling environment such as various radial locations (e.g., first radial position R1, second radial position R2, and the like) in emission stack 235 as shown in FIG. 11. Length L2 can be, e.g., from 1 cm to 10 m, specifically from 5 cm to 1 m, and more specifically from 10 cm to 100 cm.

Non-nulling pitot probe 201 can include additional hardware accoutrements including sensor port 242 disposed on extensor body tube 204 for receiving various instrumentation such as a temperature probe, e.g., a thermocouple.

Figure 3:
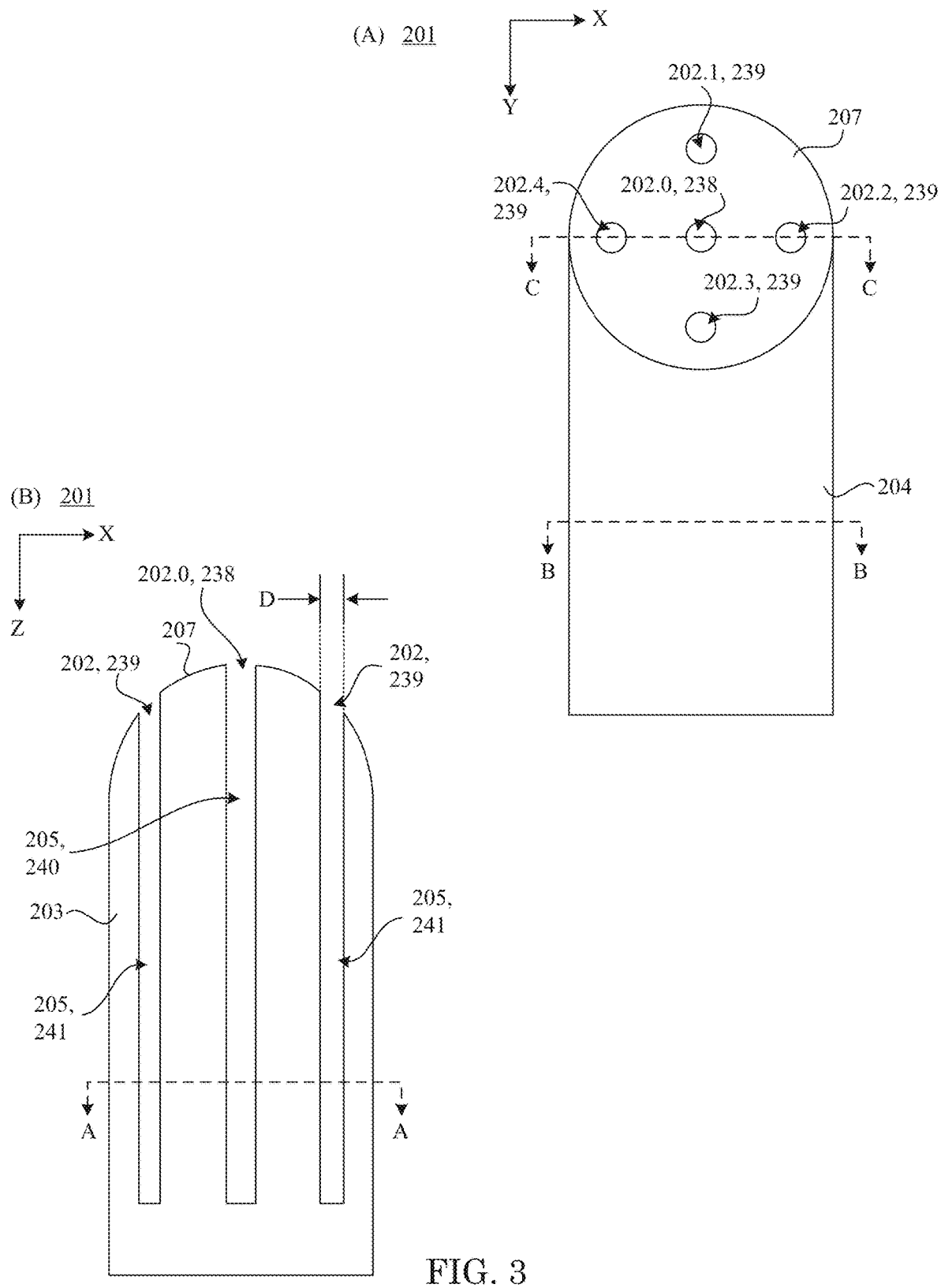
FIG. 3 shows a plan view of a non-nulling pitot probe in panel A and, in panel B, a cross-section along line C-C of the non-nulling pitot probe in panel A.
Figure 5:
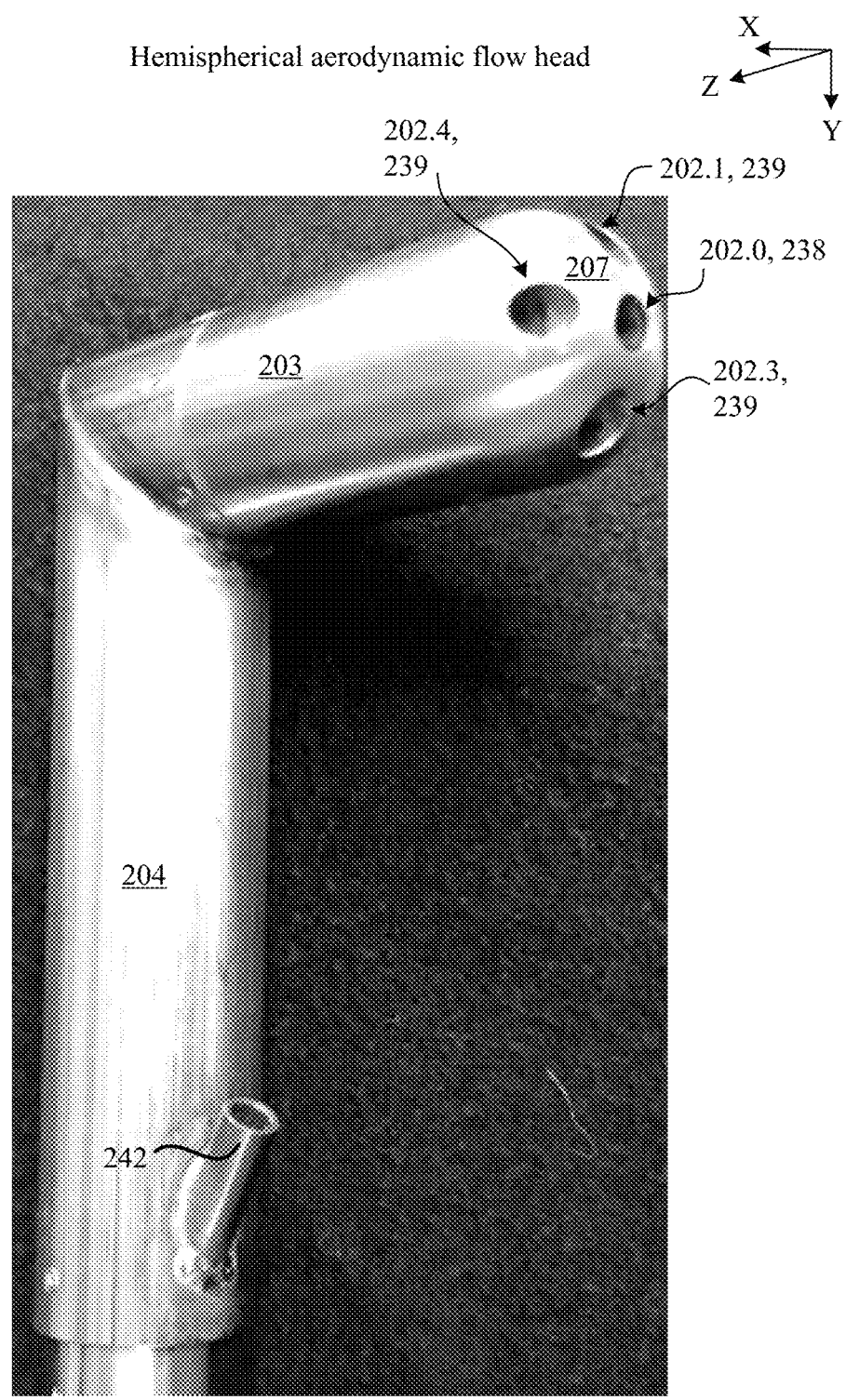
FIG. 5 shows a non-nulling pitot probe including a hemispherical aerodynamic flow head.

Pressure channel 205 provides unobstructed fluid communication of gas flow 206 from entrant aperture 202 to gas valve 209. In this manner, pressure channel 205 propagates a pressure of gas flow 206 from, e.g., in emission stack 235, as sampled by the entrant aperture 202 to which pressure channel 205 is connected to gas valve 209 as stagnant gas 208 via sample gas line 217. Accordingly, pressure channel 205 has a diameter appropriate for transmitting stagnant gas 208 with fidelity and in an absence of modifying such. It should be appreciated that entrant aperture 202 receives gas flow 206 and communicates such as stagnant gas 208 to pressure channel 205 so that stagnant gas 208 is the portion of gas flow 206 sampled by entrant aperture 202, and stagnant gas 208 includes all gas flow properties as gas flow 206 received by entrant aperture 202. With reference to FIG. 3 and FIG. 4, each pressure channel 205 is in fluid communication with one entrant aperture 202. Indeed, central pressure channel 240 is a pressure channel 205 that communicates stagnant gas 208 from gas flow 206 received by central entrant aperture 238. Similarly, peripheral pressure channel 241 is a pressure channel 205 that communicates stagnant gas 208 from gas flow 206 received by peripheral entrant aperture 239.

It is contemplated that gas flow 206 is a fluid that can be a gas or liquid. Exemplary gas flows 206 include effluent from an industrial emission stack 235, molecular or atomic gas sources, liquid supplies, and the like. A pressure of gas flow 206 can be from 1 pascal (Pa) to 100 megapascal (MPa), specifically 100 Pa to 1 MPa, and more specifically from 5 kilopascals (kPa) to 1 MPa. A temperature of gas flow 206 can be any temperature as long as stagnant gas 208 can be communicated through pressure channel 205. Gas flow 206 can have a Mach number from 0.01 to 0.3 at a velocity that is from 5 m/s to 100 m/s. A density of gas flow 206 can be from $10^{-6}$ grams/milliliter (g/mL) to 20 g/mL, specifically from $10^{-5}$ g/mL to 10 g/mL, and more specifically $10^{-4}$ g/mL to 2 g/mL. As used herein, stagnant gas 208 refers to the pressure induced on the entrant aperture 202 due to gas flow 206 incident at entrant apertures 202.

Sample gas line 217 receives stagnant gas 208 from pressure channel 205 and communicates stagnant gas 208 to gas valve 209. Sample gas line 217 is constructed of a material that withstands a temperature, chemical, or pressure demand of the flow environment such as emissions stack 235. Exemplary materials for sample gas line 217 include metals, plastics, and the like.

Gas valve 209 is in fluid communication with non-nulling pitot probe 201 via sample gas line 217 and receives stagnant gas 208 and reference gas 211. Further, gas valve 209 can be controlled by valve control signal 227 to select output of gas valve 209 between stagnant gas 208 and reference gas 211 based on valve control signal 227. With reference to FIG. 8, gas valve 209 can have a reference flow configuration as in panel A or sample flow configuration as shown in panel B. When valve control signal 227 provides a first signal, e.g., a low voltage, gas valve 209 obtains reference flow configuration, wherein reference valve line 221 of gas valve 209 flows reference gas 211 through gas valve 209 to provide reference gas 211 as valve-selected gas 212, and sample valve line 222 provides stagnant gas 208 as exhaust flow 219, e.g., to sink 220. Sink 220 can be a plug that blocks fluid flow or other hardware. When valve control signal 227 provides a second signal, e.g., a high voltage, gas valve 209 obtains sample flow configuration, wherein reference valve line 221 of gas valve 209 flows reference gas 211 through gas valve 209 to provide reference gas 211 as exhaust flow 219, and sample valve line 222 provides stagnant gas 208 as valve-selected gas 212. Gas valve 209 can be a pneumatic valve, e.g., a two-position, four-way valve, or the like. In an embodiment, gas valve 209 isolates differential pressure signal 214 from non-nulling pitot probe 201 so that emission stack 235 can be purged with a high pressure. In this manner, differential pressure signal 214 is protected from potential damage from high pressure or sudden pressure changes that can damage certain components of differential pressure signal 214 such as a diaphragm. Moreover, an additional gas line can be connected to non-nulling pitot probe 201 to provide positive pressure in pressure channel 205 while differential pressure transducer 213 is isolated from pressure channel 205 by gas valve 209 so that entrant aperture 202 can be unclogged should a clog of entrant aperture 202 occur. Because each entrant aperture 202 is connected to a different gas valve 209 that is independently controlled by a separate valve control signal 227, individual entrant apertures 202 are selectively addressable and can be subjected to individual pressurization and flow.

Valve outlet gas line 224 receives valve-selected gas 212 from gas valve 209 and communicates valve-selected gas 212 to differential pressure transducer 213. Valve outlet gas line 224 is constructed of a material that withstands a temperature, chemical, or pressure demand of the flow environment such as emissions stack 235. Exemplary materials for valve outlet gas line 224 include metals, plastics, and the like.

Differential pressure transducer 213 receives and compares valve-selected gas 212 and reference gas 211 to produce differential pressure signal 214. Differential pressure signal 214 can be made with reference to a calibrated pressure range or can be a raw signal that is proportional to a difference in pressure between valve-selected gas 212 and reference gas 211. Accordingly, differential pressure signal 214 can be a voltage with an amplitude that corresponds to the difference in pressure or can be a voltage signal that provides absolute pressure for valve-selected gas 212.

Reference pressure source 210 provides reference gas 211 and can be a pressurized vessel, gas generator, and the like. Reference gas 211 can be a gas at reference gas pressure P0. Exemplary reference gases 211 include air, an inert gas, nitrogen, and the like. Reference gas pressure P0 is sufficiently great enough to provide a stable differential pressure reading by differential pressure transducer 213 and can be from 1 Pa to 100 MPa, specifically 100 Pa to 1 MPa, and more specifically from 5 kPa to 1 MPa.

In an embodiment, with reference to FIG. 11, non-nulling pitot probe 201 is disposed in emission stack 235 that is disposed on and in fluid communication with emission source 243. Emission source 243 can be a refinery, combustion chamber, chemical processor, and the like that produces emissions that are communicated to emission stack 235 as gas flow 206 that can include particulates, gas, liquid, or a combination thereof. Emission stack 235 has a stack axis along which gas flow 206 flows away from emission source 243 and includes flange 236 that provide a fixed height test point at height H from emission source 243 for disposing non-nulling pitot probe 201 in emission stack 235. Aerodynamic flow head 207 is selectively positioned at various radial locations, as measured from the stack axis centerline of emission stack 235, such as first radial position R1, second radial position R2, and the like. A number of radial positions can be selected to provide a full characterization of gas velocity parameters 216 of gas flow 206 throughout emission stack 235 at height H. It should be appreciated that non-nulling pitot probe 201 is constructed and configured so that non-nulling pitot probe 201 fully characterizes gas velocity parameters 216 of gas flow 206 in absence of rotating non-nulling pitot probe 201 in emission stack 235. Instead of rotating non-nulling pitot probe 201 to obtain data for determination of gas velocity parameters 216, central entrant aperture 238 of non-nulling pitot probe 201 can be aligned to be parallel to stack axis of emission stack 235. In case of disposition of non-nulling pitot probe 201 with central entrant aperture 238 of non-nulling pitot probe 201 not aligned parallel to stack axis of emission stack 235, data from non-nulling pitot probe 201 can be corrected to account for the angle at which non-nulling pitot probe 201 is disposed relative to the stack axis.

Figure 9:
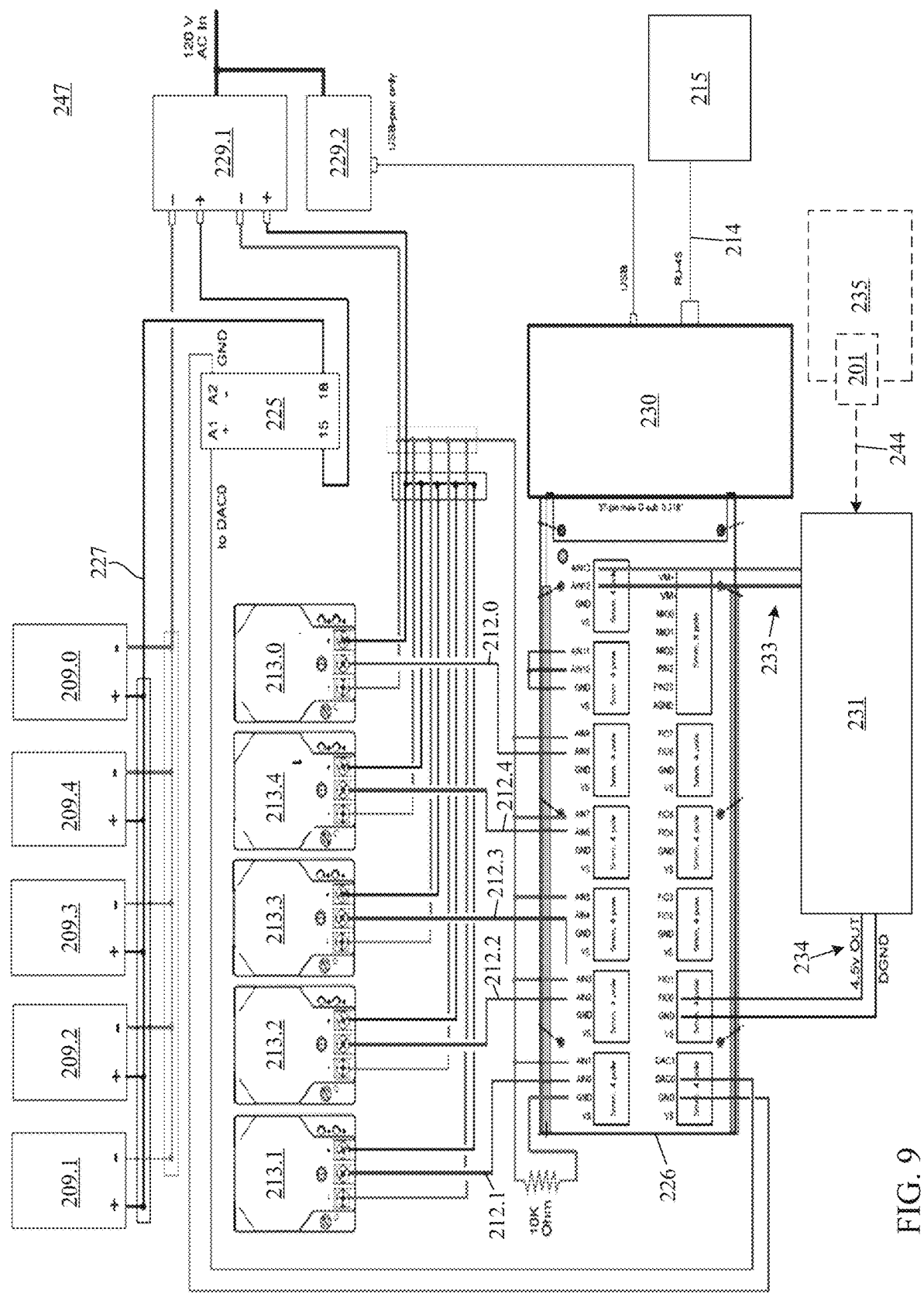
FIG. 9 shows a configuration of gas valve and differential pressure transducer for a non-nulling gas velocity measurement apparatus.
Figure 10:
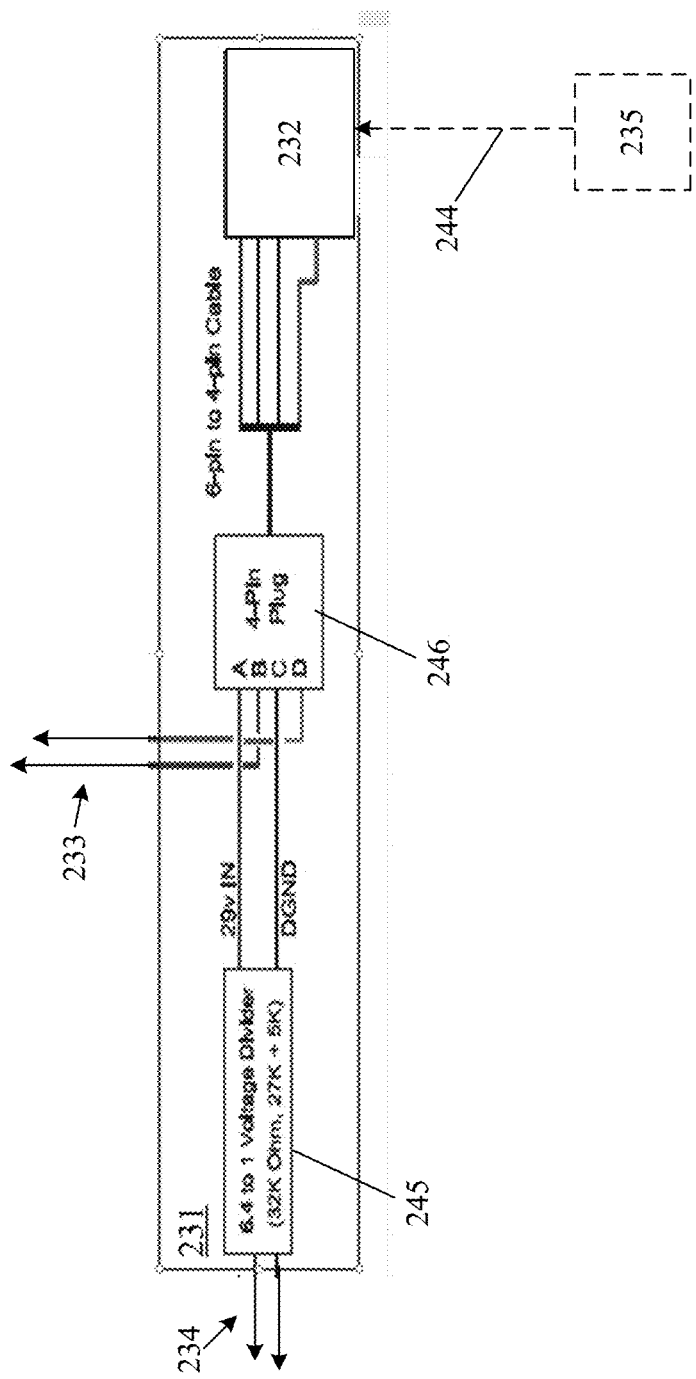
FIG. 10 shows a switcher for communication with controller in a non-nulling gas velocity measurement apparatus.

In an embodiment, with reference to FIG. 9, FIG. 10, and FIG. 11, control system 247 provides data acquisition and control and interface of components of non-nulling gas velocity measurement apparatus 200. Control system 247 receives stack signal 244 from non-nulling pitot probe 201 that can be disposed in emission stack 235. Stack signal 244 provides electrical signals, e.g., voltages, that indicate whether emission stack 235 is subject to purge such that gas valve 209 should isolate non-nulling pitot probe 201 from differential pressure transducer 213 as well as a radial position of aerodynamic flow head 207 of non-nulling pitot probe 201 in emission stack 235. Control system 247 includes switcher 231 that receives stack signal 244 from non-nulling pitot probe 201 or emission stack 235 and splits stack signal 244 into stack radial position signal 233 and purge signal 234. It should be appreciated that stack signal 244 can be produced by a user or automated process, e.g., by a mechanical, electrical, or optical system. Stack radial position signal 233 indicates the radial position of aerodynamic flow head 207 of non-nulling pitot probe 201 in emission stack 235, wherein stack radial position signal 233 can be an analog voltage from 0 volts (V) to 10 V. Non-nulling pitot probe 201 can be positioned, e.g., at a minimum of four radial positions per quadrant of emission stack 235. Purge signal 234 indicates whether emission stack 235 is subject to purge so that gas valve 209 can isolate non-nulling pitot probe 201 from differential pressure transducer 213, wherein purge signal 234 can be a digital voltage such as a 5 VDC digital signal that indicates to connected non-nulling pitot probe 201 via gas valve 209 to differential pressure transducer 213 such that a signal HI indicates a condition that is safe to connect differential pressure signal 214 to non-nulling pitot probe 201, and a signal LOW indicates a condition isolate non-nulling pitot probe 201 from differential pressure signal 214 by gas valve 209, as controlled by valve control signal 227. In an embodiment, with reference to FIG. 10, switcher 231 includes data receiver 232 that receives stack signal 244, e.g., by a receptacle for receipt of a cable or other electrical signal communication medium and sends stack signal 244 to signal splitter 246. Signal splitter 246 splits stack signal 244 into stack radial position signal 233 and is in electrical communication with voltage divider 245 that produces purge signal 234.

Control system 247 also can include controller 226 in electrical communication with switcher 231. Controller 226 includes various electrical components that receive and handle electrical signals and process instructions. Controller 226 can be a data acquisition card or similar device for electrically interfacing with the various components of control system 247. Controller 226 receives purge signal 234 from switcher 231 and controls electronic relay 225 to produce valve control signal 227 that is communicated to gas valve 209. Electronic relay 225 receives electrical power from power supply 229, and the electrical power is switchably transmitted by electronic relay 225 to gas valve 209 to select reference flow configuration or sample flow configuration of individual gas valves 209. Controller 226 receives valve-selected gas 212 from differential pressure transducer 213. Differential pressure transducer 213 is powered by power supply 229. Controller 226 collates and communicates signals including the radial position of non-nulling pitot probe 201 in emission stack 235, the purge status of emission stack 235, differential pressure signal 214, and the like to communication interface 230. Communication interface 230 can be a computer interface bus that provides connection points for electrical communication cabling between controller 226 and analyzer 215. Analyzer 215 receives data, including differential pressure signal 214 from communication interface 230 and determines gas velocity parameters 216 that include turbulence intensity, velocity vector, static pressure, or density of gas flow 206 from such data. Analyzer 215 can include a computer processor, field programmable gate array, and the like that can perform data manipulation according to electronic circuitry configuration or instructions, e.g., from computer code, executable program, or program script. Analyzer 215 can receive data via communication line 218, which can be a hardwire or wireless electronic or optical communication line.

Non-nulling gas velocity measurement apparatus 200 and non-nulling pitot probe 201 can be made in various ways. It should be appreciated that non-nulling gas velocity measurement apparatus 200 includes a number of optical, electrical, or mechanical components, wherein such components can be interconnected and placed in communication (e.g., optical communication, electrical communication, mechanical communication, and the like) by physical, chemical, optical, or free-space interconnects. The components can be disposed on mounts that can be disposed on a bulkhead for alignment or physical compartmentalization. As a result, non-nulling gas velocity measurement apparatus 200 can be disposed in a terrestrial environment or space environment.

In an embodiment, a process for making non-nulling gas velocity measurement apparatus 200 includes: connecting non-nulling pitot probe 201 in communication with gas valve 209 by durable, flexible rubber tubing with air-tight and vibration-resistant connectors; connecting gas valve 209 in communication with reference pressure source 210 by flexible rubber or plastic tubing with air-tight and vibration resistant connectors; connecting reference pressure source 210 in communication with differential pressure transducer 213 by flexible rubber or plastic tubing with air-tight and vibration-resistant connectors; connecting gas valve 209 in communication with differential pressure transducer 213 by flexible rubber or plastic tubing with air-tight and vibration-resistant connectors; connecting solid-state relay 225 in communication with controller 226 by a 5 vdc digital control line; connecting solid-state relay 225 in communication with gas valve 209 by 24 vdc wiring providing an energizing voltage to switch the gas valve 209 state; and connecting controller 226 to analyzer 215 by USB or ethernet line 214 through communication interface 230. The process also can include connecting analyzer 215 in communication with differential pressure transducer 213 by insulated copper twisted-pair wiring.

In an embodiment, a process for making non-nulling pitot probe 201 includes providing a stock material for entrant body tube 203, extensor body tube 204, and aerodynamic flow head 207, wherein such components can be formed from a same piece of material or separate pieces; forming entrant body tube 203, extensor body tube 204, and aerodynamic flow head 207 from the stock material by removing excess material such as by machining that can include using a lathe or CNC; and forming pressure channel 205 in entrant body tube 203, extensor body tube 204, and aerodynamic flow head 207 by drilling.

Figure 13:
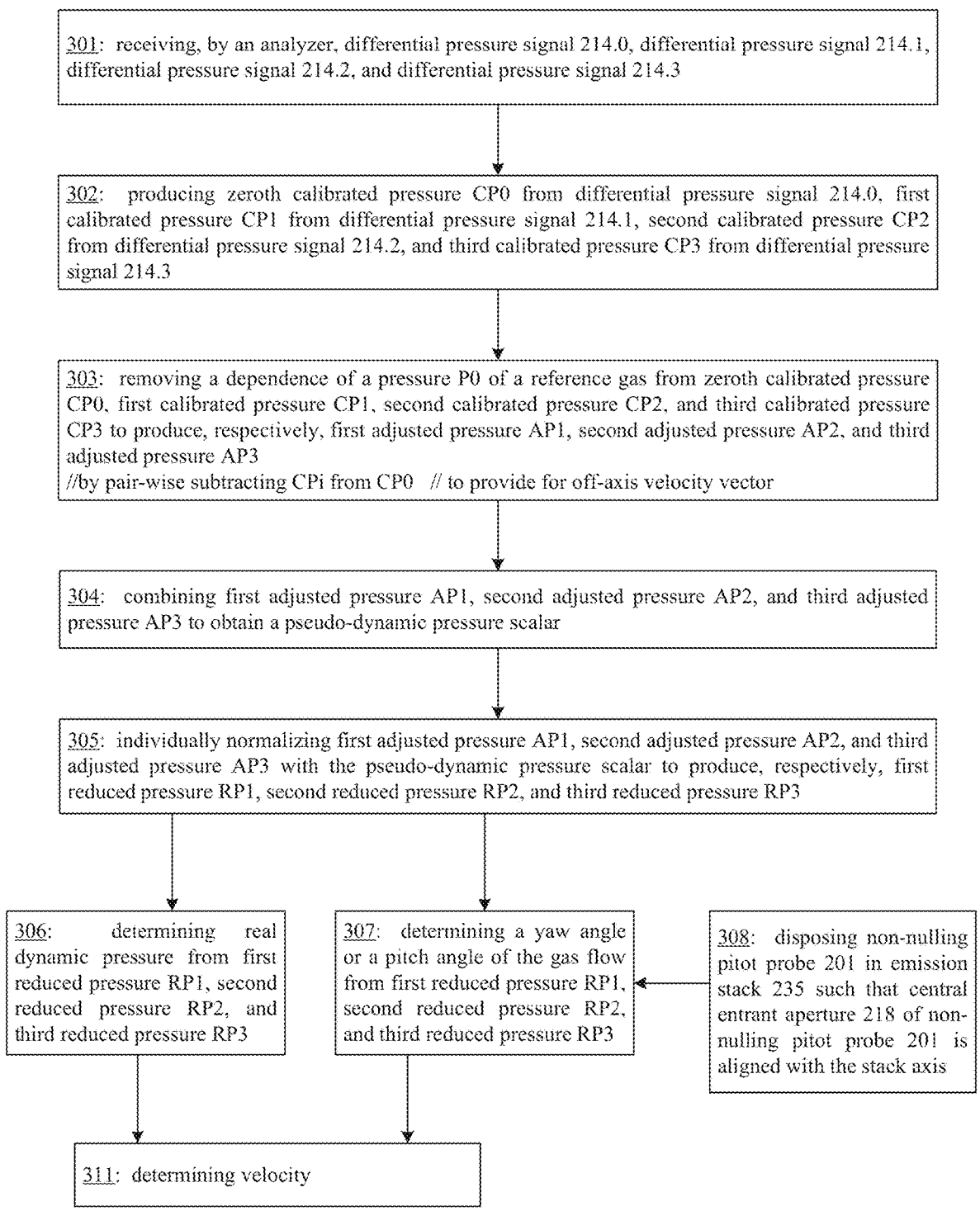
FIG. 13 shows steps in a process for performing non-nulling measurement of gas velocity parameters.
Figure 14:
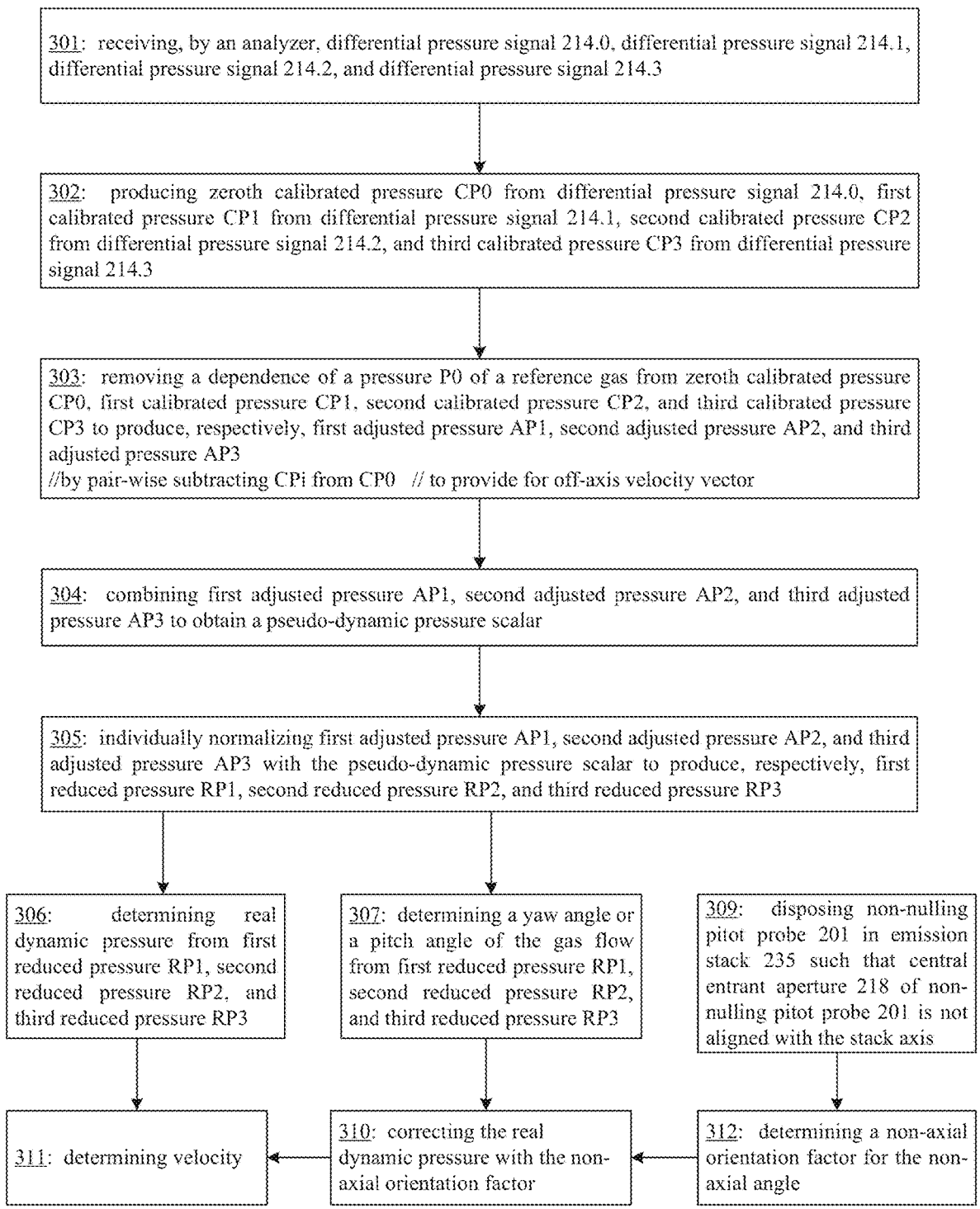
FIG. 14 shows steps in a process for performing non-nulling measurement of gas velocity parameters.

Non-nulling gas velocity measurement apparatus 200 has numerous advantageous and unexpected benefits and uses. In an embodiment, with reference to FIG. 12, FIG. 13, and FIG. 14, a process for performing non-nulling measurement of gas velocity parameters includes: receiving, by an analyzer, after converting measured voltages into scaled pressure units, a zeroth differential pressure signal 214.0, first differential pressure signal 214.1, a second differential pressure signal 214.2, and third differential pressure signal 214.3; producing a zeroth calibrated pressure CP0 from the zeroth differential pressure signal 214.0, a first calibrated pressure CP1 from the first differential pressure signal 214.1, a second calibrated pressure CP2 from the second differential pressure signal 214.2, and a third calibrated pressure CP3 from the third differential pressure signal 214.3 by calibrated measurement corrections specific to each differential pressure sensor; removing a dependence of a reference gas pressure P0 of a reference gas 211 from the zeroth calibrated pressure CP0, the first calibrated pressure CP1, the second calibrated pressure CP2, and the third calibrated pressure CP3 to produce, respectively, a first adjusted pressure AP1, a second adjusted pressure AP2, and a third adjusted pressure AP3 by subtracting CP1 from CP0 to obtain the value AP1, subtracting CP2 from CP0 to obtain the value AP2, and subtracting CP3 from CP0 to obtain the value AP3; combining the first adjusted pressure AP1, the second adjusted pressure AP2, and the third adjusted pressure AP3 to obtain a pseudo-dynamic pressure scalar by taking the square root of the sum of the squares of AP1, AP2, and AP3; individually normalizing the first adjusted pressure AP1, the second adjusted pressure AP2, and the third adjusted pressure AP3 with the pseudo-dynamic pressure scalar to produce, respectively, a first reduced pressure RP1, a second reduced pressure RP2, and a third reduced pressure RP3 by dividing AP1 by the pseudo-dynamic pressure to get RP1, dividing AP2 by the pseudo-dynamic pressure to get RP2, dividing AP3 by the pseudo-dynamic pressure to get RP3; determining a real dynamic pressure from the first reduced pressure RP1, the second reduced pressure RP2, and the third reduced pressure RP3 by applying the NN algorithm based on a second degree (or higher) polynomial of three or more variables using calibration coefficients for reduced real dynamic pressure to obtain a reduced real dynamic pressure, wherein the reduced real dynamic pressure is then multiplied by the pseudo-dynamic pressure and the turbulence factor to get the real dynamic pressure; determining a yaw angle or a pitch angle of the gas flow from the first reduced pressure RP1, the second reduced pressure RP2, and the third reduced pressure RP3; and determining velocity of gas flow 206 from the real dynamic pressure by applying the NN algorithm based on a second degree (or higher) polynomial of three or more variables using calibration coefficients for either yaw or pitch, respectively to perform non-nulling measurement of gas velocity parameters.

In an embodiment, performing non-nulling measurement of gas velocity parameters also includes disposing non-nulling pitot probe 201 in emission stack 235 such that central entrant aperture 238 of non-nulling pitot probe 201 is aligned with a stack axis of emission stack 235; non-nulling pitot probe 201 including: aerodynamic flow head 207 including a plurality of entrant apertures 202 that includes central entrant aperture 238 and a plurality of peripheral entrant apertures 239 arranged radially from central entrant aperture 238, peripheral entrant aperture 239 including first peripheral entrant aperture 239.1, second peripheral entrant aperture 239.2, and third peripheral entrant aperture 239.3; entrant body tube 203 disposed on aerodynamic flow head 207; extensor body tube 204 disposed on entrant body tube 203 such that entrant body tube 203 is interposed between aerodynamic flow head 207 and extensor body tube 204, such that extensor body tube 204 is arranged at an oblique angle to entrant body tube 203; and a plurality of pressure channels 205 disposed in aerodynamic flow head 207, entrant body tube 203, and extensor body tube 204, such that each entrant aperture 202 is separately and independently in fluid communication with one of pressure channels 205, and each pressure channel 205 independently receives and communicates gas flow 206 as stagnant gas 208 from entrant aperture 202 of which pressure channel 205 is in communication; receiving, by entrant apertures 202, gas flow 206; producing, by central entrant aperture 238, a zeroth stagnant gas 208.0 from the gas flow 206; producing, by first peripheral entrant aperture 239.1, first stagnant gas 208.1 from gas flow 206; producing, by second peripheral entrant aperture 239.2, second stagnant gas 208.2 from gas flow 206; producing, by third peripheral entrant aperture 239.3, third stagnant gas 208.3 from gas flow 206; and obtaining zeroth differential pressure signal 214.0, first differential pressure signal 214.1, second differential pressure signal 214.2, and third differential pressure signal 214.3 respectively from zeroth stagnant gas 208.0, first stagnant gas 208.1, second stagnant gas 208.2, and third stagnant gas 208.3.

In an embodiment, performing non-nulling measurement of gas velocity parameters includes disposing non-nulling pitot probe 201 in emission stack 235 such that central entrant aperture 238 of non-nulling pitot probe 201 is not aligned with a stack axis of emission stack 235, non-nulling pitot probe 201 including: aerodynamic flow head 207 including a plurality of entrant apertures 202 that includes central entrant aperture 238 and a plurality of peripheral entrant apertures 239 arranged radially from central entrant aperture 238, peripheral entrant aperture 239 including first peripheral entrant aperture 239.1, second peripheral entrant aperture 239.2, and third peripheral entrant aperture 239.3; entrant body tube 203 disposed on aerodynamic flow head 207; extensor body tube 204 disposed on entrant body tube 203 such that entrant body tube 203 is interposed between aerodynamic flow head 207 and extensor body tube 204, such that extensor body tube 204 is arranged at an oblique angle to entrant body tube 203; and a plurality of pressure channels 205 disposed in aerodynamic flow head 207, entrant body tube 203, and extensor body tube 204, such that each entrant aperture 202 is separately and independently in fluid communication with one of pressure channels 205, and each pressure channel 205 independently receives and communicates gas flow 206 as stagnant gas 208 from entrant aperture 202 of which pressure channel 205 is in communication; receiving, by entrant apertures 202, gas flow; producing, by central entrant aperture 238, zeroth stagnant gas 208.0 from gas flow; producing, by first peripheral entrant aperture 239.1, first stagnant gas 208.1 from gas flow 206; producing, by second peripheral entrant aperture 239.2, second stagnant gas 208.2 from gas flow 206; and producing, by third peripheral entrant aperture 239.3, third stagnant gas 208.3 from gas flow 206; and obtaining zeroth differential pressure signal 214.0, first differential pressure signal 214.1, second differential pressure signal 214.2, and third differential pressure signal 214.3 respectively from zeroth stagnant gas 208.0, first stagnant gas 208.1, second stagnant gas 208.2, and third stagnant gas 208.3, e.g., by transducing an electrical signal from a mechanical deflection of a diaphragm in the differential pressure transducer 213 caused by a change in the differential pressure across the diaphragm.

In an embodiment, performing non-nulling measurement of gas velocity parameters includes determining a non-axial orientation factor for a non-axial angle with respect to the stack axis at which non-nulling pitot probe 201 is disposed in emission stack 235. Here, adjusted pressures (AP1, ..., APN) are mapped into turbulence intensity corrected dynamic pressures, yaw angle, pitch angle, and static pressure. The mapping is accomplished using an $N^{th}$-degree multivariable polynomial having reduced pressures (RP1, RP2, and the like) as independent variables.

Pseudo-dynamic pressure is a root-sum-square of the adjusted pressures (AP1, ..., APN). For definiteness, the pseudo dynamic pressure and outputs (e.g., dynamic pressure, yaw angle, pitch angle, and static pressure) for a probe with four exterior pressure ports (e.g., 202.1, 202.2, 202.3, and 202.4) surrounding central entrant aperture 202.0 is $$\hat{P}_{dyn} = \sqrt{P_{12}^2 + P_{13}^2 + P_{14}^2 + P_{15}^2}.$$

Reduced pressures are obtained by normalizing each adjusted pressure $\hat{P}_{1k} = P_{1k}/\hat{P}_{dyn}$ by the pseudo dynamic pressure for k=2, 3, 4, and 5. The adjusted pressures are $x_1 = P_{12}$, $x_2 = P_{13}$, $x_3 = P_{14}$, and $x_4 = P_{15}$, and the reduced pressures are $\hat{x}_1 = \hat{P}_{12}$, $\hat{x}_2 = \hat{P}_{13}$, $\hat{x}_3 = \hat{P}_{14}$, and the like.

Scalar output variables are $\psi_i$, wherein subscript i=1 to 4 specifies dynamic pressure when i=1; the yaw angle when i=2; the pitch angle when i=3; and the static pressure when i=4. The outputs $\psi_i$ are determined by an $N^{th}$ degree polynomial of the 4 reduced pressures $$\psi_i = \left( \sum_{q_1=0}^{Q_1} \sum_{q_2=0}^{Q_2} \sum_{q_3=0}^{Q_3} \sum_{q_4=0}^{Q_4} a_{q_1 q_2 q_3 q_4, i} \hat{x}_1^{q_1} \hat{x}_2^{q_2} \hat{x}_3^{q_3} \hat{x}_4^{q_4} \right)(1 + \delta_{i1}(c_0 + c_1 Tu^2)) -$$

-continued $$(CP0 + P_{ref})\delta_{i4}$$

wherein $\delta_{ij}$ is the Kronecker delta function defined by $$\delta_{ij} = \begin{cases} 1 & i = j \\ 0 & i \neq j \end{cases},$$

$a_{q_1 q_2 q_3 q_4, i}$ are polynomial coefficients determined by curve fits to wind tunnel data for each $\psi_i$, and $Q_k$ are upper limits of respective summations wherein $$Q_k = N - (\delta_{k4})q_3 - (\delta_{k4} + \delta_{k3})q_2 - (\delta_{k4} + \delta_{k3} + \delta_{k2})q_1$$

so that $Q_4 = N - q_3 - q_2 - q_1$, $Q_3 = N - q_2 - q_1$, $Q_2 = N - q_1$, and $Q_1 = N$.

The effect of turbulent flow on the velocity is accounted for in the dynamic pressure $\psi_1$ by multiplying the $N^{th}$ degree polynomial by a single variable function of turbulence intensity (Tu), wherein $c_0$ and $c_1$ are fit coefficients to wind tunnel data. The turbulence intensity of the flow is measured independent of this analysis. Static pressure $\psi_4$ includes the difference between the static pressure and the central pressure port (202.0) determined by $N^{th}$ degree polynomial; the difference between the central port and the reference pressure, i.e., CP0; and the reference pressure, reference pressure source 210 as $P_{ref}$.

The analysis can be extended to M≥3 variables by defining the outputs $\psi_i$ by $$\psi_i = \left( \sum_{q_1=0}^{Q_1} \sum_{q_2=0}^{Q_2} \cdots \sum_{q_M=0}^{Q_M} a_{q_1 q_2 \cdots q_M, i} \hat{x}_1^{q_1} \hat{x}_2^{q_2} \cdots \hat{x}_M^{q_M} \right)$$

$$(1 + \delta_{i1}(c_0 + c_1 Tu^2)) - (CP0 + P_{ref})\delta_{i4}$$

wherein upper limits of the summations are defined by $$Q_M = N - (\delta_{kM})q_{M-1} - (\delta_{kM} + \delta_{kM-1})q_{M-2} - \cdots - \sum_{m=3}^{M} \delta_{km} q_2 - \sum_{m=2}^{M} \delta_{km} q_1$$

and the Pseudo dynamic pressure is $$\hat{P}_{dyn} = \sqrt{\sum_{m=1}^{M} x_m^2}.$$

In an embodiment, performing non-nulling measurement of gas velocity parameters includes correcting the real dynamic pressure with the non-axial orientation factor prior to determining the velocity of gas flow 206, wherein the axial velocity is determined by $$V_{axial} = \sqrt{\frac{2\psi_1}{\rho}} \cos(\psi_2)\cos(\psi_3)$$

such that fluid density ρ is determined using an appropriate equation of state using as inputs static pressure $\psi_4$ and temperature of gas flow 206. In stack measurements, conventional EPA protocols have been established for determining $\rho$ given $\psi_4$ and temperature.

Coefficients $a_{q_1q_2q_3q_4,i}$ are determined by fitting wind tunnel data to the polynomial for each output $\psi_i$. Sufficient wind tunnel data are collected as a function of pitch, yaw, airspeed, and turbulence intensity and the degree of the polynomial for the intended application. For stack applications using a 5-port probe (i.e., 4 exterior ports and 1 central port 202), 500 wind tunnel points can specify about 100 coefficients for a $5^{th}$ degree polynomial fit.

Non-nulling gas velocity measurement apparatus 200 and processes disclosed herein have numerous beneficial uses including robust, faster and more accurate emissions measurements as described below. Advantageously, non-nulling gas velocity measurement apparatus 200 overcomes limitations and technical deficiencies of conventional devices and conventional processes. It should be appreciated that non-nulling pitot probe 201 overcomes clogging issues of conventional pitot probes in a way that has heretofore been taught away such as in U.S. Pat. No. 5,423,209 that teaches that conventional multi-hole spherical pitot tube probe includes pressure holes for detecting the direction of wind that constitute small holes in four directions of the spherical surface. Further, this patent teaches that if the pressure hole is only one small hole, in the case where even one hole becomes clogged with insects, a cloud of dust and so on, the probe possibly fails to function. This patent also teaches that in the multi-hole spherical pitot tube probe described in the patent, the arrangement of pressure holes on the curved surface for detecting the direction of wind and the diameter of holes influence on the accuracy of detection of wind-direction. That patent concludes that, if the hole diameter is large, an error in pressure detection increases, thus posing a problem in that the hole diameter cannot be made large in order to prevent clogging.

Advantageously, non-nulling fluid velocity measurement apparatus 200, non-nulling pitot probe 201, and processes herein provide multi-hole pitot probes that involve a non-nulling method, i.e., no need to rotate non-nulling pitot probe 201, to measure the static pressure, the entire velocity vector and the turbulence intensity of fluid flow. Non-nulling pitot probe 201 provide better accuracy than EPA-sanctioned probes and measurements can be performed much faster than conventional probes, resulting in significant financial savings for powerplants, more accurate hazardous emissions measurements for the general public. The fluid velocity is calculated from measurements of the turbulence intensity in conjunction with differential pressure measurements. Performing non-nulling measurement of gas velocity parameters can be applied to typical and extreme stack conditions. Geometric features of include shape, hole size, and hole location that are provide robust and accurate velocity measurements in harsh stack conditions, e.g., high temperatures, solid and liquid impurities in the flue gas, highly 3-D dimensional velocity field, high turbulence intensities, and the like.

Beneficially, has a selected geometry of multi-holes, i.e., entrant apertures 202. Performing non-nulling measurement of gas velocity parameters includes calculation of 3-D velocity and turbulence intensity from differential pressure measurements at EPA-compliant locations in emission stack 235. Non-nulling gas velocity measurement apparatus 200 includes hardware to measure differential pressures. The hardware can acquire data, e.g., at two acquisition rates including a slow rates (e.g., 10 Hz) for accurate 3D velocity determination or a fast rate (e.g., 1.0 kHz) for turbulence intensity measurements. The hardware is compatible with standard probe purging methods used by stack testing industry. Electronics and software for data analysis and calculations in real time are included in non-nulling gas velocity measurement apparatus 200. Further, performing non-nulling measurement of gas velocity parameters includes calibration of 3-D probes in a wind tunnel that corrects for turbulence and blockage effects.

Conventional flow monitors that measure hazardous emissions from powerplant smokestacks are calibrated annually using EPA-sanctioned pitot probes. These conventional probes measure the flue gas velocity at prescribed points along two orthogonal, diametric chords in a cross-section of the stack. Conventionally, the flow is calculated by averaging the axial velocity components and multiplying this result by the stack cross-sectional area. Conventionally, velocities are determined using a nulling method, which requires rotating the conventional probe about its axis to align an impact pressure port with two components of the velocity vector. Once the conventional probe is oriented at the null angle, the measured pressure differences between the pressure ports are combined with other data to calculate the gas velocity.

Beneficially, non-nulling pitot probe 201 measures velocity faster and more accurately than conventional EPA-sanctioned probes and perform better in performing non-nulling measurement of gas velocity parameters than conventional EPA-sanctioned spherical probe. Stack flow monitors can be calibrated in ⅕th the time, not including setup time, using non-nulling pitot probe 201 instead of a conventional EPA-sanctioned probe. The time savings provided by non-nulling pitot probe 201 reduces the time a power plant must operate at loads dictated by EPA test protocol and increases the time the plant can operate at profitable loads, based on customer demand. Further, non-nulling pitot probe 201 is superior to conventional EPA-sanctioned probes because non-nulling pitot probe 201 has better reliability and accuracy. Entrant aperture 202 Of non-nulling pitot probe 201 can be, e.g., three to six 3 to 6 times larger than ports in conventional EPA-sanctioned probes and mitigate erroneous velocity measurements due to port plugging from particles or water droplets in gas flow 206 such as flue gas. Non-nulling pitot probe 201 avoids errors resulting from imperfect execution of conventional nulling methods. The complex, turbulent velocity fields in smokestacks may inaccurately measure the null angle, which can result in unquantified errors in the velocity measurement. Non-nulling pitot probe 201 can include a correction to the measured velocity from the turbulent intensity of gas flow 206. Ignoring this correction, such as in conventional nulling procedures, can lead to over-estimating stack emissions by 5%, when the turbulence intensity is 10%.

Non-nulling gas velocity measurement apparatus 200 and processes herein unexpectedly provides accurate 3-D velocity measurements including the turbulence intensity, accurate static pressure, reduced measurement time by a factor of 5 (or more) greater accuracy than conventional devices and processes, and minimizes clogging the probe pressure ports. The result being accurate flow measurements in harsh stack conditions, which could not be obtained with currently used probes and methods.

The articles and processes herein are illustrated further by the following Examples, which are non-limiting.

EXAMPLES

Example 1. Faster, More Accurate, Stack-Flow Measurements

Exhaust flows from coal-fired electricity-generating plants are determined by averaging flue gas velocities measured at prescribed points in the stack cross section. These velocity measurements are made using EPA-approved differential pressure probes such as the 2-hole S-probe or the 5-hole spherical probe. Measurements using the more accurate 5-hole spherical probes require a time-consuming rotation (or nulling) of the probe to find the yaw angle. We developed a time-saving non-nulling technique using a spherical probe that measures all 3 components of velocity and therefore provides better accuracy than an S-probe. We compared the non-nulling technique with the EPA Method 2F nulling technique at both high (16 m/s) and low (7 m/s) loads in a coal-fired powerplant smokestack. Their excellent mutual agreement (within 0.3% of the flow) demonstrates that the non-nulling technique accurately measures flue gas flows.

Greenhouse gases and other pollutants from coal-fired power plants (CFPPs) are quantified by continuous emission monitoring systems (CEMS) permanently installed in exhaust stacks. CEMS equipment measures the concentration of each pollutant as well as the total flow. The accuracy of CEMS flow monitors are evaluated following an EPA procedure known as a relative accuracy test audit (RATA). Flow RATAs are performed using any of 3 EPA approved differential-pressure (pitot) probes along with their corresponding protocols including EPA Method 2, Method 2F, Method 2G, and Method 1 (EPA 2017c, 2017d, 2017e, 2017f).

Figure 15:
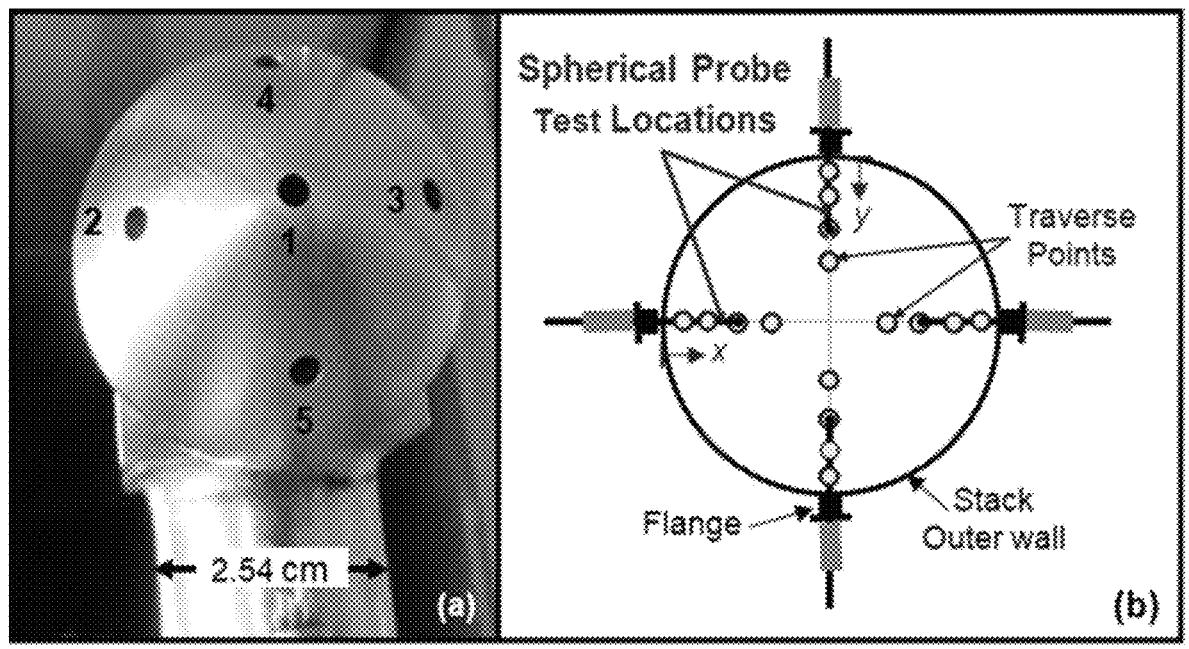
FIG. 15 shows a spherical probe in panel A and test configuration in panel B.

In this example, we present a non-nulling flow RATA procedure that can reduce RATA measurement times and simultaneously increase their accuracy. We developed the Non-Nulling Method using conventional spherical probes. FIG. 15A shows a spherical probe. We tested the Non-Nulling Method by performing a 16-point flow RATA in the exhaust stack of a CFPP as illustrated in FIG. 15B. The average axial velocity measured by the Non-Nulling Method $V_{NN}$ was compared to $V_{M2F}$, the average axial velocity determined using the EPA-approved Method 2F nulling protocol. We compared $V_{NN}$ with $V_{M2F}$ at two average stack velocities (16 m/s and 7 m/s) corresponding to the power plant's high and low loads. We found excellent mutual agreement between the Method 2F and the non-nulling average velocities; the differences were less than $100|V_{M2F}/V_{NN}-1|<0.3\%$.

For several decades, S-probes have been differential pressure probes for flow RATAs. These probes continue to be used even though they can overpredict the flow by as much as 10% or more when non-axial velocity components are significant. EPA-approved five-hole probes (such as the spherical probe in FIG. 15A) can provide better accuracy, but they are rarely used because flow RATAs conducted with these probes are more costly and, in many cases, more time-consuming than RATAs performed with S-probes. In CFPPs that have wet scrubbers, an S-probe RATA using Method 2 (EPA 2017c) or Method 2G (EPA 2017e) is generally less time consuming than a 5-hole probe RATA since the 2 pressure ports on the S-probe are larger and do not plug as frequently as the smaller ports on the 5-hole spherical probe. In any case, whether one uses an S-probe to measure 2 components of velocity vector at each traverse point (EPA 2017e) or a 5-hole probe to measure the entire velocity vector (EPA 2017d), a significant fraction of the measurement time is spent rotating the probe about its axis searching for the null condition. The null condition is satisfied when the differential pressure between two of the probe's ports is zero. For example, a five-hole probe must be rotated about its axis until the differential pressure between ports 2 and 3 is zero. When $P_{23}=0$, all three velocity components can be determined from measuring the differential pressures between other ports on the spherical probe as specified in Method 2F (EPA 2017d). Because all the velocity components are measured, the result is more accurate than the S-probe. However, finding the null condition can take several minutes at each traverse point, especially in stacks with significant yaw and/or in wet stacks that require frequent purging of the spherical probe's 5 pressure ports to remove water droplets and particulates. In this example, we show that the Non-Nulling Method accurately determines the axial velocity without rotating the probe. Therefore, non-nulling measurements are faster than corresponding Method 2F measurements, but with comparable (or probably better) accuracy.

The accuracy of the Non-Nulling Method was previously demonstrated in a Scale Model Smokestack Simulator (SMSS). The SMSS facility uses air as a surrogate for flue gas and generates asymmetric swirling flows in its 1.2 m diameter test section. Yaw-null angles are almost 40° near the wall. A key element of the SMSS facility is that flow measurements are traceable to NIST primary standards. A NIST-calibrated flow meter installed in an upstream section of piping (that is not subjected to the flow distortions present in the test section) measures the flow at a 0.7% uncertainty. Unless otherwise stated, all uncertainties in this paper are expanded standard uncertainties with coverage factor k=2 corresponding to a 95% confidence limit. By comparing the Non-Nulling Method to the calibrated flow meter, we found agreement of 0.8%.

The measurements described in this example demonstrate that the Non-Nulling Method agrees with the EPA-approved Method 2F (EPA 2017d) in the harsh conditions of a CFPP stack. To provide a rigorous test of the Non-Nulling Method we intentionally selected a CFPP known to have a complex velocity field in its stack. The selected stack's RATA measurement platform was only 3.8 stack diameters (D=6.8 m) downstream of a 90° elbow. Moreover, upstream of the elbow, flow from two wet scrubbers merged into a single stream. The velocity profile at the measurement platform was skewed and had large negative yaw-null angles of nearly −30° at the stack wall. To add to this complexity, repeated flow RATAs showed spatially localized transients at certain traverse points that were characterized by changes of 10% or more in the axial velocity. Because the Non-Nulling Method provided accurate results for these challenging measurement conditions, we expect it will also perform well in stacks with less complicated velocity fields.

With regard to calculating the spatially averaged axial velocity in the stack, FIG. 15B is a diagram the stack cross-section used for the flow RATA. A spherical probe was installed in each of four flanges on the wall of the stack. As illustrated in the figure, each probe measures the axial velocity $V_{axial,n}$ of the four points on its radius. (The adjacent radii are at right angles to each other.) The traverse points are located at the centroids of equal area so that the average RATA velocity is determined by the arithmetic mean of the N=16 axial velocity measurements, $$V_{RATA} = \frac{1}{N}\sum_{n=1}^{N} V_{axial,n}. \tag{1}$$

The desired volumetric flow is $V_{RATA}$ multiplied by the stack's cross-sectional area. We used the spatially averaged axial velocity $V_{RATA}$ to compare Method 2F with the Non- Nulling Method. Although errors in the cross-sectional area impact the calculated volumetric flow and its uncertainty budget, the cross-section area was the same for both methods so that the comparison is not sensitive to it.

The axial velocity at each point was determined using a modified version of the Bernoulli equation $$V_{axial} = \sqrt{\frac{2P_{dyn}}{\rho}} \cos(\beta_{null} - \beta_0)\cos(\alpha). \quad (2)$$

Here, $P_{dyn}$ is the dynamic pressure (equal to the flue gas's kinetic energy per unit volume); $\alpha$ is the pitch angle, which is non-zero when the flue gas has a component of velocity along the spherical probe's ports 4 and 5 (FIG. 15A); $\beta_{null}$ is the yaw-null angle, which is non-zero when the flue gas has a component of velocity directed along ports 2 and 3; $\rho$ is the mass density of flue gas; and $\beta_0$ is a parameter that was determined during each probe's calibration to account for any yaw angle misalignment (or offset). A misalignment occurs when the yaw angle corresponding to $P_{23}=0$ differs from the zero-yaw angle marking (or scribe line) on the probe.

To implement Method 2F, we developed probe calibration curves that determine $P_{dyn}$ and $\alpha$ as a function of other differential pressure measurements after $\beta_{null}$ has been determined by the nulling procedure. In contrast, for the Non-Nulling Method we develop calibration curves for $P_{dyn}$, $\beta_{null}$, and $\alpha$ in the wind tunnel that can be applied without nulling the probe. For both the Non-Nulling Method and Method 2F, the same procedures were used to determine $\rho$ and $\beta_0$ in eq 2. The values of $\beta_0$ for each probe are determined during calibration and remain fixed throughout the flow RATA.

With regard to probe calibrations for non-nulling and Method 2F, we calibrated each of the 4 spherical probes in the wind tunnel in accordance with Method 2F and the Non-Nulling Method. Probes were installed in the wind tunnel's rectangular cross-section (1.5 m wide by 1.2 m high) and calibrated one at a time against NIST's Laser Doppler Anemometer (LDA) working standard.

Figure 16:
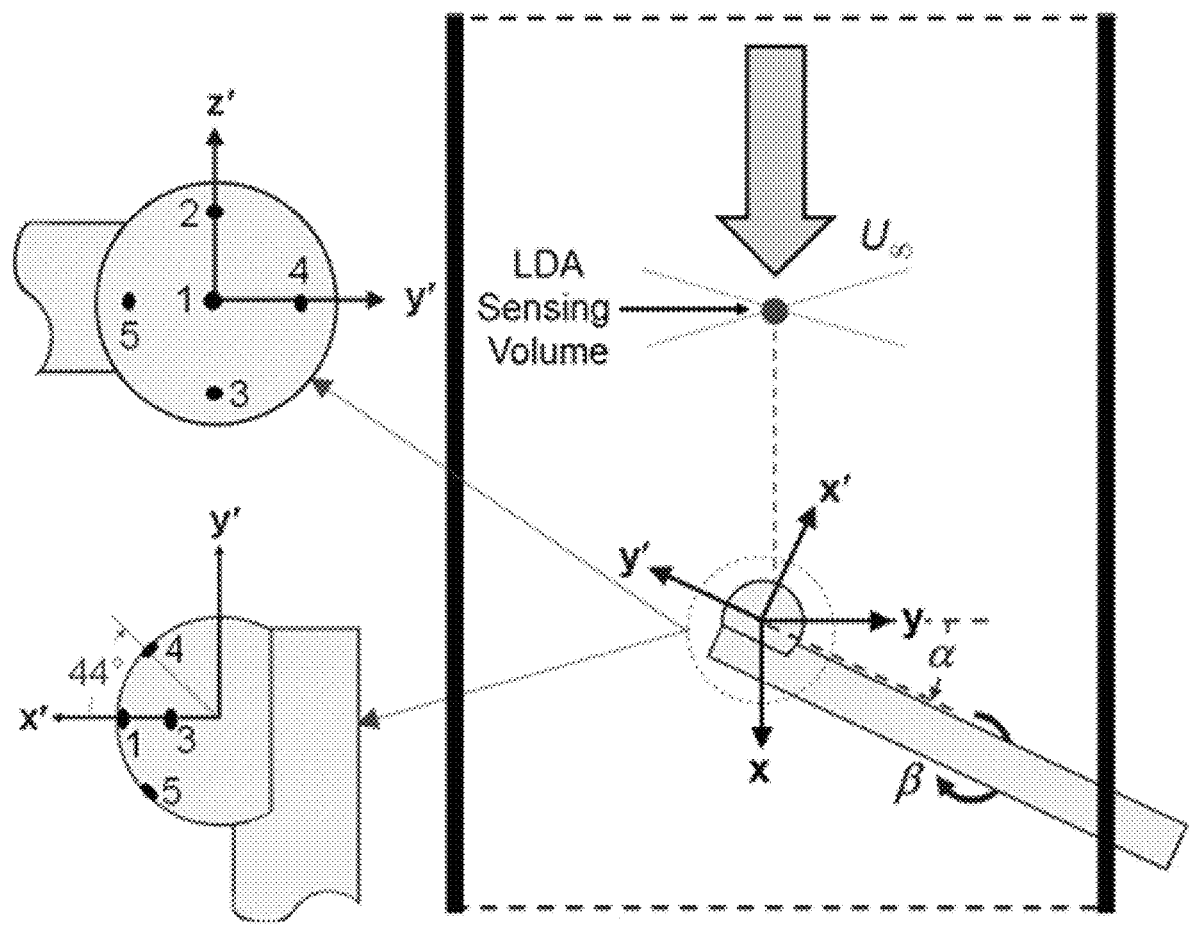
FIG. 16 shows a calibration setup.

The top-view of the calibration setup is shown in FIG. 16. An automated traverse system (not shown in the figure) moves the probe to specified values of pitch ($\alpha$) and yaw angles ($\beta$). The distance in the x-direction between pressure port 1 on the spherical probe and the LDA sensing volume is maintained fixed for all probe orientations. The uncertainty of wind speed is 0.4%, and the uncertainties of pitch and yaw angles are 0.5°.

With regard to Method 2F probe calibrations, the spherical probes were calibrated at 3 velocities 9 m/s, 18 m/s, and 27 m/s, and at 21 pitch angles ranging from −12° to 12° in steps of 2°. Thus, for each of the 4 spherical probes we measured 39 combined velocity and pitch angle set points. At each set point we used the Curve Fit Method (Shinder et. al., 2018) to determine the pitch calibration factor, $F_1=P_{45}/P_{12}$ and the velocity calibration factor, $F_2=[P_{dyn}/P_{12}]^{1/2}$, at the null condition ($P_{23}=0$). Here, the dynamic pressure is defined by $P_{dyn}=\rho_{air}U_{LDA}^2/2$ where $U_{LDA}$ is the velocity measured by the LDA and $\rho_{air}$ is the air density in the wind tunnel. The measured calibration factors were fit to $4^{th}$ degree polynomials represented herein by $\alpha=\alpha(F_1)$ and $F_2=F_2(\alpha)$. The standard deviations of the respective fit residuals were 0.3° and 0.37%.

During the flow RATA at the CFPP, we followed the EPA-approved Method 2F protocol (EPA 2017d) to determine the axial velocity. First, we nulled each probe to determine $\beta_{null}$. With the probes nulled we determined the pitch calibration factor, $F_1=P_{45}/P_{12}$, from the measured null pressures $P_{45}$ and $P_{12}$. The calibration curve $\alpha=\alpha(F_1)$ was used to determine the pitch angle, which we used as an input to calculate the velocity calibration factor, $F_2=F_2(\alpha)$. Next, the measured $P_{12}$ and $F_2$ were used to determine the dynamic pressure, $P_{dyn}=F_2^2 P_{12}$. Finally, the Method 2F axial velocity at each traverse point is determined using $P_{dyn}$, $\beta_{null}$, and $\alpha$ in eq 2.

The non-nulling method correlates $P_{dyn}$, $\beta_{null}$, and $\alpha$ with the differential pressures $P_{12}$, $P_{13}$, $P_{14}$, and $P_{15}$ measured across the probe ports. We measured more than 3000 data points spanning the velocity range from 5 m/s to 30 m/s, pitch angles from −20° to 20°, and yaw angles from −42° to 42°. The calibration curve for each parameter $P_{dyn}$, $\beta_{null}$, and $\alpha$ is a fifth-degree polynomial of the four independent variables: $P_{12}$, $P_{13}$, $P_{14}$, and $P_{15}$. The residual standard deviations of each parameter were comparable for all 4 spherical probes. On average, the residual standard deviations were 1.3%, 0.5°, and 0.75° for $P_{dyn}$, $\beta_{null}$, and $\alpha$, respectively.

With regard to a test protocol for stack flow measurements, the test protocol was performed by a certified RATA tester who used commercially available RATA equipment called a "Multiple Automated Probe System" (MAPS) to perform five functions: 1) move all 4 probes simultaneously to specified points; 2) supply bursts of high pressure gas to purge water droplets or particulates plugging any of the 5 pressure ports on the spherical probe head at one minute intervals; 3) implement the Method 2F nulling procedure to determine $\beta_{null}$ at each traverse point; 4) provide time stamps at the start and stop of the Non-Nulling and Method 2F measurement intervals, and 5) determine the flue gas density ($\rho$) using EPA-approved methods 4 and 3A (EPA 2017a, 2017b).

A MAPS unit containing a spherical probe was installed in each flange on the stack wall. The MAPS units simultaneously moved all 4 probes to the specified traverse point and rotated each probe to a zero yaw angle ($\beta=0°$). After a 3 sec stabilization period, the axial velocity $V_{NN,n}$ was measured for 10 sec using the Non-Nulling Method with the probe oriented at $\beta=0°$. Next, each MAPS unit nulled its probe (i.e., rotated probe until $P_{23}=0$) and recorded $\beta_{null}$. After another 3 sec stabilization period, we measured the axial velocity $V_{M2F,n}$ for 10 sec via Method 2F. On average, the Method 2F measurements (including the nulling procedure) took 60 sec at each traverse point. After measuring the axial velocities $V_{NN,n}$ and $V_{M2F,n}$ at all 16 traverse points, we used eq 1 to determine respective flow RATA velocities, $V_{NN}$ and $V_{M2F}$, for the completed run. We completed a total of 4 runs (velocity profiles) at the high load (16 m/s) and 6 runs at the low load (7 m/s).

With regard to a data acquisition system and differential pressure measurements, to collect non-nulling and Method 2F data, we designed and assembled four custom data acquisition systems that were connected to a single laptop computer. Each system included industrial-grade, differential pressure transducers, which we sampled at 10 Hz. The transducers were bidirectional with a full-scale of 1240 Pa and a specified response time faster than 1 ms. We used pneumatically actuated valves to isolate the differential pressure transducers during gas purging to clear probe ports of contaminants. The transducers and valves for each system were housed in a weather-proof case located on the measurement platform just below the MAPS units. We used 5 nylon tubes (13 m long; inner diameter 6.35 mm) to connect the high-pressure side of each differential pressure transducer to ports 1 through 5 on the spherical probe (FIG. 15A). The low-pressure side of each transducer was open to the ambient pressure herein denoted $P_{ref}$. In this way, we measured the flue gas pressure at all 5 ports on the spherical probe head, minus the ambient reference pressure, $P_{ref}$, located in the case. The required differential pressures for the non-nulling algorithm ($P_{12}$, $P_{13}$, $P_{14}$, $P_{15}$) and for Method 2F ($P_{23}$, $P_{12}$, $P_{45}$) were calculated by subtracting the appropriate pressure measurements. For example, the yaw pressure was determined by subtracting the pressure measured at port 2 from the pressure at port 3: $P_{23}=(P_2-P_{ref})-(P_3-P_{ref})$.

Method 2F determines the average axial velocity and pitch angle from pressure averages. Specifically, we calculated $P_{12,avg}$ and $P_{45,avg}$, which are arithmetic averages of $P_{12}$ and $P_{45}$ sampled at 10 Hz for 10 sec. In contrast, our implementation of the Non-Nulling Method determines the average axial velocity $V_{NN,n}$ every 0.1 sec when the measured values of $P_{12}$, $P_{13}$, $P_{14}$, and $P_{15}$ are updated. In particular, the differential pressures are used in conjunction with the Non-Nulling curve fits to calculate the dynamic pressure ($P_{dyn}$), yaw-null angle ($\beta_{null}$), and pitch angle ($\alpha$), which in turn are used in Eq (2) to determine $V_{NN,n}$. At the end of the 10 sec collection interval, we calculate the arithmetic average of the 100 values of $V_{NN,n}$. By logging the time history during the 10 sec collection we were able to identify transient behavior in $\alpha$, $\beta_{null}$, and $V_{NN,n}$ that could not be observed using Method 2F. See FIG. 19 below.

Although we purged the 5 pressure lines connected to the spherical probe every 60 sec, we still had problems with plugging, especially at the low flow condition (7 m/s). During normal data acquisition, the pressure signals are noisy with fluctuations of the same magnitude as the signal average; when a port is plugged, fluctuations are reduced. We measured the noise of the pressure signals at each of the 5 pressure ports to identify data affected by plugging.

FIG. 17 lists average flow results for the low (7 m/s) and high (16 m/s) flow RATAs. For both the low and high flow RATAs the run-averages were in excellent mutual agreement: −0.3% and 0.1%, respectively. The non-nulling measurements have less scatter than the Method 2F measurements as evidenced by the smaller standard deviations. The standard deviation of the Non-Nulling velocities was one-third of the standard deviation of the Method 2F velocities at low load, and the ratio reduced to one-ninth at high load. The larger scatter in the Method 2F data is attributed to the different null pressures $P_{23}$ for each of the measurements. Despite using an automated traverse system, transients in the velocity field (see FIG. 19) made it infeasible to perfectly null the probe, and as a result $P_{23}$ was close to zero but not identically zero for each run. Nevertheless, the excellent agreement between $V_{M2F}$ and $V_{NN}$ is solid evidence that the Non-Nulling Method is at least as accurate as EPA's Method 2F. Moreover, the data for the Non-Nulling Method was acquired in only $\frac{1}{5}^{th}$ of the time needed for Method 2F and has a consistently lower relative variation. Because this is the first field test using the Non-Nulling Method, we expect its speed advantage over Method 2F can be improved. The Non-Nulling Method only requires 10 sec at each traverse point while Method 2F times required from 15 sec to 300 sec (i.e., 10 sec for data collection and the balance of time to find the null position). The shorter Non-Nulling times limit the opportunity for the pressure ports to plug. Consequently, we should not need to purge as frequently when performing the Non-Nulling Method. Moreover, the purging process can be performed while the probe is moving from one traverse point to the next to save additional time.

Figure 18:
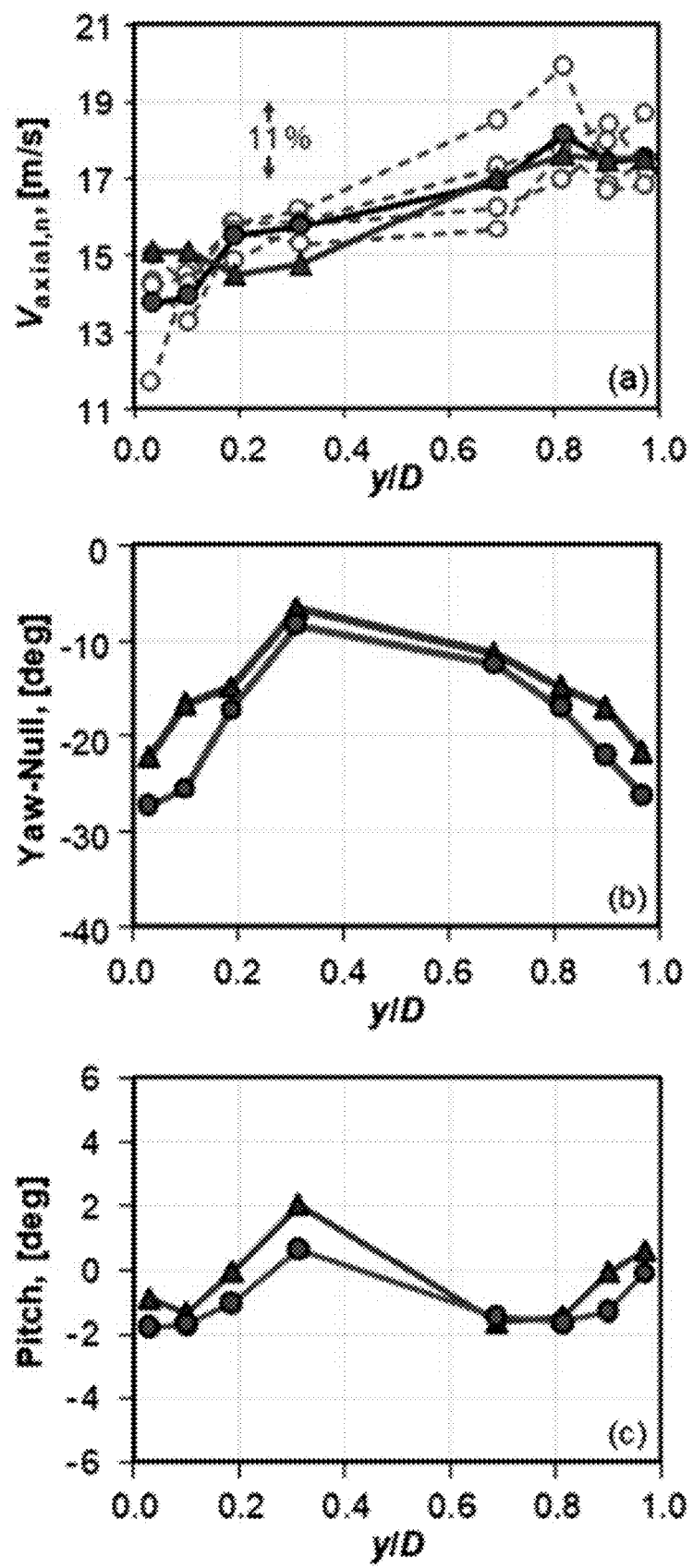
FIG. 18 shows graphs of flow parameters versus distance.

FIG. 18A through FIG. 183C shows graphs to compare the high-flow RATA results for Method 2F (●) and the Non-Nulling Method (▲). Specifically, we compare the following parameters: 1) the axial velocity $V_{axial,n}$ in FIG. 18A; 2) the yaw-null angle $\beta_{null}$ in FIG. 18B, and 3) the pitch angle $\alpha$ in FIG. 18C. These parameters are plotted against the normalized distance y/D where D is the diameter of the stack, and y is the distance along a chord measured from the stack's wall, as shown in FIG. 15B. Similar results (not shown herein) are found when these parameters are plotted versus x/D.

In FIG. 18A, the open circles (○) connected by dashed lines are Method 2F data from each of the 4 high flow runs. The spacings between the dashed lines indicate the profile variations we measured for the 4 Method 2F runs over a duration of 3600 sec. Despite these variations, the flow velocity of each Method 2F run is stable as shown in FIG. 17. The standard deviation was 1.8% of the average flow velocity. The solid circles (●) and solid triangles (▲) in FIG. 18A are the averages of the Method 2F runs and the non-nulling runs, respectively. The solid lines connecting the averaged points are close to each other. This displays the good agreement of the Method 2F velocity profile with the non-nulling velocity profile. FIG. 17 shows that the difference in the averaged flow velocity is only 0.1%. The variations of the flow field near y/D=0.8 in FIG. 18A might be due to vortices from the elbow 3.8 D upstream of the measurement platform. We are confident that they are not artefacts of the measurements (e.g., caused by plugging) because the average flow velocity for each run is stable.

FIG. 18B shows that the yaw-null angles determined by Method 2F (●) and by the Non-Nulling Method (●) are in good agreement. Both methods show the yaw-null angles are most negative near the wall with a value of nearly −30°. The yaw-null angle is less negative as one moves away from the wall toward the center of the stack. The differences between Method 2F and the Non-Nulling Method are smallest near the center of the stack and increase to maximum of only 7° in the worst case.

FIG. 18C show profiles of the pitch angles determined by Method 2F (●) and by the Non-Nulling Method (●). We found the same characteristic profiles independent of flow load and method. Although we hoped to assess the Non-Nulling Method in a stack with high pitch, the largest pitch angle was only about 6°. This maximum pitch angle occurred on the x-axis chord (not shown).

Figure 19:
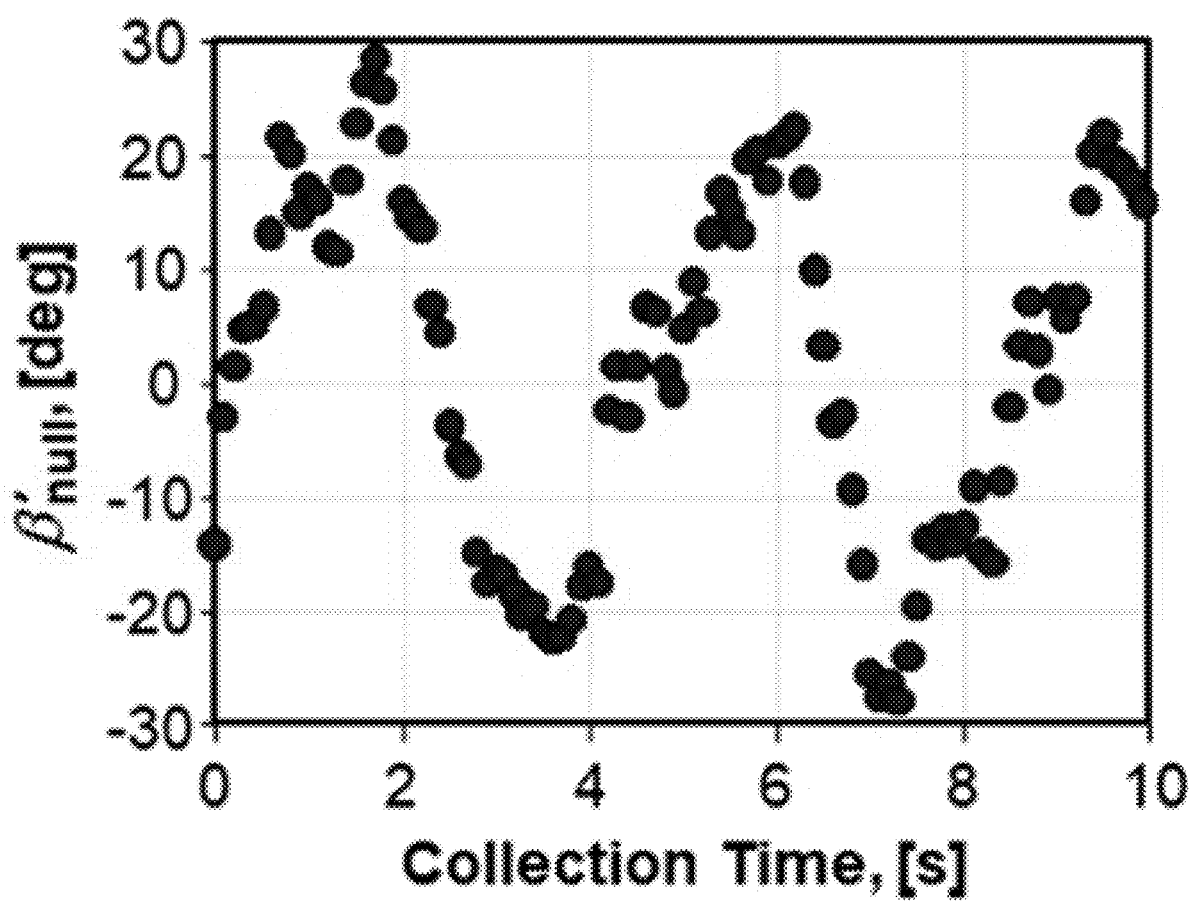
FIG. 19 shows a graph of pitch angle versus collection time.

FIG. 19 plots the yaw-null angle during a typical 10 sec collection time with the probe oriented at $\beta=\beta_{null}$. Because the probe was nulled, the Non-Nulling algorithm measures $\beta'_{null}$, the yaw-null angle relative to the rotated probe oriented at $\beta$. In a steady flow with low turbulence we expect $\beta'_{null} \approx 0°$ throughout the 10 sec collection. We observed (FIG. 19) the sine-like oscillations with an amplitude of nearly 30° and period of approximately 4.5 sec. Surprisingly, the integrated average of $\beta'_{null}$ is −1.5°, which is close to zero. This data demonstrated that the yaw-null angle was not stationary. That is, the location of the yaw-null angle changes during the 10 sec collection. As such, the yaw-null angle determined by Method 2F is not unique; one can find a range of yaw angles that satisfy $P_{23}=0$ depending on the measurement time.

There is time dependence of $\beta'_{null}$ shown in FIG. 19. If similar oscillations appear in future RATAs, we could obtain more-accurate average values of $\beta'_{null}$ either by averaging over more cycles (thereby increasing the measurement time)

or by averaging over an integer multiple of the period of the oscillation (4.5 sec in FIG. 19).

We performed a 16-point flow RATA at a CFPP at high (16 m/s) and low (7 m/s) loads using a Non-Nulling Method that we developed for a spherical probe. We compared the non-nulling flow results with the EPA-approved Method 2F and obtained mutual agreement of −0.3% at the low load and 0.1% at the high load, respectively. This good agreement was obtained in a stack with complex flow conditions, including an asymmetric velocity profile (FIG. 18A), a large negative yaw-null angle of nearly −30° at the wall (FIG. 18B), significant fluctuations in the axial velocity (FIG. 18A) and in the yaw-null angle (FIG. 19) in certain regions of the stack cross-section. Because we obtained good results under these difficult flow conditions, we expect that the Non-Nulling Method would perform equally-well or better in more favorable flow conditions.

An advantage of the Non-Nulling Method includes its speed and accuracy. Flow RATAs performed using the Non-Nulling Method are at least as accurate as Method 2F, but can be performed significantly faster. Here, we estimate that the acquisition of the non-nulling data took $\frac{1}{5}^{th}$ of the time needed for the Method 2F data. (The same setup times apply to Non-Nulling and Method 2F measurements.) Additional stack testing is needed to provide a more rigorous assessment of the time savings.

The Non-Nulling Method has 2 diagnostic features that help ensure its accuracy. First, since the Non-Nulling Method measured yaw-null angles ($\beta_{null}$'s) consistent with Method 2F values, one can rotate the probe to $\beta_{null}$ and measure the axial velocity using Method 2F. The Method 2F measurement can then be used to cross check the non-nulling result. This hybrid Non-Nulling Method bypasses the need to search for the yaw-null angle, which is the part of Method 2F that takes the most time. Second, since the Non-Nulling Method measures the pressure at all 5 ports on the spherical probe, a significant decrease in the noise levels of these measurements can be used to help troubleshoot plugging problems as was done in this example.

In this example, we performed a 3000-point calibration on each probe used for the non-nulling measurements. Such an extensive calibration is not practical for routine flow RATAs.

The benefits of automated traverses are less important for the Non-Nulling Method since its accuracy does not depend on satisfying the null condition $P_{23}=0$. In contrast, Method 2F benefits substantially from an automated traverse unit. In the present work the automated traverse unit was able to null (i.e., find the angle where $P_{23}\approx 0$) despite transient pressure fluctuations with amplitudes nearly equal to the time-averaged signal and periods ranging between 3 s and 5 s. We note that many flow RATAs are performed manually, and such transients could result in imperfect nulling (i.e., $P_{23}\neq 0$), which can introduce unquantified errors in the Method 2F velocity measurements. Currently, the Method 2F protocol does not specify acceptable values of $P_{23}$ when using nulling methods.

This example demonstrates that the Non-Nulling Method is viable for fast, accurate stack flow RATA measurements. Here, we showed the Non-Nulling Method gave analogous results to EPA-approved Method 2F in a CFFP stack. The agreement between the methods was 0.3% at the plant's low load of 7 m/s and 0.1% agreement at a high load of 16 m/s; however, the Non-Nulling data acquisition only took $\frac{1}{5}^{th}$ the time of Method 2F data acquisition. Given the harsh flow conditions for this initial test we are confident the Non-Nulling Method will give similar (or better) results in less complex stack flows.

Example 2. Air-Velocity Calibration System for Large, Turbulent Flows

NIST's airspeed calibration service calibrates anemometers as a function of airspeed vector and turbulence intensity (Tu). The vector (sometimes called "3-D") capability is particularly important for calibrating multi-hole differential-pressure probes that are often used to comply with regulations limiting pollution emitted by smokestacks of coal-burning electric power plants. To achieve these capabilities starting with a conventional "1-D" wind tunnel, we installed translation/rotation stages and turbulence generators that use removable grids or flags. The calibration ranges are: yaw angle ±180°; pitch angle ±45°; airspeed 1 m/s to 30 m/s; turbulence intensity $0.07 \leq Tu \leq 0.25$; average data collection rate: 300 points/hour at fixed Tu. The system's expanded uncertainties corresponding to 95% confidence level are: airspeed $0.0045\times|V|+(0.036/|V|)^2$ where $|V|$ is the magnitude of the airspeed in m/s; pitch and yaw angles 0.3°; and turbulence intensity 0.03 Tu. The airspeed working standard is a Laser Doppler Anemometer that is traced to SI unit of velocity via a spinning disk. Calibrations are performed in the 1.5 m×1.2 m rectangular test section of NIST's wind tunnel and are corrected for blockage by the instrument under test and its supports.

Accurate measurements of outdoor air flows and of gas flows in large conduits and stacks are needed by weather services and diverse industries (e.g. automotive, aircraft, wind-power, fossil-fueled electricity-generating). These large flows have spatial and temporal non-uniformities described as "swirls", "eddies", and "turbulence". Often, these complicated flows are quantified by using well-characterized anemometers to map (or "velocity profile") a cross-section of the flow and then integrating the map. To accurately characterize anemometers for velocity profiling, we modernized NIST's wind tunnel that had been built in 1967. This example describes how a non-nulling pitot probe and non-nulling gas velocity measurement apparatus improved the wind tunnel's hardware, software, and calibration capabilities.

NIST's updated air-velocity calibration system can characterize pitot tubes, multi-hole differential-pressure probes, thermal and ultrasonic anemometers, and anemometers that depend upon rotating cups, vanes, and the like. In this example, we emphasize the calibration of multi-hole differential-pressure probes that are often used to comply with regulations limiting pollution emitted by smokestacks of coal-burning electric power plants. Calibrated probes can reduce the cost of velocity-profile-based emission measurements while increasing the accuracy of the maps because the calibrations now account for the pitch ($\alpha$) and yaw ($\beta$) angles that specify the probe's orientation with respect to the average flow velocity vector V and for the turbulence intensity Tu. The quantity that we call "turbulence intensity" is the dimensionless ratio $Tu=\langle V_x^2\rangle^{1/2}/\langle V_x\rangle$ where $V_x$ is instantaneous velocity component measured by the laser Doppler anemometer (LDA) when the LDA is aligned with the velocity vector V; "$\langle$ $\rangle$" denotes a time average (typically 5 s) and $\langle V_x^2\rangle^{1/2}$ is the standard deviation $\sigma(V_x)$ measured by the LDA (after correcting for $\sigma(V_x)$ in the absence of turbulence).

Figure 20:
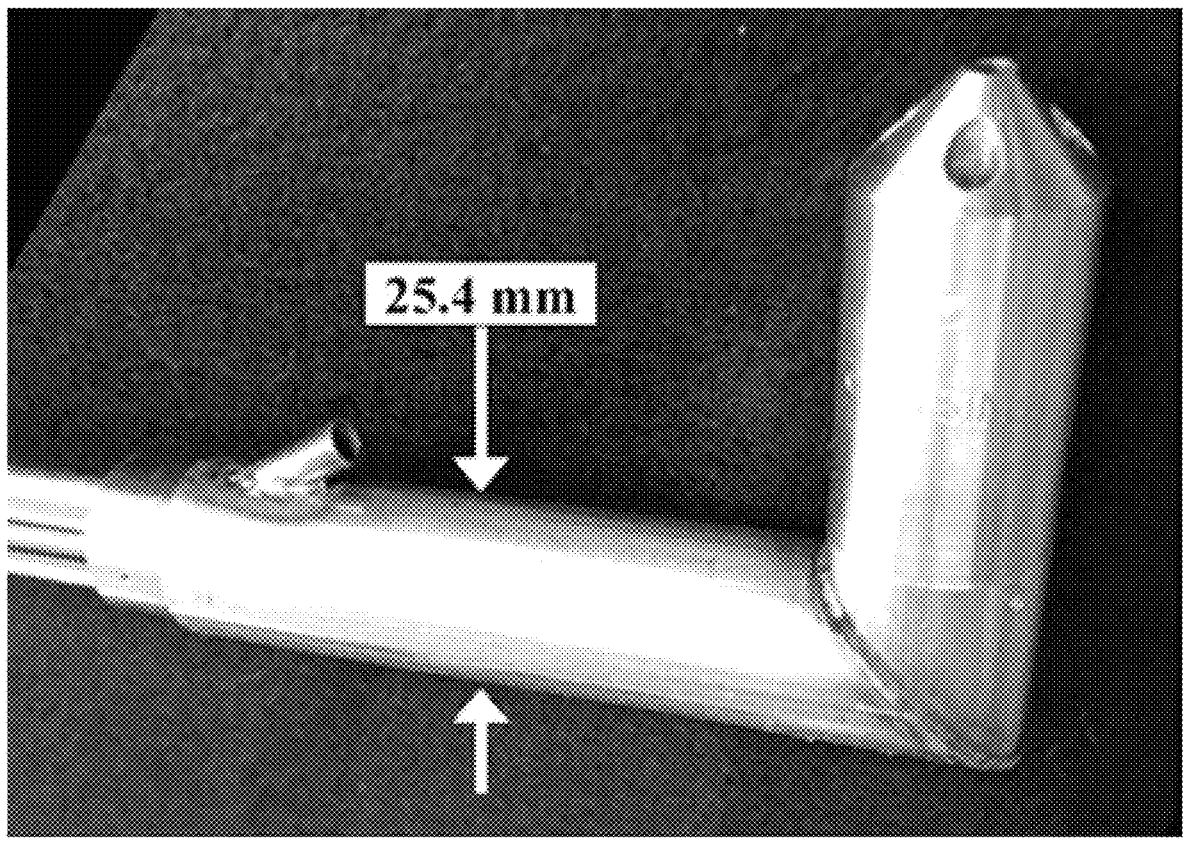
FIG. 20 shows a multi-hole differential-pressure probe, wherein during the probe's calibration, it was attached to a 1 m long, 25.4 mm O.D. steel support tube. The support tube enclosed narrower, pressure-transmitting tubes that connected the ports in the probe's head with differential-pressure gauges located several meters away.

FIG. 20 shows a non-nulling pitot probe, also referred herein as a multi-hole differential-pressure probe, that was calibrated. A detailed calibration of such a probe generates hundreds or thousands of values of $P_{1i}(|V|, Tu, \alpha, \beta)$, where $P_{1i} \equiv P_1 - P_i$ is the pressure difference between port 1 and port i of the probe and $|V|$ is the magnitude of the airspeed vector in the wind tunnel at the probe's location. For most probe geometries, $P_{1f}(|V|, Tu, \alpha, \beta)$ is too complex to predict accurately. Complexities, particularly at large values of $\alpha$ or $\beta$, include excess noise and, for low values of Tu, hysteresis generated by boundary layer separation.

NIST's updated air-velocity calibration system spans the ranges: yaw angle ±180°; pitch angle ±45°; airspeed 1 m/s to 30 m/s; turbulence intensity 0.0007 to 0.25; average data rate: 300 points/hour at fixed Tu. These specifications include the measurement ranges that are used for smokestack measurements: 5 m/s≤|V|≤30 m/s and Tu about 0.1.

For airspeeds that NIST determines using its laser doppler anemometer (LDA), the system's expanded uncertainty corresponding to 95% confidence interval is $U_r(V_x)=0.004 \times V_x$ where $V_x$ is the component of V perpendicular to LDA's interference fringes. For airspeeds that NIST determines using a calibrated pitot tube: $U_r(|V|)=0.0044 \times |V|+(0.013 \, m^2/s^2/|V|)$. The expanded uncertainty of the pitch and yaw angles is 0.3° and the expanded uncertainty of the measurements of turbulence intensity is $U(Tu)=0.03 \times Tu$ for $0.03 \leq Tu \leq 0.1$. NIST's calibrations of $P_{1f}(|V|, Tu, \alpha, \beta)$ are traceable to the International System of Units. Such traceability is essential to earn international recognition of NIST's new capability for calibrating angle- and turbulence-dependent responses of diverse anemometers.

National Metrology Institutes (NMIs) has posted calibration capabilities for diverse anemometers. However, none of the posted capabilities consider Tu, $\alpha$, and $\beta$ as independent variables. Therefore, the results of any one these internationally-recognized calibrations can be summarized in a small table listing the anemometer's response at, perhaps, 10 to 20 airspeeds. All the NMIs calibrate anemometers in low-turbulence air flows at ambient temperature and pressure. Prior to calibrations, those anemometers that have direction-dependent responses to the air flow are aligned with the air flow. For example, the axis of a propeller anemometer is aligned parallel to the air stream. In the range 0.5 m/s to 38 m/s, the smallest claimed expanded uncertainty was $|V|)=0.0025 \times |V|$. The uncertainties for the present 4-variable calibrations are only 1.6× larger calibrations obtained under the restricted conditions: $\alpha=\beta=0$ and $Tu\approx 0$.

Figure 21:
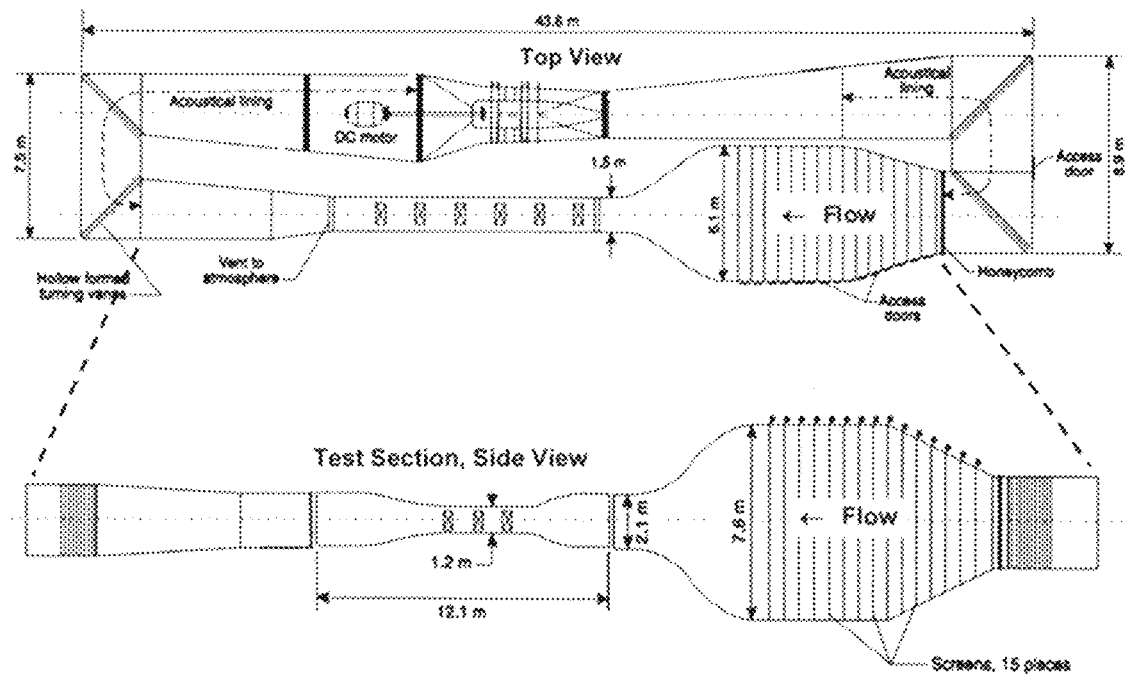
FIG. 21 shows a top view of recirculating wind tunnel, with the low speed test section in place; and a side view of settling chamber and high-speed test section.

Regarding the wind tunnel, FIG. 21 shows the wind tunnel with its higher-speed test section installed. Here, we describe the tunnel's operation when turbulence generators are absent. The wind tunnel is a closed loop contained within a footprint 43.5 m long and 8.9 m wide. The fan that drives the airflow is on the opposite side of the loop from the test section that contains the working airspeed standards and any instrument under test IUT. From the fan, the airflow passes through two sets of turning vanes and into a large-cross-section, screen-filled "settling" chamber that reduces the fan-generated turbulence and swirl. The test section shown in the side view in FIG. 21 is used for calibrations spanning the range 0.15 m/s to 75 m/s. It is 12 m long and 1.5 m wide. Along the flow direction, the test section's height forms a venturi-like duct. The height gradually contracts from 2.1 m to 1.2 m. Then, it is constant for a length of 2 m. Finally, the height gradually returns to 2.1 m. In the test section, the longitudinal free-stream turbulence level is 0.001 over most of the airspeed range with a transverse airspeed gradient of less than 1% within a working area of 90% for all test section areas. Using an LDA, we mapped the airspeed in a vertical plane that passed through the geometric center of the test section. In 0.4 m wide by 0.4 m high subsection of the map, the maximum airspeed difference from the center of the test section was 0.10% in the vertical direction and 0.15% in the horizontal direction at the airspeed 10 m/s. Therefore, any IUT can be accurately calibrated if it is located anywhere in the subsection. If an IUT is located closer to the test section's wall during a calibration, the calibration must account for the boundary layers attached to the wind tunnel's walls.

Figure 22:
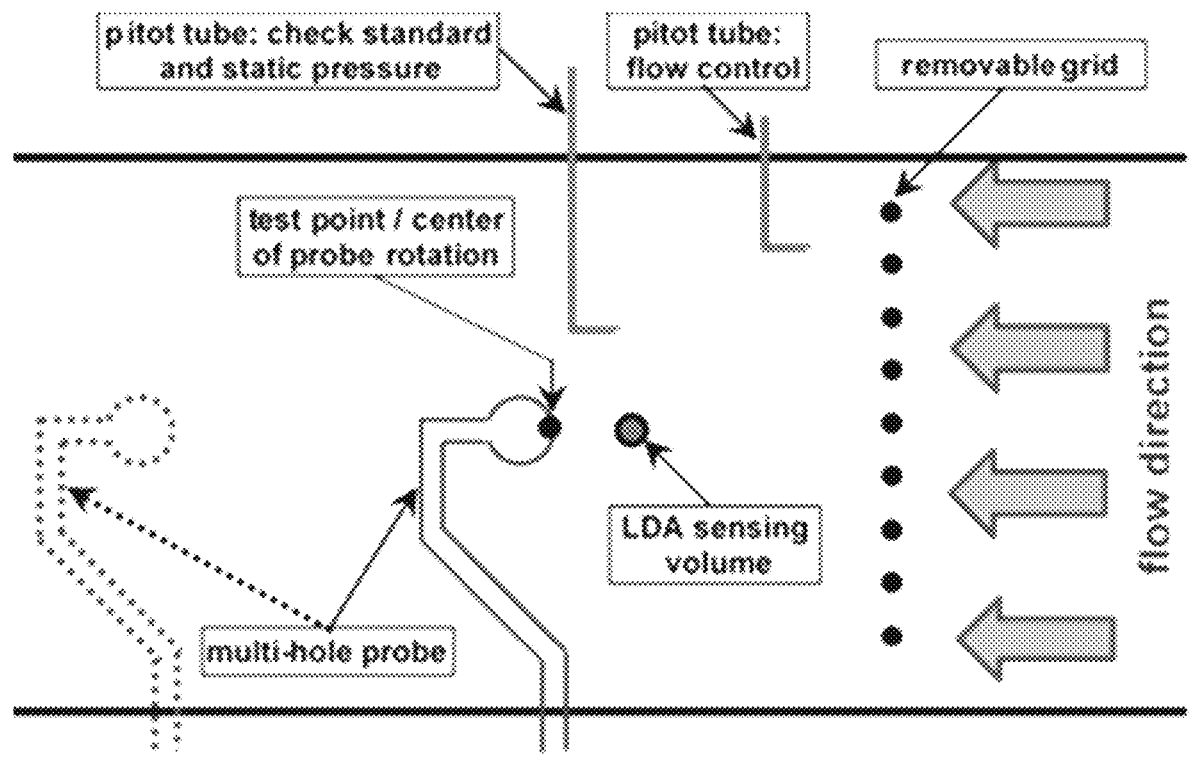
FIG. 22 shows a configuration of a wind tunnel test section, as viewed from above, during the calibration of a multi-hole, differential-pressure probe in accordance with Example 2.

While making the airspeed map, the airspeed was kept constant using a PID control loop linked to an L-shaped pitot tube placed on the side of the wind tunnel, as shown in FIG. 22. For normal calibrations, data are taken when the PID loop indicates that |V| is controlled within the larger of 0.01 m/s or 0.002|V| for the range 5 m/s≤|V|≤40 m/s. The noise in the PID loop corresponded to air speed fluctuations of 0.01% rms, when averaged over 50 seconds. We did not map the airspeed below 5 m/s because, at lower airspeeds, the uncertainty of the pitot tube measurements is larger than the uncertainty of the map. Above 20 m/s, the increasing Reynolds number increases flatness of the airspeed map in the wind tunnel's cross-section.

The LDA probe is permanently installed on the outside surface of the roof of the wind tunnel. When a turbulence-generating device (grid or flag array) is installed in the wind tunnel, it is located 1 m to 3.5 m upstream of the sensing volume of the LDA, depending on the turbulence intensity desired at the probe's location.

Two L-shaped pitot tubes are permanently mounted in the wind tunnel. One pitot tube serves as the airspeed sensor in a feedback loop that controls the power supply that drives the fan. It is located near the test point, but not so near that it interferes with the flow around the IUT. A second pitot tube serves as a check standard for the entire airspeed calibration system. It also monitors the static air pressure in the wind tunnel. The static pressure is combined with data from temperature and the humidity sensors to calculate the density of the air in the wind tunnel.

The test point (the leading surface of the probe being calibrated) is usually 12 cm downstream from LDA. This ensures the blockage of the flow by the IUT has only a small effect on the airspeed at the LDA. We measured the blockage by moving the probe downstream, as suggested by the dashed outline of a probe in FIG. 22.

FIG. 23 shows the two coordinate systems used during calibrations. One coordinate system is attached to the wind tunnel. Its origin is the test point which is usually located 12 cm downstream from the sensing volume of the LDA. This coordinate system is right-handed. Its X-axis is parallel to the wind; its Z-axis points up; and the Y-axis points to the right when looking into the wind.

The second coordinate system rotates with the probe as its orientation with respect to the wind velocity changes during calibrations. Its origin is the symmetry point on the probe's head facing into the wind. Its orientation with respect to the wind velocity is specified by the pitch and yaw angles, as defined in FIG. 23. The pitch angle $\alpha$ is in the XY plane. The angle $\alpha$ increases from zero as the probe's support tube is rotated from the Y-axis in the direction of the arrow "A". The yaw angle $\beta$ specifies the orientation of the probe's head in the plane that passes through both the Z-axis and the centerline of the probe's head. When centerline is in the pitch plane, $\beta=0$; the angle $\beta$ increases as the support tube is rotated about its axis in the direction of the arrow "B".

NIST calibrates probes that have support tube with lengths ranging from 60 cm to 250 cm. Calibrations are conducted at user-selected pitch angles $-45°\leq\alpha\leq+45°$ and yaw angles $-180°\leq\theta\leq+180°$ with an angular resolution of 0.3°.

Figure 24:
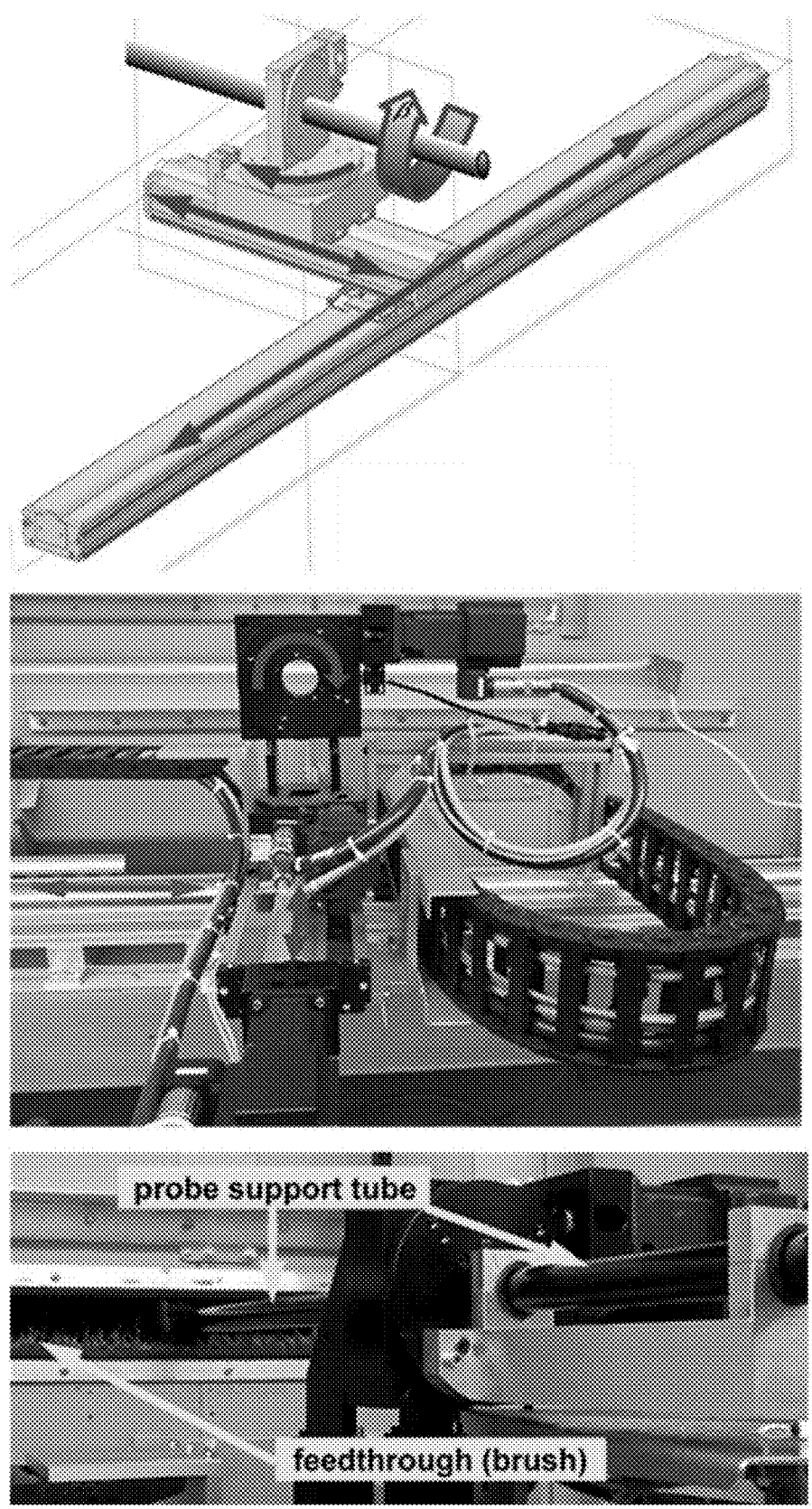
FIG. 24 shows: (TOP) Schematic diagram of two translation stages and two rotation stages that orient probe-support tube at designated angles without moving the test point. MIDDLE: The rotation and translation stages are mounted on the outside of the wind tunnel's wall. BOTTOM: Probe support tube is mounted on the stages and passes through a horizontal slot in the wind tunnel's wall. The brush covering the slot reduces unwanted air flow from the laboratory into wind tunnel.

As shown in the top panel of FIG. 24, NIST uses two rotational stages on top of two translational stages to orient the IUT in the wind tunnel while maintaining the test point 12.0±0.3 cm downstream from the sensing volume of the LDA. The translation/rotation stages are mounted on the outside wall of the wind tunnel's test section. (See FIG. 24FIG. 5.) The support tube of a multi-hole probe (or any other IUT) is clamped to the top stage. The support tube extends from the stages into the wind tunnel by passing through a brush that covers a slot in the test section's wall With the brush in place, the flow of laboratory air into wind tunnel has a negligible effect at the test point, as we confirmed by measurements.

Each translation and each rotation stage is driven by a servo motor. Each stage contains an absolute encoder that is read to determine the stage's position. All four servos are controlled by a deterministic PID-based master control unit, using stage position set-points calculated by the main airspeed DAC program. The stage positions are based on user requested values of pitch and yaw, or absolute stage positions. The main airspeed program then continuously collects encoder readings to confirm, and correct if necessary, the true position for each stage. During normal operation, the main program and master control unit maintains the translation stages within 0.02 mm (8 encoder steps) of their set points and the rotation stages are maintained within 0.03° (15 encoder steps).

As mentioned above, in low turbulence, the airspeed is nearly independent of location in the YZ plane. Therefore, the uncertainty of a calibration is not increased if the test point is displaced a few centimeters from the streamline passing through the sensing volume of the LDA. This will occur, as in the lower panel of FIG. 23 when the probe head is far from the axis of the probe support tube. When the turbulence-generating grid is in the wind tunnel, the flow through the YZ plane varies with the 12.7 cm periodicity of the grid. Therefore, the most accurate calibrations involve the test point to remain close to the streamline from the LDA, even as the probe rotates. In a worst-case scenario (Tu=0.1) a 2 cm uncertainty in Z will lead to a 0.5% uncertainty in the velocity.

Figure 25:
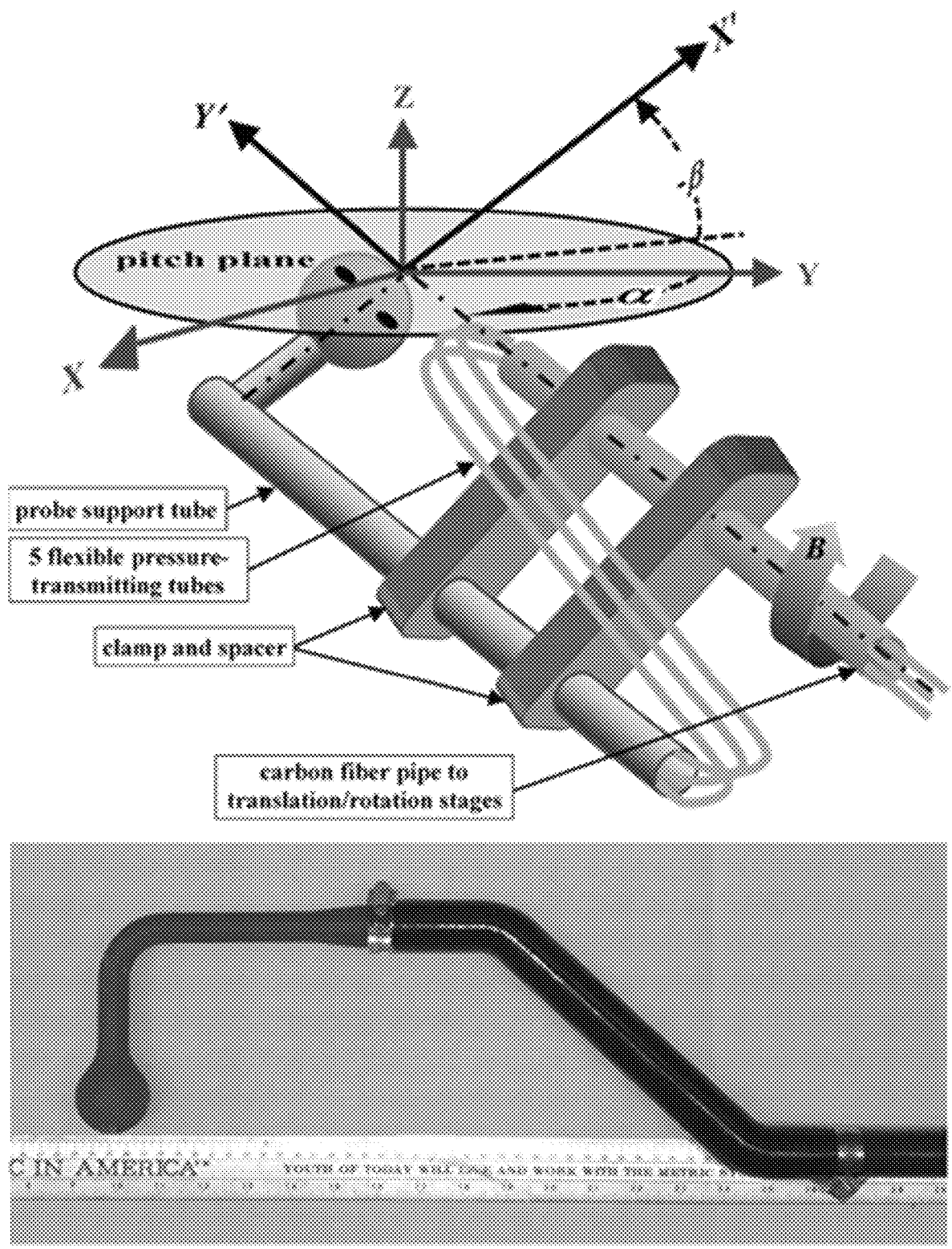
FIG. 25 shows: (TOP) coordinate systems for the wind tunnel and a probe during a calibration with turbulence. The probe's support tube is clamped to a carbon fiber pipe that leads to the translation/rotation stages outside the wind tunnel. The test point does not move when the angles $\alpha$ and $\beta$ are changed by rotating the carbon fiber pipe about the Y' or Z axes. BOTTOM: Experimental probe connected to a carbon fiber pipe by a diagonal transition tube. By design, the diagonal transition tube ensures that the test point does not translate when the carbon fiber pipe is rotated about its axis during a calibration.

FIG. 25 shows two possible methods of fixing the test point during a calibration in a turbulent flow. In the upper panel of FIG. 25, a carbon fiber pipe is clamped to the probe support tube and to the translation/rotation stages outside the wind tunnel. The clamp, acting as a spacer, is adjusted until test point is colinear with the carbon fiber pipe. During a calibration, the pipe rotates about its symmetry axis; however, the test point does not translate off the axis. This arrangement enables calibrations in turbulent flows of certain probes with shapes that are fixed by regulations.

The lower panel of FIG. 25 shows a diagonal transition pipe connecting an experimental probe to a carbon fiber pipe. The dimensions of diagonal transition were chosen so that the test point was colinear with the carbon fiber pipe. Again, the test point does not translate when the carbon fiber pipe is rotated.

In response to aerodynamic forces, the test point on a typical probe is deflected much further than the tight tolerances maintained by the translation/rotation stages. We measured the motion of a test point on a carbon fiber tube by fastening a pointer to the tube's end and moving the stages until the pointer barely obstructed the LDA's sensing volume, as detected by the LDA's burst spectrum analyzer (BSA). We increased the airspeed to bend the tube and programmed the stages to return the pointer to the LDA's sensing volume. The test point's deflection was the negative of the programmed changes in the stages' positions. Near the pitch angle $\alpha=0$, the downstream deflection was $\Delta X/cm = 0.00099 \times \{\langle V_x \rangle/(m/s)\}^2$ in the range $5 \leq \langle V_x \rangle/(m/s) \leq 30$ with the standard deviation $\sigma = 0.013$ cm. Under the same conditions, the tube's angular deflection was $\Delta\alpha = -0.00040° \times \{\langle V_x \rangle/(m/s)\}^2$. These values of $\Delta X$ and $\Delta\alpha$ are 20% larger than we estimated from the tube's dimensions (unsupported length L=143 cm; O.D.=25.4 mm; I.D.=23.4 mm) and literature data for elastic constants and for the aerodynamic drag on a cylinder. We concluded that drag accounts for most of $\Delta X$ and $\Delta\alpha$; perhaps small contributions to $\Delta X$ and $\Delta\alpha$ result from play in the stages' bearings and deflections of the wind tunnel's walls. If a typical probe were attached to the tube, the drag might double. If so, $\Delta X \approx 1.7$ cm and $\Delta\alpha = 0.7°$ at $\langle V_x \rangle = 30$ m/s. If necessary, we can use the stages and the BSA to measure and compensate for $\Delta X$ and $\Delta\alpha$.

With regard to traceable low-turbulence airspeed measurements in the wind tunnel, in low turbulence, the calibration chain starts with length and time standards that determine the diameter and rotation frequency of a spinning disk. The periphery of the disk carries a 5 µm-diameter wire that simulates tracer particles entrained in flowing air. At a well-defined, rotation-dependent speed, the wire passes through the crossed, focused laser beams comprising the sensing volume of the LDA. Some of the incident laser beam is scattered and doppler shifted by the wire and then detected by the BSA. NIST has used a protocol that integrates the weighted LDA velocity measurements and position of the wire over the entire sensing volume at every velocity. To conduct the integration, the LDA optical probe was mounted on an automated traverse system that moved the laser's sensing volume relative to the wire.

The response to aerodynamic forces, the same measurements established $\Delta Y = 0$ with an estimated uncertainty of less than 1 mm for pitch angles ranging from $-20°$ to $+20°$. These measurements did not establish a tight bound on $\Delta Z$ because the translation/rotation stages could not change the Z coordinate. However, we expect $\Delta Z$ resulting from aerodynamic forces will be on the same order as $\Delta Y$.

When LDA is correctly aligned and the spinning disk is operating correctly, a plot of LDA-indicated velocity as a function of position has a well-defined rectangular shape that has no irregularities in the sensing volume. If the sensing volume has small departures from symmetry, the calibration results may be irregular. Poorly aligned LDA beams can generate sensing volumes that contain major defects such as asymmetry or non-parallel interference fringes. If such defects are present, attempts to align the spinning disk and the LDA may produce erratic, unrepeatable, and puzzling results such as changes in the sign of the derivative of the LDA reading with respect to sensing volume position.

The ratio (disk speed)/(LDA speed) is independent of the airspeed in the range 0.2 m/s to 30 m/s within the k=2 expanded relative uncertainty $U_r(\text{ratio}) = 0.0041$.

The wind tunnel was seeded with droplets of di-ethyl-hexyl-sebacate (DEHS, CAS #122-62-3). When droplets pass through the sensing volume of the LDA, they scatter and doppler-shift the laser light. The mean droplet diameter is 1.1 µm with a standard deviation of 0.1 µm. The droplets are small enough that their velocity approaches that of the air flow with a time constant about 2 µs. The droplets were generated by an atomizer.

Figure 26:
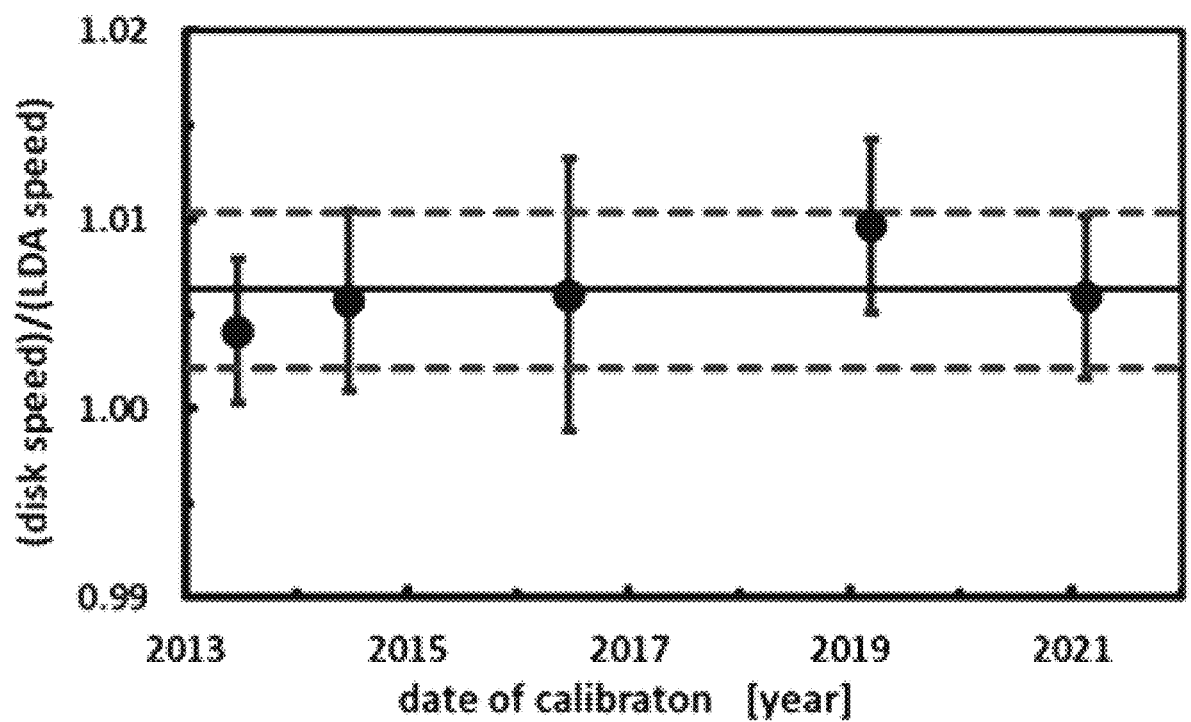
FIG. 26 shows a graph of normalized disk speed versus time for LDA using the spinning disk standard. The k=2, Type A, uncertainty of each calibration is indicated by a vertical bar. The solid horizontal line at 1.0051 is the unweighted average of the four calibrations plotted. The dashed lines bracket the k=2 uncertainty 0.41%.

FIG. 26 demonstrates long-term stability of the LDA calibration relative to the spinning disk standard. Earlier LDA calibration data, spanning the years 1997 to 2013, are consistent with FIG. 26, albeit with larger uncertainties. We reduced the uncertainties by improving: (1) speed controls for the fan and the spinning disk, (2) generation of the oil droplets entrained in the air flow, and (3) the protocol for integrating over the LDA's sensing volume. To re-calibrate the LDA, we replaced the spinning disk described in with an optical chopper. The chopper enabled us to calibrate the LDA while it was installed on the roof of the wind tunnel. This change saved time and eliminated possible calibration changes that might occur as the LDA was removed and reinstalled on the roof of the wind tunnel.

The LDA measures only the component of the air velocity vector that is perpendicular to the surfaces of the interference fringes generated where the laser beams intersect in an ellipsoidal "sensing" volume. When the LDA was installed on the roof of the wind tunnel, it was aligned so that the surfaces of the interference fringes were parallel (±0.5°) to the YZ plane of the wind tunnel. With this orientation, the LDA measures the downstream (X) component of the air velocity incident on the IUT. The downstream component of the velocity is exactly what is required to map gas flows in smokestacks using multi-hole differential-pressure probes.

NIST's LDA uses a solid-state laser with a wavelength of 513.5 nm. The output lens of the LDA has a focal length of 1200 mm and the laser beams intersect at the angle 3.46°. The LDA's sensing volume extended 13 mm along the Z axis and 0.39 mm along the X and Y axes. The sensing volume's dimensions are weakly dependent on the settings of the burst spectrum analyzer and the laser's intensity.

With regard to generating turbulence, generating turbulence occurred by placing grids across the flow a wind tunnel. Grids generate nearly homogeneous turbulence with eddies no larger than the elements of the grid; therefore, the length scale of the generated turbulence increases with the size of the grid.

Figure 27:
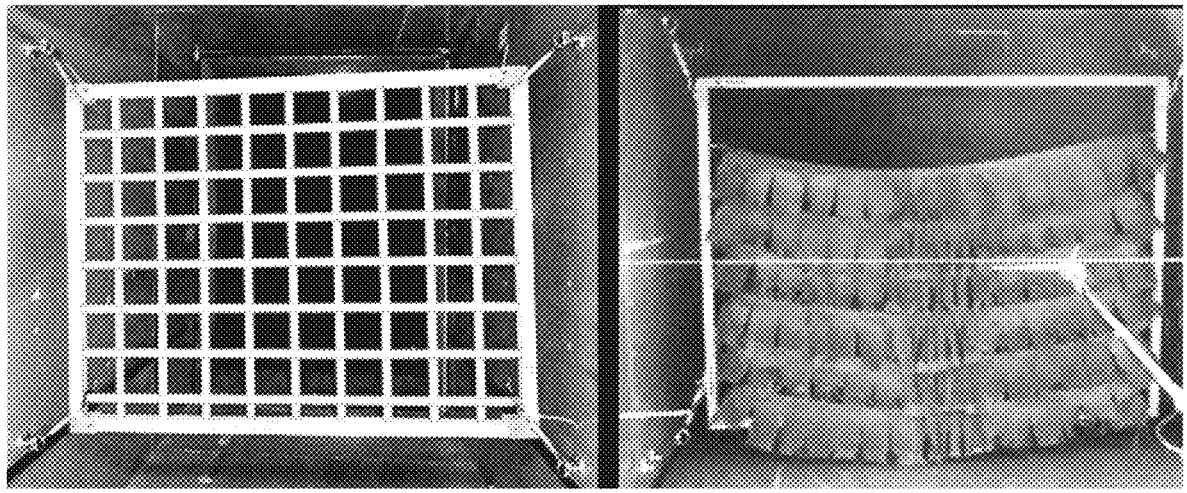
FIG. 27 shows: (LEFT) removable turbulence-generating wooden grid installed in NIST's wind tunnel. The wooden cylinders have diameters of 2.54 cm and are spaced 12.7 cm between centers. RIGHT: Removable turbulence-generating "flag" array in the wind tunnel. The flags were sewn onto ropes that are tied to a frame 1.25 m wide and 0.95 m high. An L-shaped pitot tube and the green light from the LDA are visible downstream from the flags.

We assembled the grid shown in FIG. 27 using 25 mm diameter wooden cylinders arranged to form square openings 10 cm on a side. During normal, turbulence-dependent calibrations, the grid was fastened upstream of the test point at one of three locations: X=−1.06 m, −2.00 m, or −3.56 m where the corresponding values of the turbulence intensity were Tu=0.094, 0.056, or 0.028.

Figure 28:
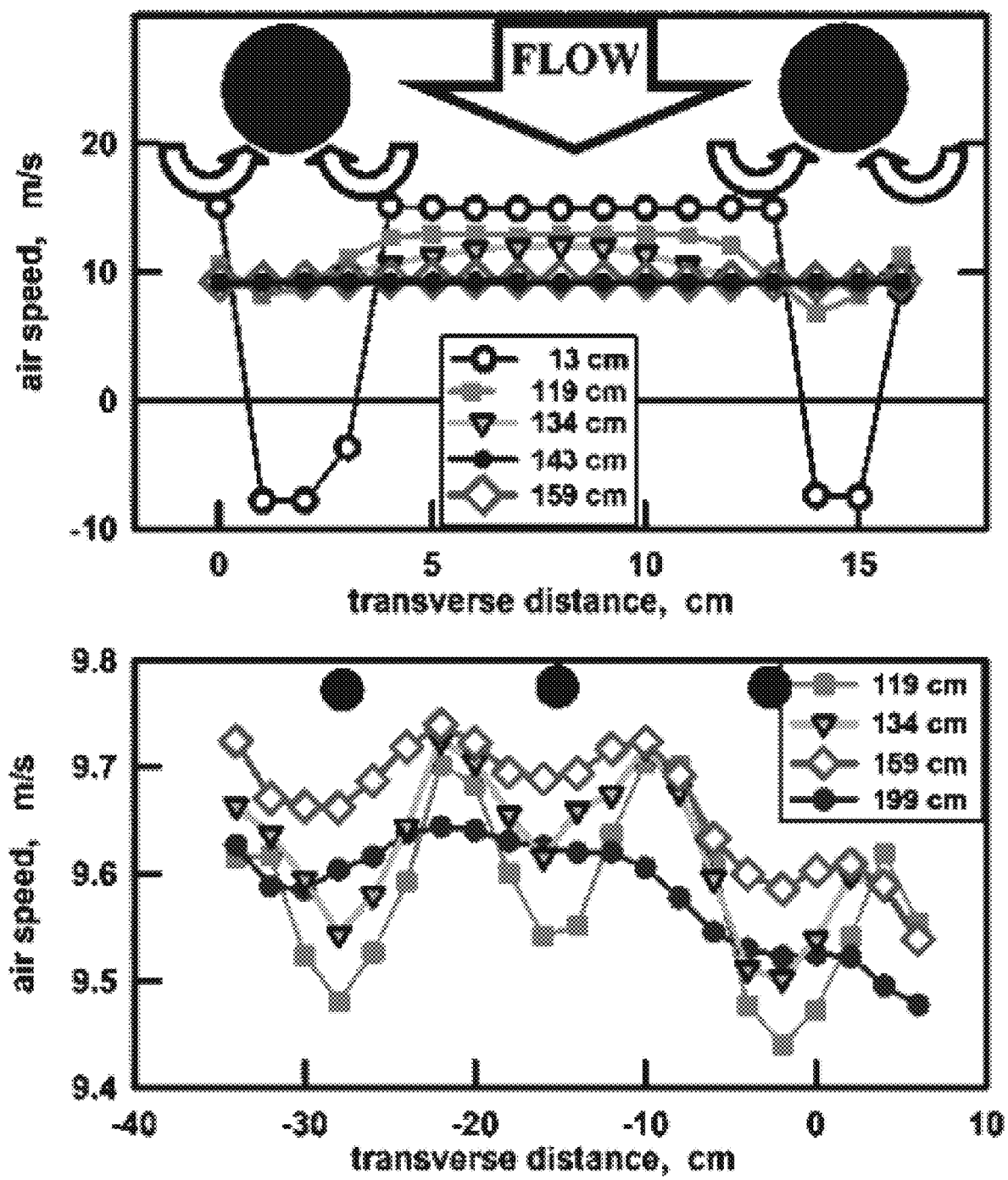
FIG. 28 shows a graph of flow velocity as a function of the Y coordinate at fixed distances downstream from the turbulence-generating grid. The black circles indicate the Y coordinates of the grid's vertical cylinders. The average airspeed was 9.6 m/s. However, negative (upstream) airspeeds were measured near the vertical cylinders on the 13 cm traverse, as suggested by the arrows on the upper panel.

FIG. 28 shows that the influence of the grid on the X-component of the flow velocity exceeds 1% even 159 cm downstream from the grid. To minimize the effects of this dependence, we tightly control the location of the test point and we took data only when X≥60 cm.

Figure 29:
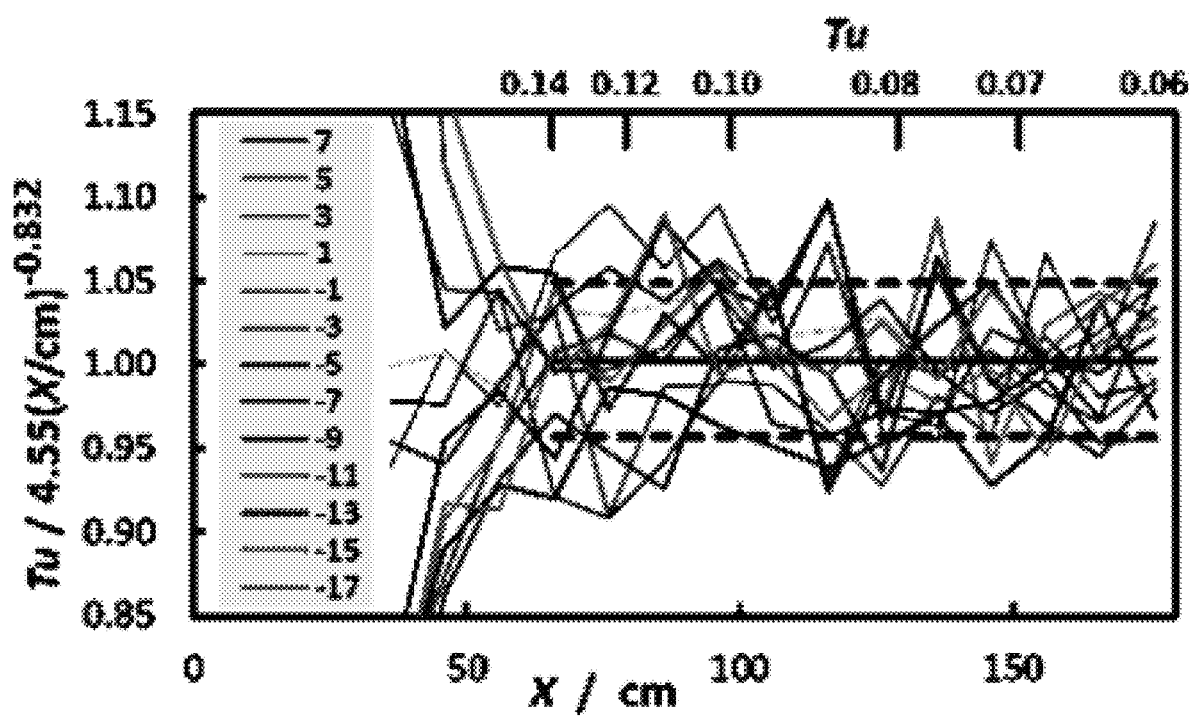
FIG. 29 shows graphs of turbulence intensity Tu vs distance X downstream from the grid at airspeed 10 m/s. Data span cross-stream distances: $-17 \leq Y/cm \leq 7$. The dashed horizontal lines at $(1.004 \pm 0.046)$ Tu indicate the standard deviations of the data from the formula $Tu=4.55(X/cm)^{-0.832}$ in the range: $66 \leq X/cm \leq 176$. The upper horizontal Tu scale indicates that the values of X corresponding to $0.06 \leq Tu \leq 0.14$.

FIG. 29 displays the X- and Y-dependences of Tu measured using a multi-hole probe and with the grid located at the indicated distances upstream of the test point. Immediately downstream of the grid, the values of Tu in planes perpendicular to the flow have the periodicity of the grid. In these planes, Tu maxima occur where $\langle V_x \rangle$ have minima, i.e. in the "wake" of the grid's cylinders. The periodicity attenuates as the X (downstream) coordinate increases. As evident in FIG. 29, when X>≈60 cm, the periodicity is smaller than the noise of the Tu measurements. In this range, the standard deviation of Tu measurements is 0.046 Tu, as indicated by the dashed lines in FIG. 29.

When X>≈60 cm, Tu is a function of X alone: Tu=4.55 $(X/cm)^{-0.832}$ in the range 66≤X/cm≤176, which corresponds to 0.06≤Tu≤0.14.

On the rare occasions when calibrations are desired at intensities greater than 0.14, the grid was replaced with an array of "flags" on a frame that was easily installed and removed from the wind tunnel. See FIG. 27, right. Each flag had been sewn around a rope that was tied to a frame. At airspeeds below 3 m/s, the flags moved only slightly and generated little turbulence. At airspeeds near 5 m/s, the flags generated turbulence with a wide frequency spectrum and with superimposed peaks near 5 Hz and its harmonics. Above 5 Hz, the peaks moved to higher frequencies and became less prominent.

At airspeeds above 15 m/s, the flags began to fray. To stabilize the flags, we trained the assembled flag array for approximately 30 minutes at 25 m/s. After the training, turbulence intensity measured 50 cm downstream from the array was stable with the value Tu=0.20 in airspeeds ranging from 5 m/s to 35 m/s.

Figure 30:
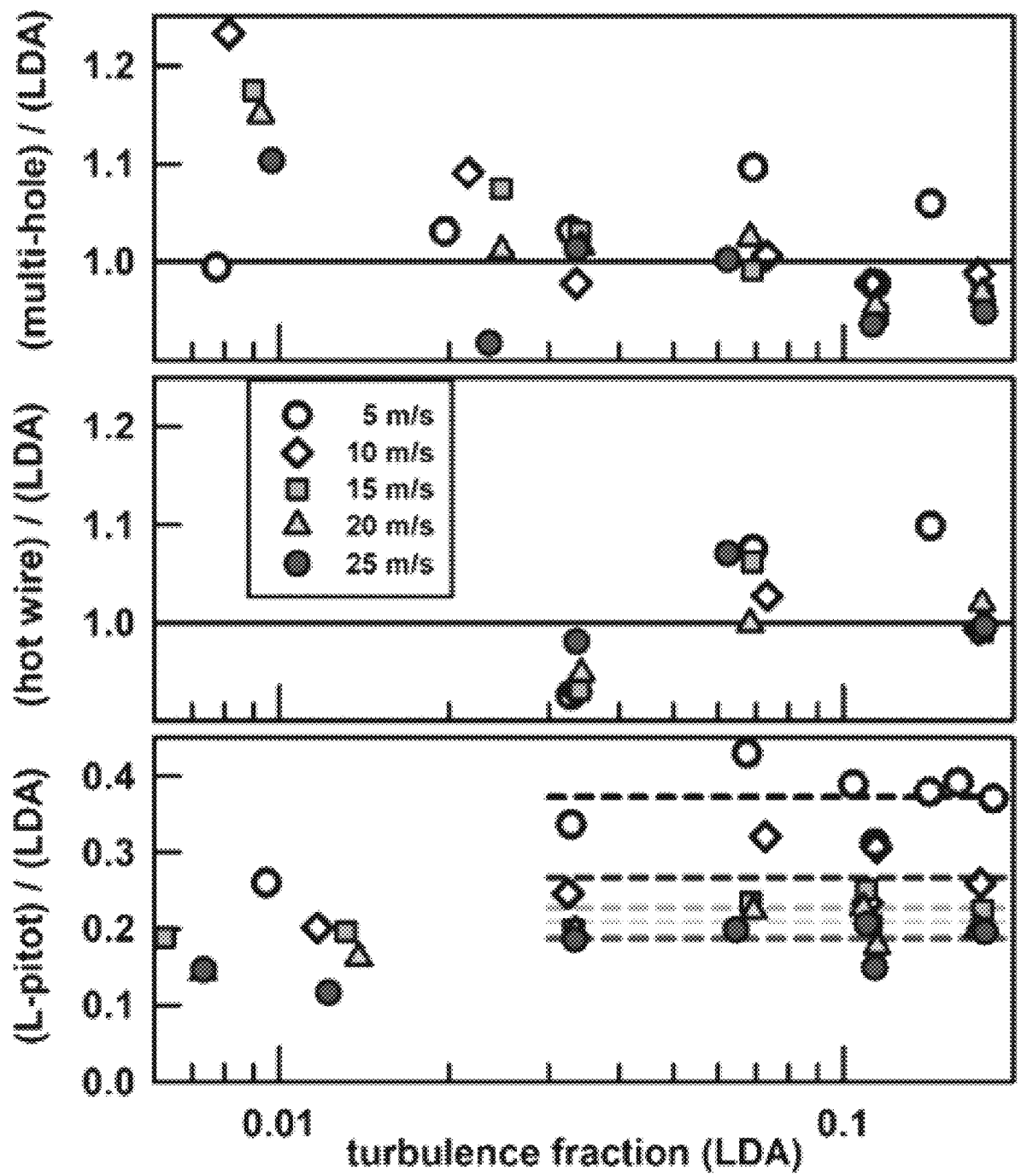
FIG. 30 shows turbulence intensities Tu measured with 4 instruments. The intensity ratios $Tu_{multi-hole}/Tu_{LDA}$ and $Tu_{hot-wire}/Tu_{LDA}$ are near 1.0, independent of airspeed and turbulence fraction. The ratios $Tu_{L-pitot}/Tu_{LDA}$ range from 0.19 to 0.37 (dashed lines), depending on airspeed.

Regarding measuring turbulence, we tested four methods of measuring turbulence intensity: (1) Laser Doppler anemometer, (2) high-frequency, 3-D, multi-hole pressure probe with integrated pressure sensors, (3), constant-temperature hot-wire, anemometer and (4) an L-shaped pitot tube. As shown in FIG. 30, methods (1), (2), and (3) were in mutual agreement (within the bounds ±0.10 Tu) in the range 0.02≤Tu≤0.20 and airspeeds from 5 m/s to 25 m/s. In contrast, the turbulence intensity ratios determined with the L-shaped pitot tube were only a fraction (0.19 $Tu_{LDA}$ to 0.37 $Tu_{LDA}$) of the values determined methods (1), (2), and (3). We did not study the origin of this difference. The high-frequency pressure fluctuations at the pitot tube's port might have been attenuated by the response time of the differential-pressure gauge and by the time constant associated with flow in the tube connecting the differential pressure gauge to the pitot tube. It is contemplated that, the pitot tube, together with its pressure transducer and the connecting tubes, could be calibrated as a unit to measure turbulence intensity.

To determine Tu and its standard uncertainty u(Tu) from the LDA, we recorded the data from the burst spectrum analyzer and computed the average value of the X-component of the velocity $\langle V_x \rangle$ and its relative standard deviation $\sigma_{Vx} = \langle V_x^2 \rangle^{1/2}/\langle V_x \rangle$. It is an approximation to replace $\langle V_x \rangle$ with $\langle V \rangle$ because $\langle V_x \rangle \gg \langle V_y \rangle$ and $\langle V_x \rangle \gg \langle V_z \rangle$. We assume that $\sigma_{Vx}$ has two, uncorrelated sources: (1) background velocity fluctuations with the relative standard deviation $\sigma_{Vx,bg}$ that are always present, even in the absence of turbulence-generating grids, and (2) grid-generated fluctuations with the relative standard deviation $\sigma_{Vx,grid}$. (The background fluctuations occur because the spacing of the interference fringes generated by the LDA varies by approximately ±3% across the sensing volume and because the tracer oil droplets pass through the sensing volume at random values of the Y- and Z-coordinates.) The grid-generated turbulence is isotropic; therefore, we will simplify the notation by replacing $\sigma_{Vx,bg}$ and $\sigma_{Vx,grid}$ with $\sigma_{bg}$ and $\sigma_{grid}$. We computed the turbulence intensity Tu from each burst spectrum by subtracting the background velocity fluctuations from the velocity fluctuations when the grid was present:

$$Tu = \sqrt{\sigma_{grid}^2 - \sigma_{bg}^2}.$$

To determine the statistical contribution to the standard uncertainty u(Tu) we must measure Tu many times and characterize its fluctuations. This leads us to determine the standard deviation of Tu (itself a relative standard deviation) from a sequence of burst spectra using:

$$u(Tu) = \sqrt{\sigma_{grid}^2(\sigma(\sigma_{grid}))^2 + \sigma_{bg}^2(\sigma(\sigma_{bg}))^2}.$$

When the turbulence-generating grid was placed at three locations upstream of the test point (X=−3.56 m, −1.06 m, −2.00 m) the turbulence intensities and their expanded uncertainties were Tu±U(Tu)=0.0258±0.0026, 0.0532±0.0032, 0.0950±0.0051, respectively.

Regarding blockage corrections to LDA measurements. to calibrate probes, NIST measures the probe's response to a uniform flow in the X-direction as a function of $\langle V_x \rangle$, Tu, α, and β. The widely-used, uniform-flow convention is appropriate for mapping the flow in cross-sections of power-plant stacks with diameters that are much larger than the dimensions of the probe and its supports. In the absence of grid-generated turbulence, NIST's wind tunnel generates an excellent approximation to a uniform flow field. $(\Delta \langle V_x \rangle / \langle V_x \rangle < 0.002$ over an area of 0.4 m×0.4 m in the Y-Z plane. However, the uniformity of the flow field is destroyed when any bluff object (such as pressure probe undergoing calibration) is inserted into the flow. For an accurate calibration, the probe must be "distant" from the sensing volume of the LDA that determines $\langle V_x \rangle$. Alternatively, the LDA-determined values of $\langle V_x \rangle$ must be corrected to account for probe-generated non-uniformity in the flow field. This correction is called a "LDA sensing volume blockage correction". This blockage correction is independent of the boundary layers separating the walls of the wind tunnel from the average flow in the tunnel.

Figure 31:
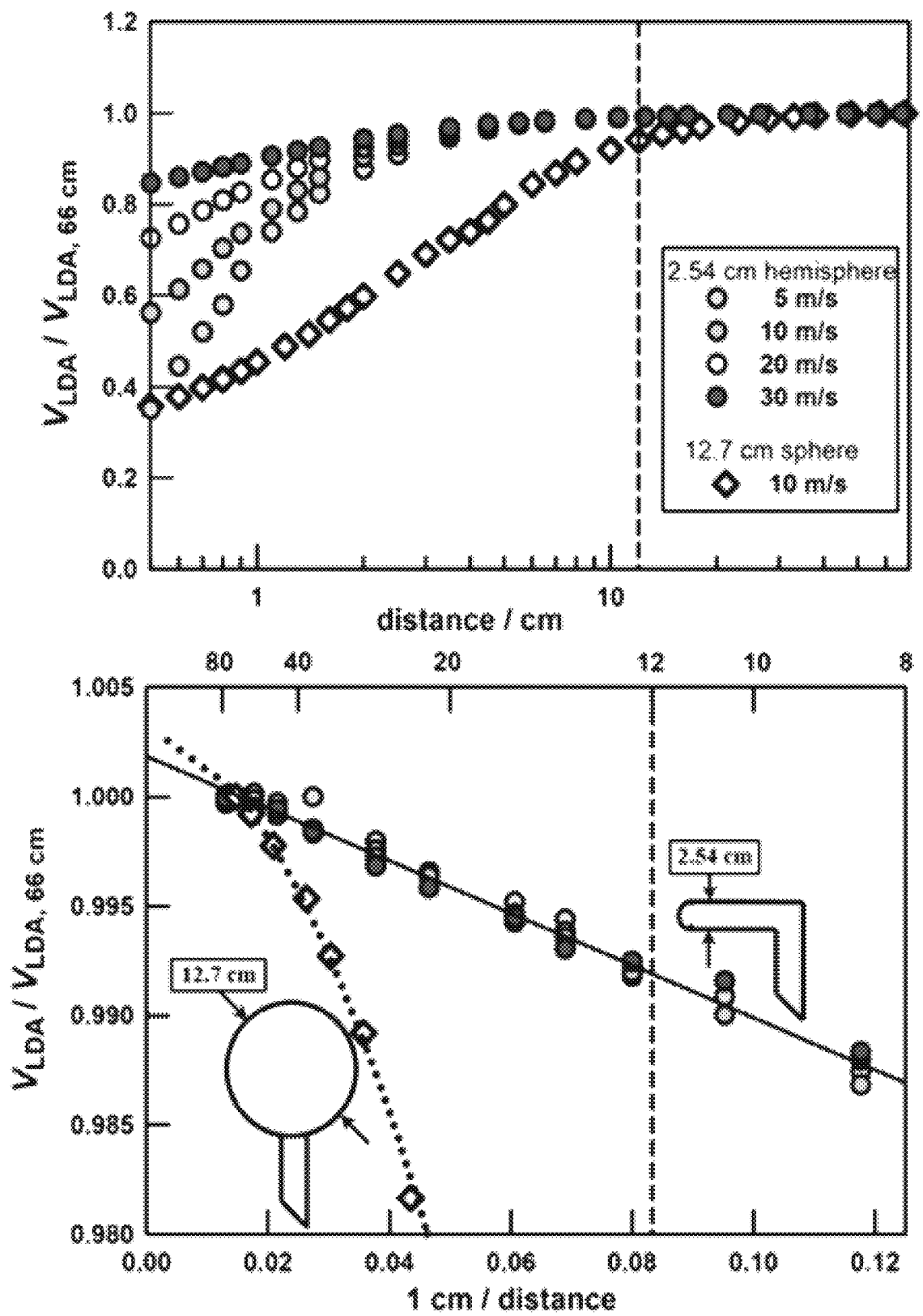
FIG. 31 shows: (Top) measured airspeed as a function of two probes' distances downstream from the LDA. Bottom: Subset of data from top as a function of inverse distance. The dotted curve and solid line show extrapolations to infinite distance. The vertical dashed lines at 12 cm indicate the position of a typical probe during a calibration.

FIG. 31 displays measurements of the blockage effect for two test objects: (1) a 2.54 cm diameter, hemispherical differential-pressure probe and (2) a 12.7 cm diameter sphere. Each of these objects was mounted on a carbon fiber tube (2.54 cm diameter) that extended from the center of the wind tunnel to the translation-rotation stages outside the tunnel. To vary the blockage, the tube was translated in the X-direction, as indicated by the dashed outline in FIG. 22. During these measurements, the wind tunnel did not contain turbulence-generating structures and the air speed was maintained near 10 m/s.

The upper panel of FIG. 31 is a plot of the ratio of two LDA-determined velocities $V_{LDA}/V_{LDA, 66\ cm}$ as a function of the distance measured on a streamline between the sensing volume of the LDA and the spherical surface of the test object. (The subscript "66 cm" indicates $V_{LDA}$ measured 66 cm upstream from the test object.) The legend of FIG. 31 identifies the data sets by their free-stream velocity $V_{LDA, \infty}$. At small distances from the hemispherical probe, $V_{LDA}/V_{LDA, 66\ cm}$ has a strong dependence on $V_{LDA, \infty}$. The dependence on $V_{LDA, \infty}$ attenuates with increasing distance as emphasized in the lower panel of FIG. 31. The lower panel of FIG. 31 expands the vertical scale of the upper panel by a factor of 80 and replaces the horizontal axis by the reciprocal of the distance. The reciprocal-distance facilitates extrapolating the data to determine $V_{LDA, \infty}$. For flows ranging from 5 m/s to 30 m/s and at distances greater than 8 cm, the data for the hemispherical probe are independent of $V_{LDA, \infty}$ and they are consistent with the linear function: $V_{LDA}/V_{LDA, 66\ cm} = 1.0019 - 0.120 \times (\text{distance/cm})^{-1}$.

FIG. 31 shows that, at 10 m/s, blockage effects for the 12.7 cm diameter sphere are much larger than those for the 2.54 cm probe and they are consistent with the empirical function: $V_{LDA}/V_{LDA, 66\ cm} = 1.003 - 7.1 \times (\text{distance/cm})^{-1.87}$.

Figure 32:
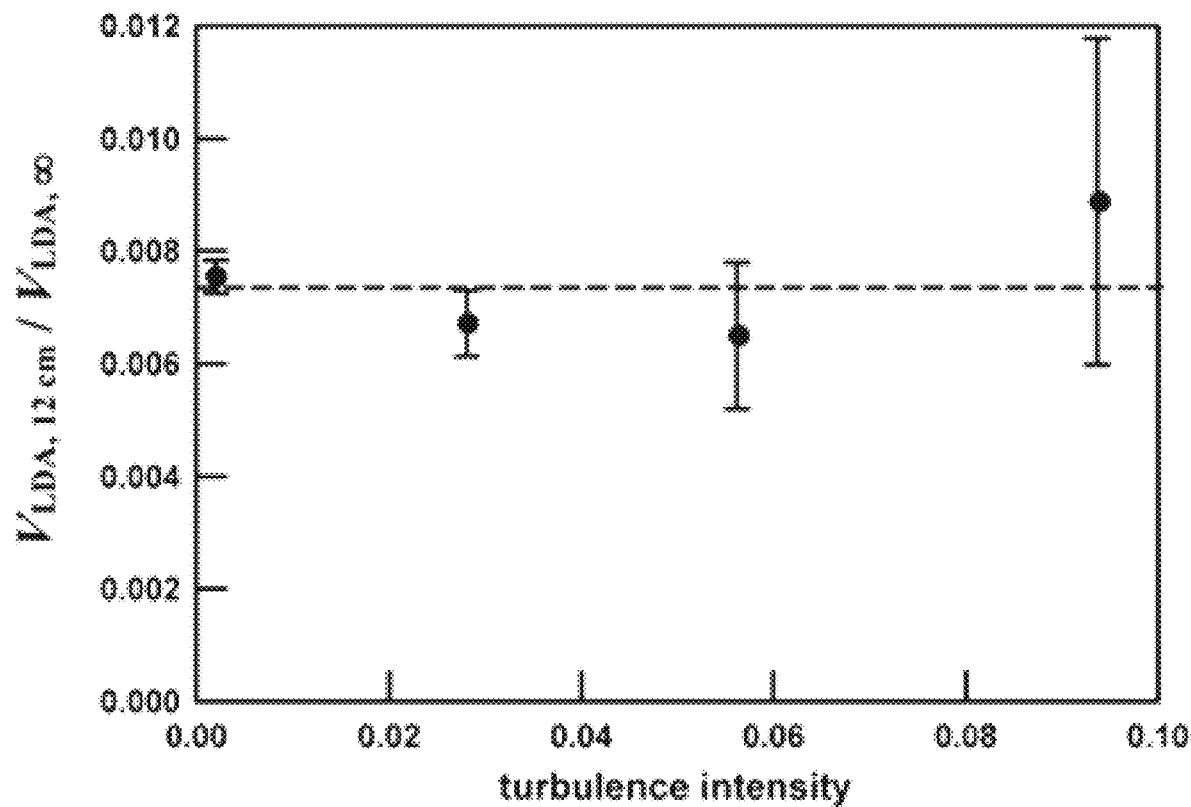
FIG. 32 shows turbulence dependence of blockage by an EPA-accepted multi-hole probe measured at 10 m/s. The uncertainty bars represent the standard deviation of the mean of 5 independent measurements. The dashed line represents the uncertainty-weighted mean of the plotted points. The data are consistent with the blockage being independent of the turbulence intensity.

When a turbulence-generating grid is present in NIST's wind tunnel, $\langle V_x \rangle$ in most of the Y-Z plane has the periodicity of the grid. (Near the walls of the wind tunnel, $\langle V_x \rangle$ has additional significant variation.) Therefore, calibrations in high turbulence require the instrument under test (IUT) to be located directly downstream from the LDA. Fundamentally, blockage effects depend on the ratio of the air speed to the rate pressure waves propagate (i.e., Mach number), and should be independent of the level of turbulence intensity. Nevertheless, we searched for a turbulence-dependence of the blockage, by installing an EPA-accepted multi-hole probe just downstream of the LDA with an air speed of 10 m/s. The turbulence-generating grid was placed at three locations upstream of the test point (X=−1.06 m, −2.00 m, or −3.56 m). As shown in FIG. 32, the blockage was independent of the turbulence, within the noise of the measurements.

Regarding calibration data for multi-hole differential pressure probe, for faster, more accurate, flue gas flow measurements in power plants, we acquired data displayed in FIG. 33. The displayed data are a small fraction of the data that are needed to characterize the response of a 5-hole spherical probe for flue gas measurements. The full data set comprises the pressures measured at all 5 ports (relative to the static pressure) at pitch and yaw intervals of 2° at air speeds of 5 m/s, 10 m/s, 20 m/s, and 30 m/s and at 4 turbulence intensities. Routine acquisition of such large data sets for customer-provided probes is prohibitively expensive, even using a fully automated calibration system. One thrust of our research is to document methods of characterizing multi-hole spherical (and other) probes with much smaller data seta. This might be done by comparing the responses of each customer's probe to the corresponding responses of a nominally-identical "master" probe under only a few calibration conditions. Alternatively, the master probe could be replaced with a numerical and/or analytical model for the responses of an ideal probe.

Figure 34:
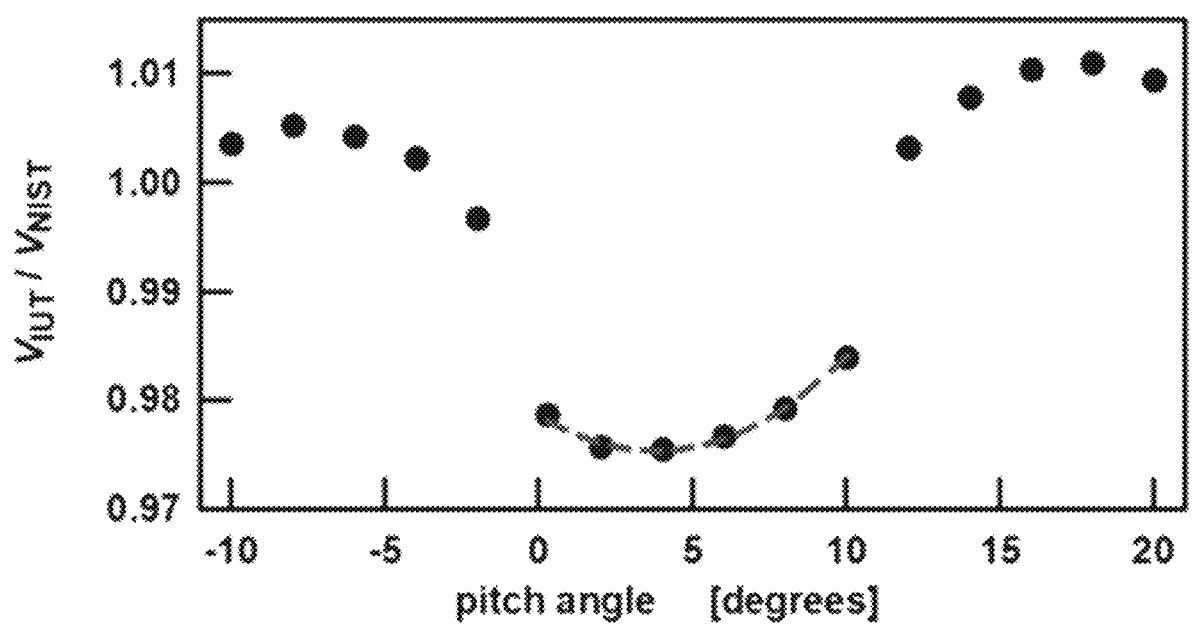
FIG. 34 shows pitch dependence of the calibration factor of a vane anemometer at an air speed near 10 m/s.

Regarding a vane anemometer, an anemometer including "vanes" or a "propeller" or an "impellor" rotates about an axis parallel to the wind direction. FIG. 34 is a sample of calibration data for a rotating vane anemometer with a protective cylindrical ring (or frame) surrounding the vanes. In FIG. 34, the zero on the pitch axis is arbitrary because no effort was made to align the anemometer's rotation axis with the axis of the wind tunnel. The plotted data show that the calibration factor $V_{IUT}/V_{NIST}$ is insensitive to small changes of the pitch angle α at approximately α=4°. This angle was used to calibrate the IUT as a function of air speed. FIG. 34 also shows that the calibration factor steps up when the pitch angle jumps decreases near α≈−1° or increases near α≈12°. We speculate that the frame begins to shadow the vanes at these angles.

Figure 35:
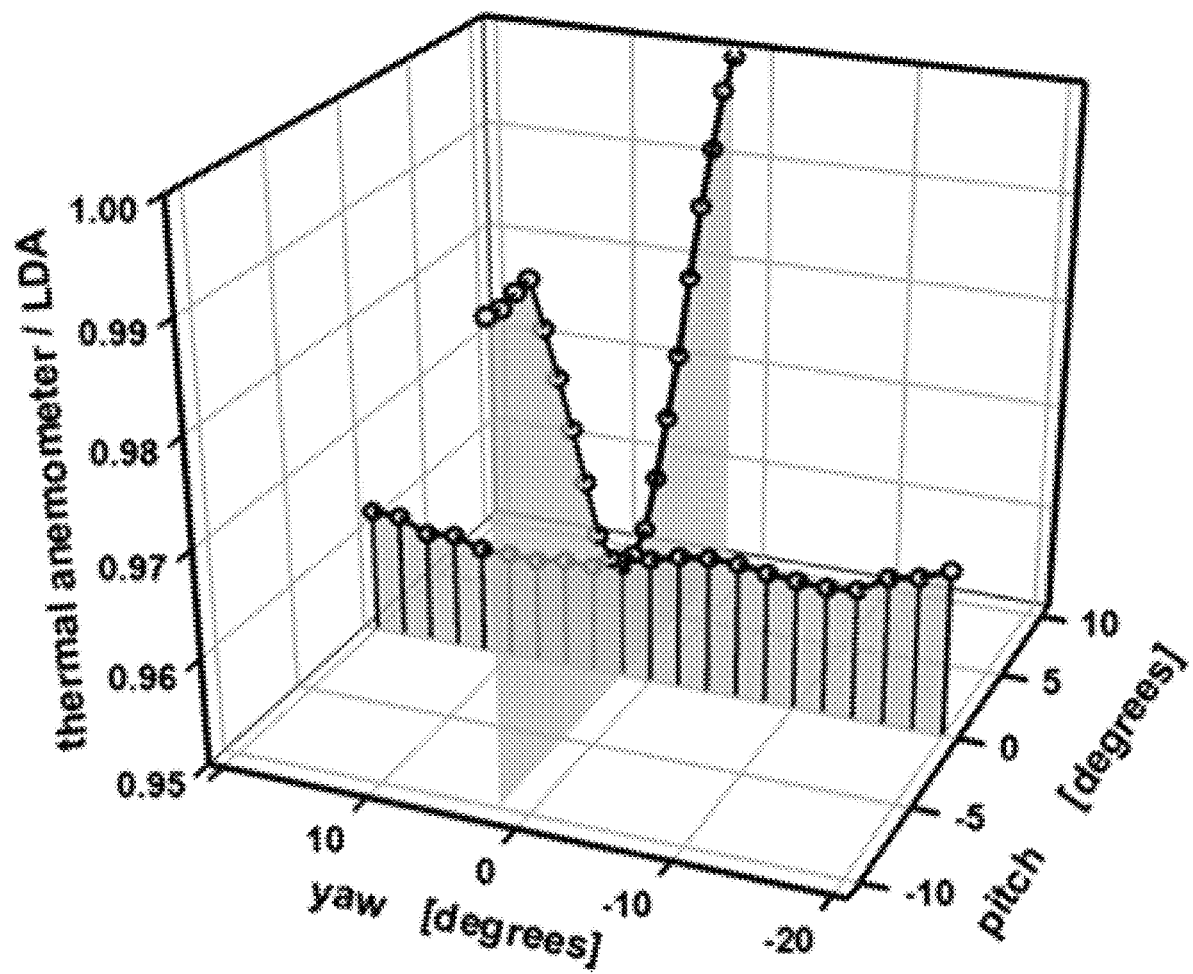
FIG. 35 shows a calibration factor of a thermal anemometer at an air speed near 10 m/s.

With regard to thermal anemometer, FIG. 35 displays some of the calibration data for a thermal anemometer that was designed to be insensitive to its orientation with respect to the average wind speed. This anemometer's calibration factor was remarkably insensitive to the yaw angle; however, it did have an easily measured dependence on the pitch angle.

Regarding uncertainties, we tabulated uncertainty contributions from misalignment of the spinning disk with respect to the LDA, thermal expansion of the disk, the LDA's optical system, the clock of the burst spectrum analyzer, and of the LDA the clock, and the alignment of the IUT with respect to the LDA. All these uncertainty contributions were negligible in comparison with the (k=2, expanded) 0.41% uncertainty of the calibration factor of the LDA relative to the spinning disk standard in range 0.2 m/s to 10 m/s. Blockage effects can be significantly larger than the uncertainty of the LDA calibration factor; however, we correct for blockage.

Example 3. Non-Nulling Measurements of Flue Gas Flows in a Coal-Fired Power Plant Stack Exhaust flows from coal-fired stacks are determined by measuring the flue gas velocity at prescribed points in the stack cross section. During the last 30 years these velocity measurements have been made predominantly using S-type pitot probes. These probes are inexpensive; however, S-probes measure only two components of the velocity vector and can give biased results if the stack flow has significant yaw and pitch angles. Furthermore, S-probe measurements are time intensive, requiring probe rotation (or nulling) at each traverse point to find the yaw angle. The only EPA-sanctioned alternatives to the S-probe are 5-hole probes (i.e., the prism probe and spherical probe) that also require yaw-nulling. We developed a non-nulling technique applicable to the spherical probe and two custom designed 5-hole probes that reduce testing time and may improve measurement accuracy. The non-nulling technique measures all 3 components of velocity without rotating the probe. We assessed the performance of these 5-hole probes in a coal-fired stack at the high-load (16 m/s) and the low-load (7 m/s). For the spherical probes, the non-nulling results and the nulling results were in excellent mutual agreement (<0.1%). For the custom probes, the non-nulling and nulling results were inconsistent: the differences were 5% at the high load and 10% at the low load. The non-nulling technique can accurately measure flue gas flows in a coal-fired stack.

Combustion gases from coal-fired power plants (CFPPs) are exhausted into large diameter (>5 m), vertically oriented smokestacks, which emit pollutants into the atmosphere. To quantify the amount of pollutants released into the atmosphere, the total flow in these stacks must be accurately measured; however, accurate stack flow measurements are difficult. Stacks are fed by a network of elbows, reducers, fans, etc. which generate complex, difficult-to-measure flows. The flue gas itself causes additional difficulties because it can be hot (as high as 120° C.), acidic, asphyxiating, and in some cases saturated with water vapor. Nevertheless, accurate measurements of the total flue gas flow are essential to monitor emissions of greenhouse gases (GHGs) and other hazardous pollutants.

Pollutant emissions from CFPPs are quantified by continuous emission monitoring systems (CEMS) permanently installed in the stacks. The CEMS equipment measures the concentration of each regulated pollutant as well as the total flow. Federal regulations require annual calibration of the CEMS flow monitors and concentration equipment. These calibrations are performed using an EPA protocol called a relative accuracy test audit (RATA). The flow portion of the calibration is herein referred to as the flow RATA.

Regarding how stack flows are conventionally measured, the flow RATA maps the axial stack velocity measured along two orthogonal chords in the stack cross-section. A pitot probe is inserted into the flow through ports on the stack wall. On each chord, measurements are made at discrete points located at the centroids of equal area. The discrete velocity measurements are integrated to determine the flow velocity, which in turn, is used to determine the correction factor for the CEMS flow meter.

Figure 36:
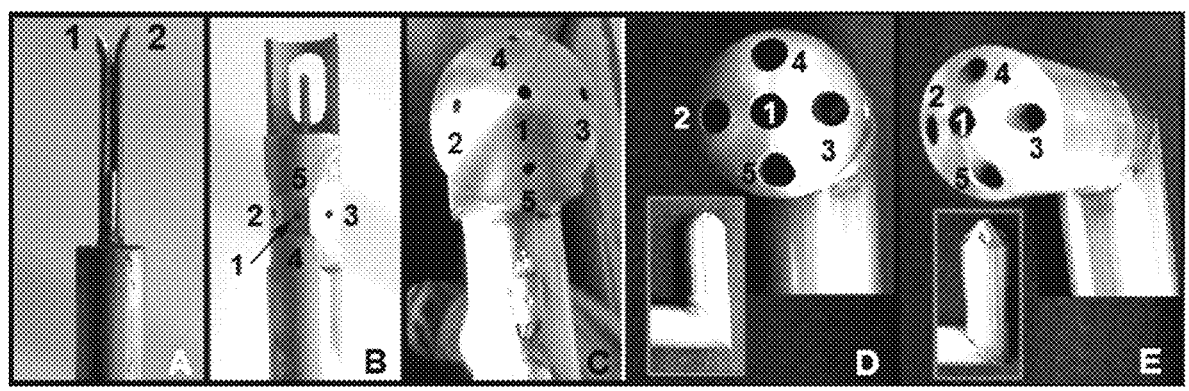
FIG. 36 shows panels A, B, and C for the 3 EPA-sanctioned RATA probes including A) the S-probe, B) Prism probe, and C) Spherical Probe. The hemispherical and conical probes shown in D) and E), respectively are custom-made probes designed for non-nulling.

FIGS. 36A, B, and C show the three RATA probe types sanctioned by the EPA including A) the S-probe, B) the prism probe, and C) the spherical probe. All 3 probes use the same measurement principle. The axial velocity is correlated to differential pressure measurements made across the probe's pressure ports. Both the prism and the spherical probe have 5 pressure ports and both measure the entire velocity vector including the pitch, yaw, and axial velocity components. In contrast, the S-probe measures only the yaw and axial velocities, and has been shown to give flow velocities that are biased high if significant pitch and yaw are present in the flow.

About the nulling method, the 3 EPA-sanctioned probes use a yaw-nulling method to determine the angle of off-axis flow in the yaw direction, which we call the yaw-null angle ($\beta_{null}$). At each point on the RATA map, the probe is nulled by rotating it about its axis until the vector sum of the yaw and axial velocities align with pressure port 1. For a 3-D probe the nulling procedure can be accomplished in a single rotation. The S-probe requires 2 rotations. First the S-probe is nulled by rotating it about its axis until $P_{12}=0$. A second 90° rotation orients port 1 so that it faces into the flow. Once the probe is nulled, the probe calibration parameters are used to determine the dynamic pressure ($P_{dyn}$), and for 3-D probes the pitch angle ($\alpha$).

About errors due to imperfect nulling, if the null condition is not satisfied, significant flow measurement errors can occur. The nulling errors increase with the ratio $\Delta P_{null}/P_{dyn}$, where the null-differential-pressure $\Delta P_{null}=P_{23}$ for 3-D probes and $\Delta P_{null}=P_{12}$ for the S-probe. The errors become significant when $\Delta P_{null}/P_{dyn}$ is not small relative to unity. In most cases the nulling procedure is performed manually. A person rotates the probe while reading a differential pressure gauge to determine the exact yaw angle for which $\Delta P_{null}=0$. However, transients in stack flows, noisy pressure signals, and human errors make nulling imperfect and introduce unquantified bias (e.g. high for an S-probe) into the measurement process.

When the velocity field has a significant yaw component, nulling the probe can be time-intensive and, consequently, expensive. When mapping the flow field, several iterations are generally required to find the yaw-null angle at each traverse point. The nulling time increases in wet stacks since stack testers must frequently interrupt the measurement process to purge the probe's pressure ports of droplets or particles. Because 3-D probes have more pressure ports than S-probes, and because the diameters of these ports are smaller than the ports of S-probes, 3-D probes are more susceptible to plugging. Consequently, 3-D probes generally require more time than the S-probe to complete the flow RATA. Historically the stack flow measurement community has opted to use the more robust and economical, but less accurate, S-probe.

About a non-nulling method, non-nulling methods determine the axial velocity without rotating the probe at each traverse point to find $\beta_{null}$. Instead, the axial velocity, the pitch angle, and the yaw-null angle $\beta_{null}$ are determined with the probe oriented at zero yaw angle (i.e., $\beta=0°$ such that port 1 on the probe is aligned with the stack axis). Compared with nulling methods, non-nulling methods reduce the time needed to perform flow RATAs. CFPPs are concerned about the duration of flow RATAs because they must maintain loads stipulated by the RATA instead of loads dictated by customer supply and demand.

The non-nulling method also has the potential to improve flow measurement accuracy compared with nulling methods. First, the S-probe measures only 2 components of the velocity vector while the non-nulling method applies to 3-D probes and thereby measures the entire velocity vector. Second, Method 2F, which is the EPA nulling method for 3-D probes, does not address errors resulting from imperfect nulling, as discussed above.

In this example, we describe accurately determining the total flow in a CFPP stack using a non-nulling method and commercially available flow RATA equipment. In previous work, we achieved 1% accuracy when we performed flow RATAs in NIST's Scale-Model Smokestack Simulator (SMSS) using a spherical probe, even with highly-distorted flows. However, the SMSS facility uses ambient air as surrogate for flue gas and performs flow RATAs under laboratory conditions using laboratory grade instrumentation.

Using NIST's wind tunnel and NIST's smokestack simulator, we developed non-nulling algorithms for the spherical probe in FIG. 36C and for the two custom probes shown in FIG. 36D and FIG. 36E. At NIST, we calibrated these probes using our non-nulling method and also EPA's Method 2F, and then we used these probes to measure the flow velocity in a CFPP stack.

For assessing the accuracy and limitations of the non-nulling method, we selected a CFPP stack known to have complex flows. The selected stack's RATA measurement platform was only 3.8 stack diameters (D=6.8 m) downstream of a 90° elbow. Moreover, upstream of the elbow, flow from two wet scrubbers merged into a single stream. Not surprisingly, the flow at the RATA platform had significant yaw-null angles that were nearly −30° at the stack wall. The flue gas was saturated with water from the wet scrubbers. The wet, particle-laden gas frequently plugged the 3-D probes; plugging increased the duration of the tests and resulted in false high (or low) axial velocity measurements both for Method 2F and the non-nulling method. We developed a statistical method based on the noisiness of the measured pressure signals to identify data affected by plugging.

The CFPP stack was equipped with an X-pattern ultrasonic flow meter system, which was used as the CEMS flow monitor. The CFPP provided us with minute by minute CEMS flow velocity data ($V_{CEMS}$) for the duration of the test. On average, the stability of $V_{CEMS}$ during the flow RATAs was better than 1.5%. We performed a 16-point flow RATA using both Method 2F and the non-nulling method. The flow RATAs were performed at two loads, a high load with a flue gas velocity of 16 m/s, and at a low load of 7 m/s.

The non-nulling method and Method 2F showed agreement for the spherical probes. As indicated in the last column, the difference at high load was −0.1% and at low load the difference was 0%. The flow results from the non-nulling method were consistent throughout the test. The percent difference of $V_{NN}/V_{CEMS}$ determined with the spherical probes and the custom probes was only −0.4% at high load and −2.3% at low load. $V_{NN}/V_{CEMS}$ is close to unity in all cases. This agreement between $V_{NN}$ and $V_{CEMS}$ is better than expected. The values of $V_{CEMS}$ are based on an earlier S-probe RATA calibration that used the conventional nulling method. Our values of $V_{NN}$ are based on a 16-point traverse that did not account for the lower velocities near the wall. If we had accounted the lower velocities, we would have found $V_{NN}<V_{CEMS}$. We measured pitch angles less than 5°, so that S-probe errors related to pitch angle are negligible in this stack. The results of Method 2F and the non-nulling method showed poor agreement for the custom probes: the differences are 5.9% at high load and 10% at low load. These results are erroneous for the following reasons: a) the non-nulling results were consistent for all tests and agreed with the results obtained with the EPA-sanctioned spherical probe, b) in cases where RATAs based on Method 2F disagree with the S-probe nulling method, the Method 2F results are typically lower due to inherent positive biases in the S-probe.

We calibrated all 3 probe types in NIST's wind tunnel using both Method 2F and the non-nulling method. Calibrations were performed in the wind tunnel's rectangular test section (1.5 m×1.2 m) using NIST's Laser Doppler Anemometer (LDA) working standard. The metrological traceability of the LDA working standard is documented. We use the LDA velocity ($U_{LDA}$) in conjunction with air density ($\rho_{AIR}$) in the wind tunnel to determine the dynamic pressure, $P_{dyn}=\rho_{AIR}U_{LDA}^2/2$. The wind tunnel is equipped with an automated traversing system, which positions the pitot probes to prescribed pitch angles ($\alpha$) and yaw angles ($\beta$) in the test section. The expanded uncertainty of wind speed is less than 1%, and the expanded uncertainties of pitch and yaw angles are 0.5°.

We calibrated four spherical probes, two hemispherical probes, and two conical probes. All the probes were calibrated at 11 velocities ranging from 5 m/s to 30 m/s in steps of 2.5 m/s, and at 17 pitch angles ranging from −20° to 20° in steps of 2.5°. Thus, for each probe we measured 187 combined velocity and pitch angle set points. We used curve fitting to determine the pitch calibration factor, $F_1$, and the velocity calibration, $F_2$, at the null condition ($P_{23}=0$). The curve fit method does not require rotating the probe to the exact position where $P_{23}=0$; instead the pitch pressure ratio, $P_{45}/P_{12}$, and the velocity pressure ratio, $[P_{dyn}/P_{12}]^{1/2}$, are measured over a narrow range of yaw pressures surrounding $P_{23}=0$. By definition, the pitch pressure ratio and the velocity pressure ratio equal the respective calibration factors, $F_1=P_{45}/P_{12}$ and $F_2=[P_{dyn}/P_{12}]^{1/2}$ at zero yaw pressure, $P_{23}=0$. The measured values of the pitch pressure ratio and the velocity pressure ratio values are fit by either a $2^{nd}$ or $3^{rd}$ degree polynomial function of the yaw pressure, which we evaluate at $P_{23}=0$ to determine the respective null parameters, $F_1$ and $F_2$.

Figure 38:
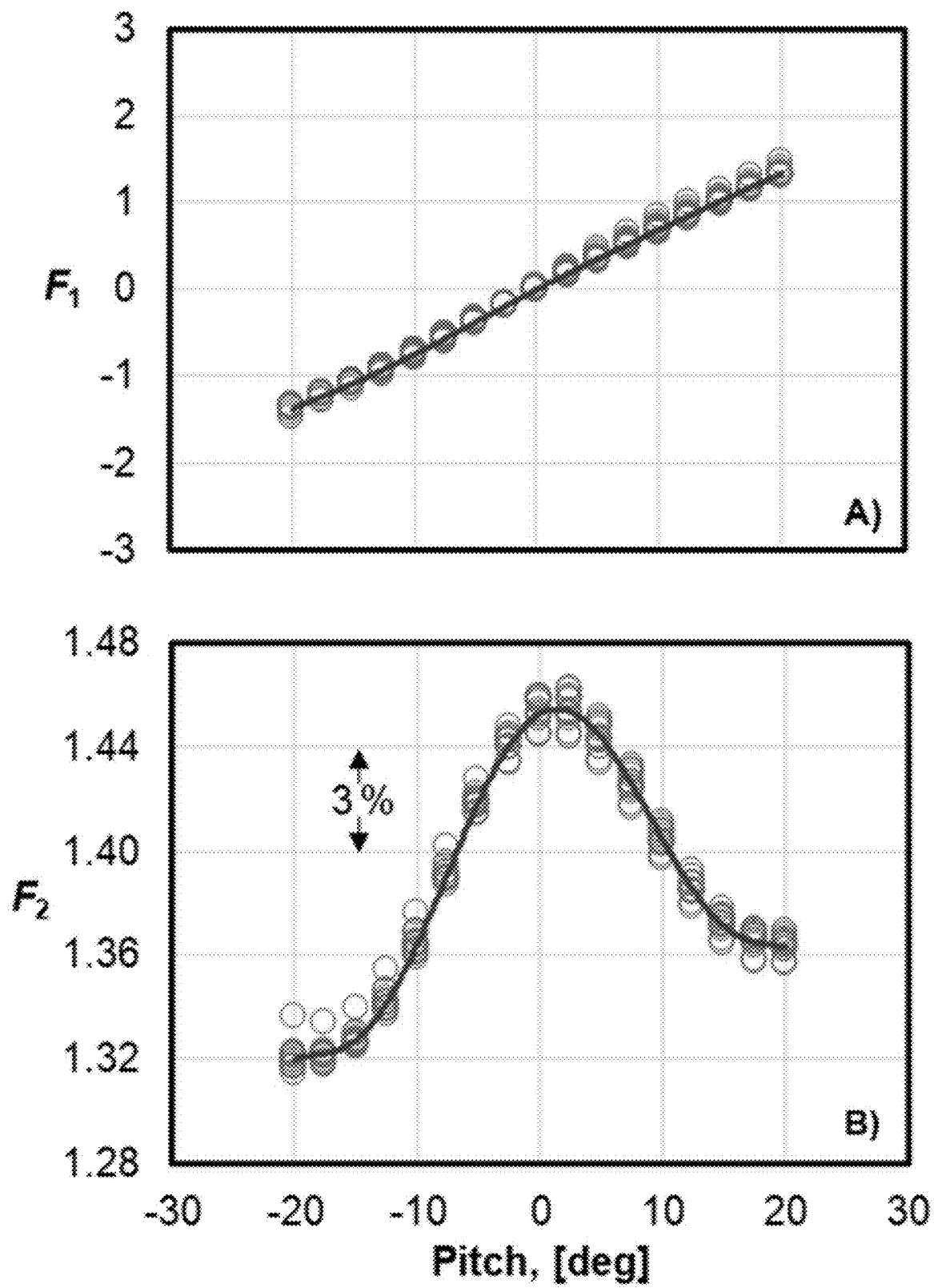
FIG. 38 shows hemispherical probe $F_1$ and $F_2$ calibration parameters plotted versus pitch angle. The circles are data points taken at 11 different velocities and the solid line is a curve fitted to the points.
Figure 39:
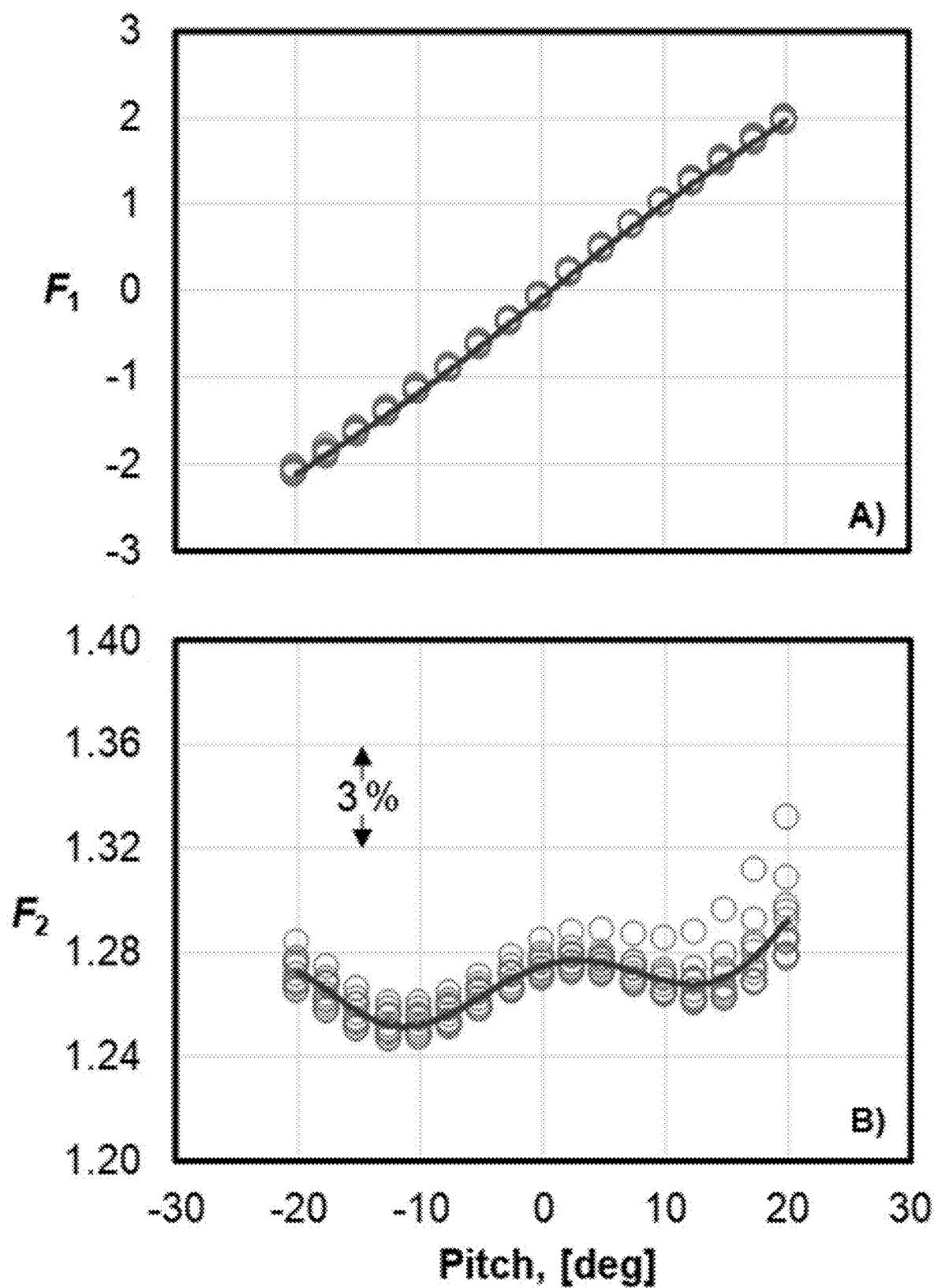
FIG. 39 shows conical probe $F_1$ and $F_2$ calibration parameters plotted versus pitch angle. The circles are data points taken at the 11 different velocities and the solid line is a curve fitted to the points.

FIG. 38 and FIG. 39 shows plots for the calibration parameters $F_1$ and $F_2$ as functions of the pitch angle for a hemispherical probe (FIG. 36D) and a conical probe (FIG. 36E). The circles are data taken at the 11 different velocities ranging from 5 m/s to 30 m/s. For both probes, $F_1$ is nearly independent of velocity, but $F_2$ exhibits a small, systematic velocity dependence. The solid lines are curves fitted to the data. The pitch angle ($\alpha$) is fitted by a $6^{th}$ degree polynomial of independent variable $F_1$, and $F_2$ is fit to $6^{th}$ degree polynomial of $\alpha$.

As observed in FIG. 38B and FIG. 39B, the curve fit of $F_2$ appears as an average of the velocity data at each pitch angle. This approximate method of accounting for the velocity dependence is consistent with the Method 2F protocol.

For flow RATAs performed using Method 2F, we determined the axial velocity at each traverse point using the following procedure. First, we nulled the probe and measured the yaw-null angle ($\beta_{null}$) with an inclinometer. Next, we determined the pitch calibration factor, $F_1=P_{45}/P_{12}$, from the measured null pressures $P_{45}$ and $P_{12}$. We use the $6^{th}$ degree polynomial determined during calibration, $\alpha=\alpha(F_1)$ (here expressed in generic functional form) to determine $\alpha$. Then, the calculated a is used to determine the velocity calibration factor using the fitted curve $F_2=F_2(\alpha)$ developed during calibration. The differential pressure between ports 1 and 2 on the probe head along with the velocity calibration factor determine the dynamic pressure, $P_{dyn}=F_2^2P_{12}$. Finally, the axial velocity at each traverse point is determined as a function of the 1) dynamic pressure, 2) yaw-null angle, and 3) pitch angle using $$V_{axial} = \sqrt{\frac{2P_{dyn}}{\rho}} \cos(\beta_{null} - \beta_0)\cos(\alpha) \quad (1)$$

wherein $\beta_0$ accounts for any yaw angle offset (or misalignment) when probes are installed into the automated traverse system used to perform the flow RATA. We followed EPA Method 4 to measure the flue gas moisture, and we used EPA Method 3A to determine the molar mass. The flue gas density (ρ) was determined via Method 2F using pressure, temperature, and molar mass measurements.

Regarding non-nulling probe calibrations, the non-nulling method can also use Eq. (1) to determine the axial velocity at each traverse point. A difference is that $P_{dyn}$, $\beta_{null}$, and $\alpha$ are determined by fitting 3000 or more data points acquired in NIST's wind tunnel. These data span velocities from 5 m/s to 30 m/s, pitch angles from −20° to 20°, and yaw angles from −42° to 42°. The fitted calibration curve is a fifth-degree polynomial of the four independent variables: $P_{12}$, $P_{13}$, $P_{14}$, and $P_{15}$.

For the non-nulling method, there is no need to rotate the probe. However, since scenarios could arise where rotating the probe is beneficial (e.g., the predicted value of $\beta_{null}$ exceeds the curve fit limits), we discuss a more general application of the non-nulling method. First the probe is rotated to a user-selected yaw angle (β). Next, we simultaneously measure the four input pressures: $P_{12}$, $P_{13}$, $P_{14}$, and $P_{15}$, and use the non-nulling calibration curve fits to calculate $P_{dyn}$, $\beta'_{null}$, and $\alpha$. Here, $\beta'_{null}$ is the calculated yaw-null angle relative to the rotated probe position at β. The absolute yaw-null angle is the sum of the probe yaw angle and the yaw-null angle determined from the non-nulling algorithm, $$\beta_{null} = \beta + \beta'_{null}. \quad (2)$$

If the probe is oriented at a zero yaw angle (β=0°), then the yaw-null angle determined by the non-nulling algorithm equals the yaw angle measured from the stack axis, $\beta'_{null} = \beta_{null}$. Alternatively, if one rotates the probe to the yaw-null angle, $\beta = \beta_{null}$, then $\beta'_{null}$ would be zero, ideally. In this case any changes in $\beta'_{null}$ would provide an indication of how the yaw-null angle fluctuates while the probe is oriented at the yaw-angle.

Figure 40:
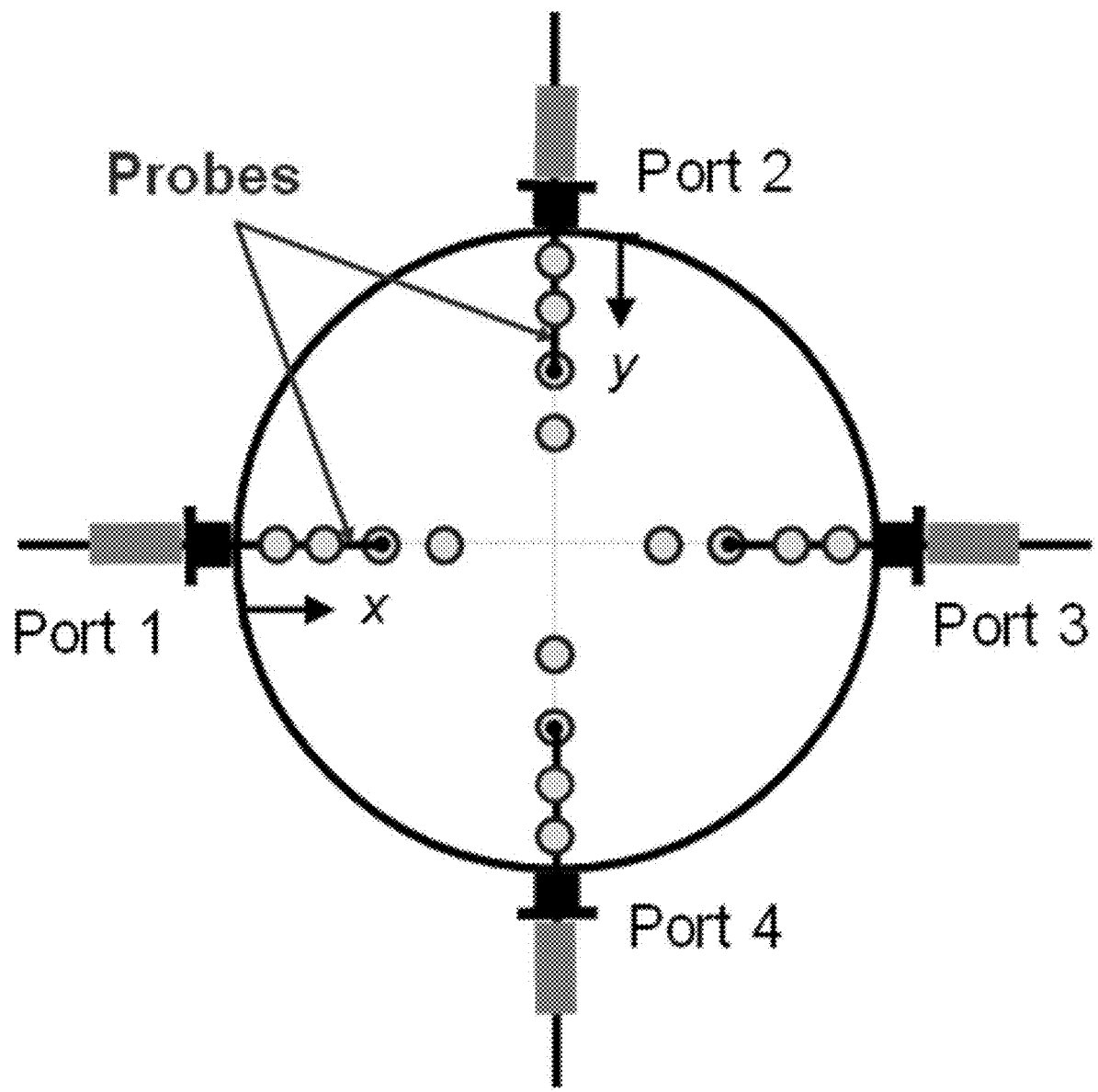
FIG. 40 shows a cross-section of stack showing probes, port numbers and 16 traverse points located at centroids of equal stack area.

Regarding a test protocol for stack flow measurements, we conducted 16-point flow RATAs using multiple probe types. We used a set of 4 spherical probes (see FIG. 36C), and we also used a combination of the 2 custom probes shown in FIG. 36D and FIG. 36E. We tested each probe type at 2 loads, a high load with a nominal flow velocity of 16 m/s, and a low load of 7 m/s. The test matrix shown in FIG. 41 lists the probes used for each test, the flow loads, and the number of repeated runs. The diagram in FIG. 40 shows the cross-sectional view of the setup. The probe installed in each port measures the axial velocity of the nearest 4 points as illustrated in the figure. A complete traverse, herein called a run, includes all 16 points shown in the figure. We completed 4 runs for each probe type at the high load and 6 runs for each probe type at the low load.

Our test protocol was conducted with RATA equipment that include a multiple automated probe system (MAP) to perform five functions: 1) move all 4 probes simultaneously to specified points; 2) periodically supply high pressure gas to purge droplets or particles plugging any of the 5 pressure ports on the probe head; 3) send a DC voltage to the data acquisition system 5 s prior to starting a purge, 4) implement the Method 2F nulling procedure including the measurement of $\beta_{null}$ and $\beta_0$; and 5) provide time stamps at the start and stop of each non-nulling and Method 2F measurement intervals.

To collect non-nulling and Method 2F data, we designed and assembled four data acquisition systems that were connected to a single laptop computer. Each system included inexpensive, industrial-grade differential pressure transducers, which we sampled at 10 Hz. The transducers were bidirectional with a full-scale of 1244 Pa and a time response faster than 1 kHz. We used pneumatically actuated valves to isolate the differential pressure transducers during purge events. The transducers and valves for each system were housed in a weather-proof case. Each case was placed on the floor of the RATA measurement platform just below the port where the corresponding probe was installed. Each case contained 5 pressure transducers that were connected to the 5 pressure ports on the 3-D probe using 6.35 mm inner diameter tubes approximately 13 m long. In this way, we measured the flue gas pressure (minus a near ambient reference pressure, $P_{ref}$, located inside the case) at all 5 pressure ports on the probe head. The required differential pressures for the non-nulling algorithm (i.e., $P_{12}$, $P_{13}$, $P_{14}$, $P_{15}$) and for Method 2F (i.e., $P_{23}$, $P_{12}$, $P_{45}$) were calculated by subtracting the appropriate pressure measurements. For example, the yaw pressure was determined by subtracting the measured pressures on port 2 from port 3, $P_{23}=(P_2-P_{ref})-(P_3-P_{ref})$.

Each of the 4 tests listed in FIG. 41 began by starting the data acquisition unit. Pressure data were collected throughout the test except during purge events, which occurred approximately once every minute. During purge events, valves isolated the transducers from the purge pressure while simultaneously re-zeroing the transducers to the common reference pressure.

The same measurement protocol was followed at each traverse point. The MAP system simultaneously moved the 4 probes to the specified traverse point and rotated each probe to a zero yaw angle. After a 3 s stabilization period, the axial velocity ($V_{NN@0yaw}$) was measured for 10 s using the non-nulling algorithm. Next, the MAP system nulled each probe and recorded its $\beta_{null}$. After another 3 s stabilization period we measured the axial velocity for 10 s via Method 2F ($V_{M2F}$) and the non-nulling method ($V_{NN@null}$). Thus, we measured 3 velocities at each traverse point: 1) non-nulling with the probe at zero yaw; $V_{NN@0yaw}$, 2) Method 2F at the yaw-null angle; $V_{M2F}$, and 3) a second non-nulling measurement coincident with $V_{M2F}$ where the probe is oriented at the yaw-null angle; $V_{NN@null}$. The second non-nulling measurement provided insight regarding the steadiness of the yaw-null angle, and could be directly compared to $V_{M2F}$ since both measurements were made simultaneously.

The 3 axial velocities (i.e., $V_{NN@0yaw}$, $V_{M2F}$, and $V_{NN@null}$) measured at each traverse point are all calculated using Eq. (1). However, the algorithms for determining $P_{dyn}$, $\beta_{null}$, and $\alpha$ differ for the non-nulling method and Method 2F.

Method 2F determines the average axial velocity and pitch angle from pressure averages. Specifically, we calculated $P_{12,avg}$ and $P_{45,avg}$, which are arithmetic averages of $P_{12}$ and $P_{45}$ sampled at 10 Hz for 10 s.

In contrast, our implementation of the non-nulling method determines the average dynamic pressure ($P_{dyn}$), yaw-null angle ($\beta_{null}$) and pitch angle (α) from time averages. These quantities are calculated every 0.1 s when $P_{12}$, $P_{13}$, $P_{14}$, and $P_{15}$ are updated. At the end of the 10 s collection interval, we calculate the arithmetic average of the 100 values of $P_{dyn}$, $\beta_{null}$, and α. As expected for the steady flows in NIST's wind tunnel, the values of $P_{dyn}$, $\beta_{null}$, and α computed from the pressure averages and the time averages were indistinguishable. If transients are present in the stack flow, a time average may be more accurate than a pressure average. In the CFPP stack, we compared the axial velocities $V_{axial}$ determined from pressure averages and time averages in a few cases. For most of the comparisons, the values of $V_{axial}$ agreed to better than 1%; in a few cases $V_{axial}$ differed by 10% or more.

We processed the data after the field tests were completed. We used the time stamps provided by the MAP system to identify the non-nulling and Method 2F pressure data. For the low loads, approximately 20% of the data could not be found at the indicated time stamps. At the high load less than 5% of the data was unaccounted for.

FIG. 37 summarizes the average flow results. It provides solid evidence that the non-nulling method has the potential to make efficient, accurate stack flow measurements. We compare the profiles of velocity, yaw-null angle, and pitch angle determined by Method 2F to those determined by the non-nulling method.

The flow RATAs were performed along 2 orthogonal axes. We denote the axis extending from port 1 to port 3 in FIG. 4 as the "x-axis". The y-axis extended from port 2 to port 4. Each axis included 8 traverse points. The traverse points are located at the centroids of equal area, so that flow velocity of each run is calculated by averaging the axial velocities measured at 16 traverse points. The axial velocity, yaw-null angle, and pitch angle are plotted on the x/D and y/D axes, respectively, where D is the diameter of the stack.

Figure 42:
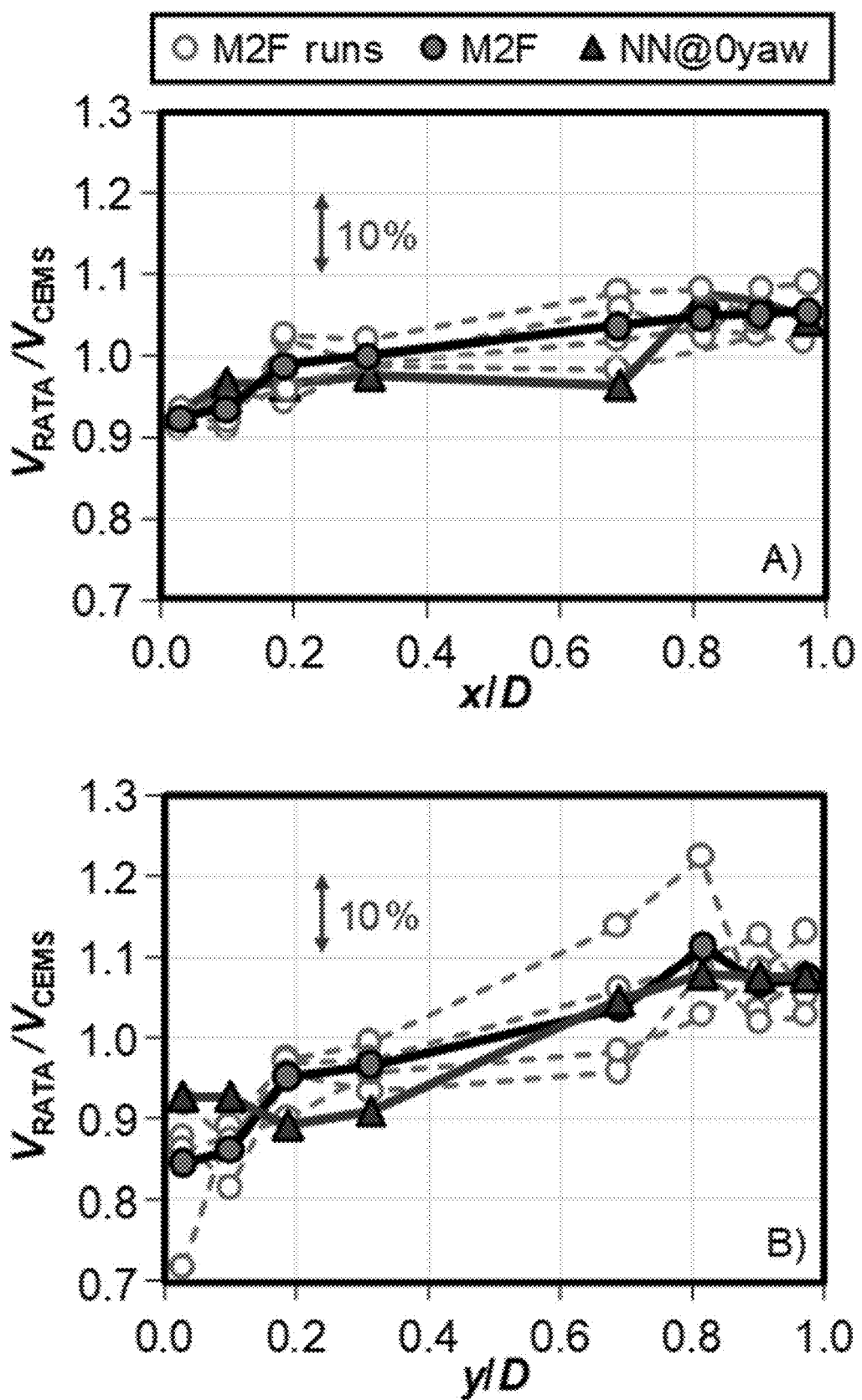
FIG. 42 shows Flow RATA for spherical probes at high load: Plots of normalized axial velocity versus A) x/D, and B) y/D.

Regarding axial velocity profiles, FIG. 42A and FIG. 42B show that while the load remained constant, the flow profile had large variations (greater than 10%) at particular locations. FIG. 42 is a plot of the normalized axial velocity ($V_{RATA}/V_{CEMS}$) measured using the spherical probes at high load as functions of x/D and y/D, respectively. The open circles (○) connected by dashed lines are Method 2F data from each of the 4 runs. The spacings between the dashed lines indicate profile variations. Despite these variations, the flow velocity of each Method 2F run is stable as shown in FIG. 43. The standard deviation expressed as a percent was only 2.1%.

We observed similar profile variations (not plotted) in the 4 non-nulling runs even though the standard deviation of the average velocity was only 0.4%.

The localized variations in the flow field indicated in FIG. 42A and FIG. 42B might be due to vortices. They are not artifacts of the measurements (e.g., caused by plugging or filtering the data) because the average flow velocity for each run is stable.

The solid circles and solid triangles in FIG. 42 are the averages of the Method 2F runs and the non-nulling runs, respectively. In FIG. 42A and FIG. 42B, the solid lines connecting the averaged points are close to each other. This agrees with Method 2F velocity profiles with the non-nulling velocity profiles. FIG. 43 shows that the difference in the averaged flow velocity is only −0.1%. Normalized velocity profiles measured at both high and low loads were similar to the profiles observed in FIG. 42A and FIG. 42B.

Figure 44:
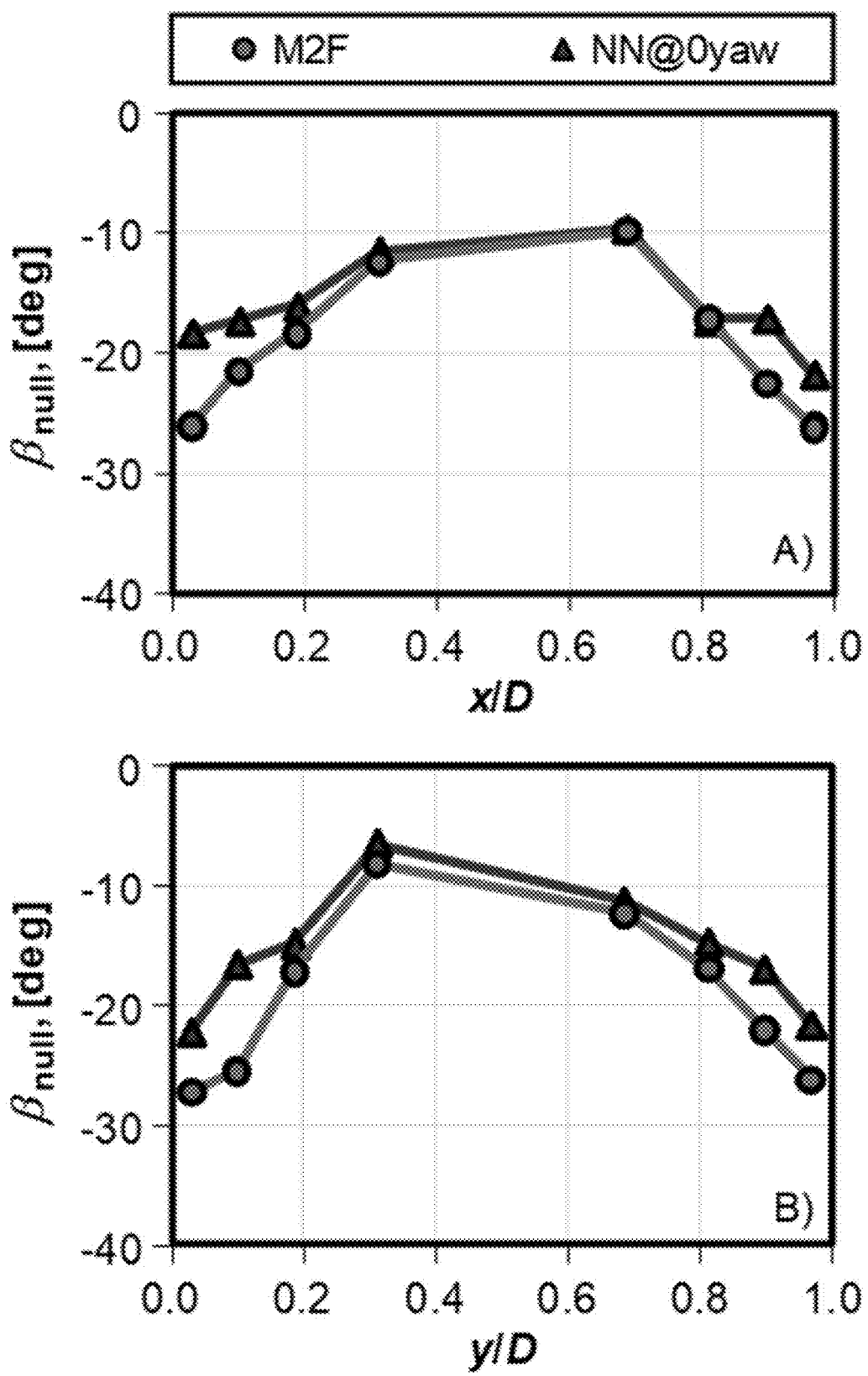
FIG. 44 shows yaw-null profiles determined using Method 2F (circles) and non-nulling with $\beta=0°$ (triangles) along A) port 1 to port 3, and B) port 2 to port 4.

Regarding yaw angle profiles, FIG. 44 shows average yaw-null profiles for the spherical probe at high load. The Method 2F data (circles) and non-nulling data (triangles) yaw-null angles show the same trend and agree in FIG. 44A and FIG. 44B. Both methods show the magnitudes of yaw-null angles are largest near the wall with a value of nearly 30°. The magnitude yaw-null angle decreases monotonically as one moves away from the wall toward the center of the stack. The differences between Method 2F and the non-nulling method are smallest near the center of the stack and increase to maximum of approximately 7° near the wall in the worst case.

Yaw-null profiles were nearly identical at low load. The same trends occurs as shown in FIG. 44A and FIG. 44B independent of probe type (i.e., spherical or custom) and method (i.e., non-nulling or Method 2F).

Figure 45:
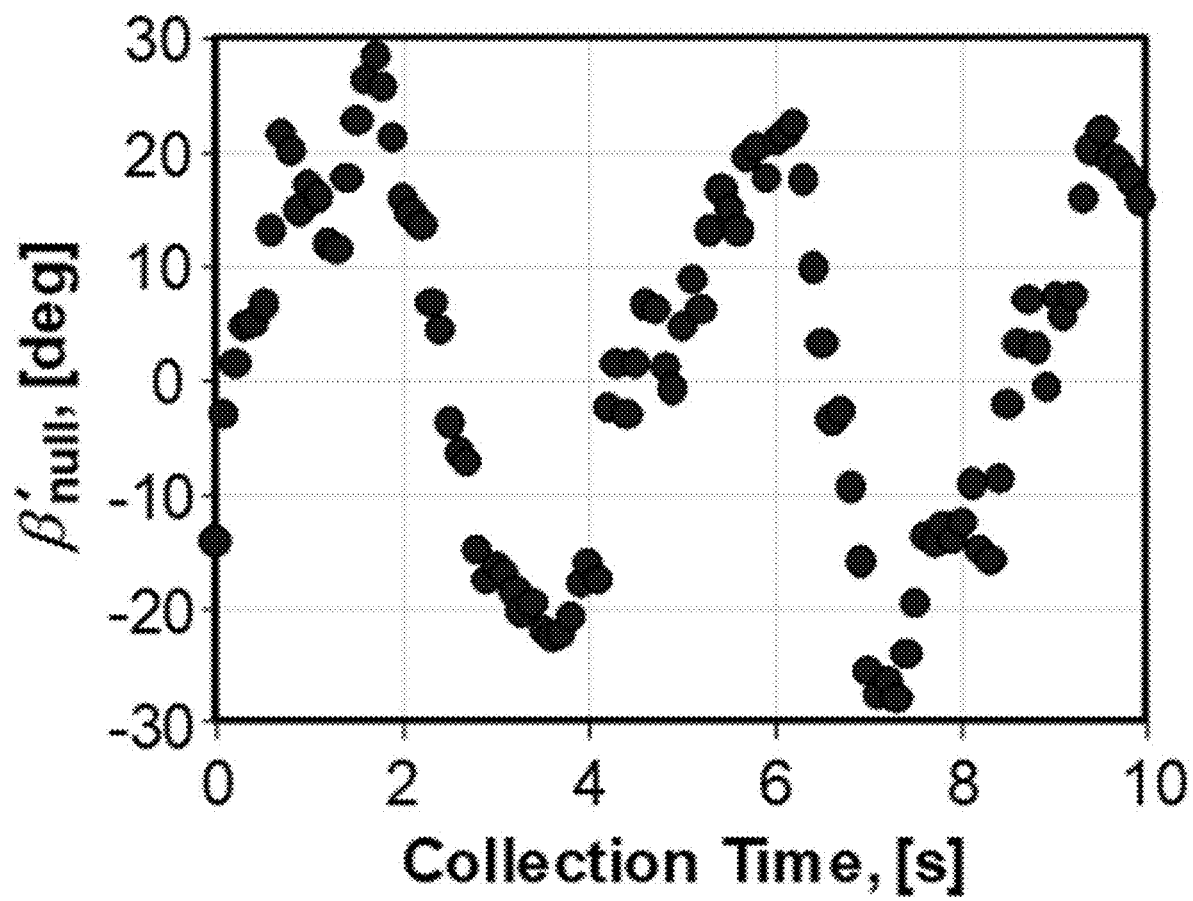
FIG. 45 shows sine-like oscillations of yaw-null angle during 10 s Method 2F data collection, wherein a Spherical probe was oriented at the yaw-null angle, and $\beta'_{null}$ was determined every 0.1 s using the non-nulling algorithm.

FIG. 45 shows plots for the yaw-null angle during a typical 10 s collection time with the probe oriented at $\beta=\beta_{null}$. Because the probe was nulled, the non-nulling algorithm measures $\beta'_{null}$ defined by Eq. (2). In a steady flow with low turbulence $\beta'_{null}$ would have a constant value close to 0° during the 10 s collection. In contrast, FIG. 45 has sine-like oscillations with an amplitude of nearly 30° and a period of approximately 4 s. Surprisingly, the integrated average of $\beta'_{null}$ is −1.5°, which is close to zero. This time-dependence of $\beta'_{null}$ is evidence that the flow field in the CFPP stack had large transients. FIG. 42A and FIG. 42B are additional evidence for large transients. Better averages could be obtained by averaging over more cycles (i.e., longer collection times) or by averaging over the 4 s period.

Figure 46:
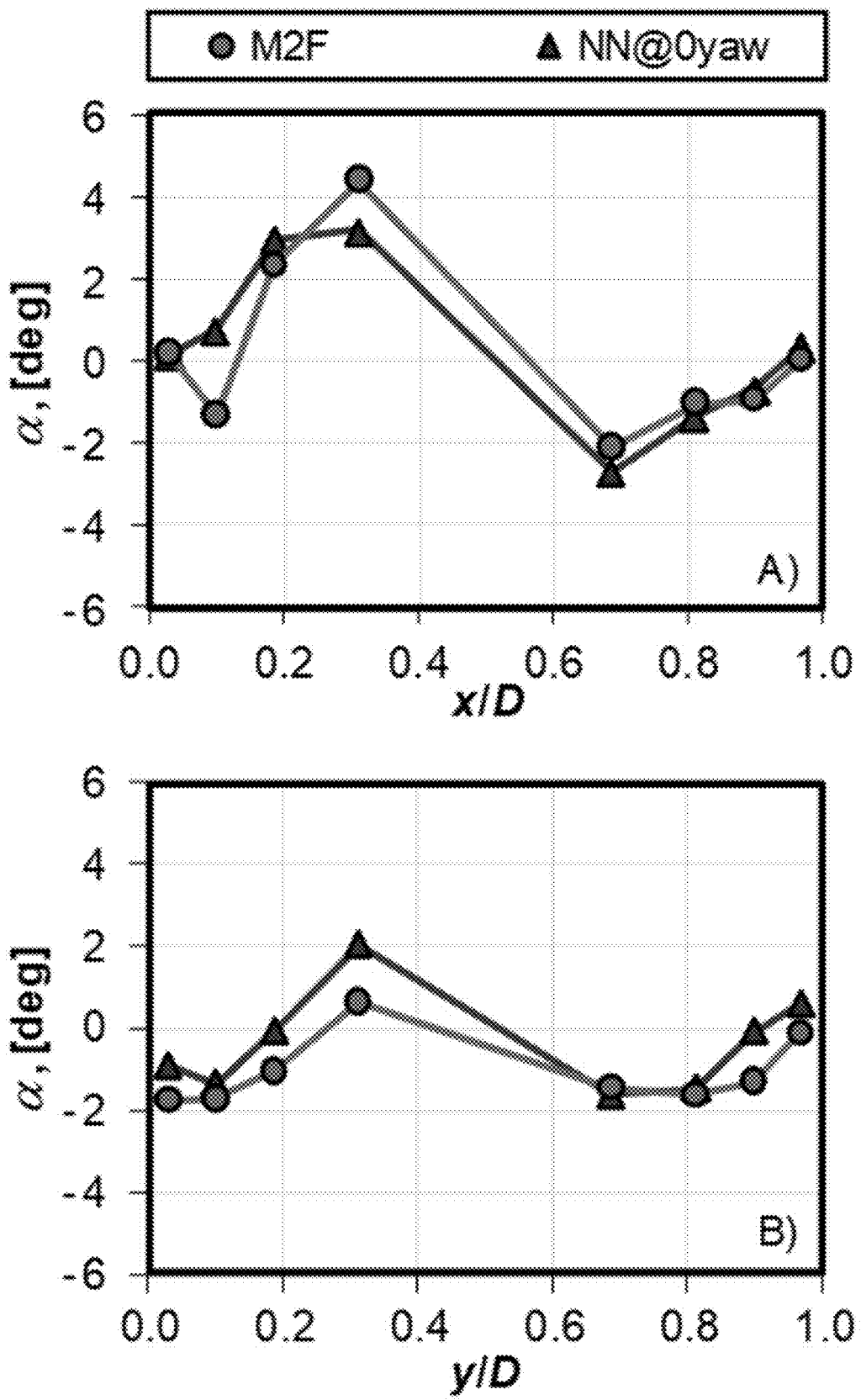
FIG. 46 shows Pitch angle profile for Test #1 according to Example 3.

Regarding pitch angle profiles, FIG. 46A and FIG. 46B show profiles of the pitch angle determined by Method 2F (indicated by circles) and by the non-nulling algorithm with $\beta=0°$ (indicated by triangles). These results correspond to Test #1 specified in FIG. 41. The pitch angles determined by Method 2F and by the non-nulling algorithm agree with each other and have similar, asymmetric dependences on x/D and y/D. We found the same characteristic profiles independent of flow load, probe type, and method. Although we hoped to perform the test in a stack with high pitch, the largest pitch angle was only about 5°.

Regarding troubleshooting plugging problems, to mitigate plugging we purged the probe pressure ports every 60 s. Nevertheless, we still had problems with plugging. Plugging issues were most severe for spherical probe 2 during Test #4 in Table 2. The 4 traverse points in port 1 seemed to be the most impacted by plugging problems.

One way to detect plugging is to evaluate the consistency of repeated axial velocity measurements made at the same traverse point. If significant deviations are found at the same traverse points from run to run, then plugging could be the culprit. We used a simple statistical approach to find outliers in the data caused by plugging.

The pressure signals ($P_{n,ref}$; n=1 to 5) for the five pressure ports on the probe head were noisy. That is, pressures fluctuations during non-nulling and during Method 2F were usually larger than the mean of the pressure signal. The noise could decrease if a pressure port on the probe head was plugged. For each 10 s collection time, we computed the standard deviation of the pressure signal from each pressure port on the probe head. If the standard deviation was below the typical noise level by a statistically defined threshold, we assumed that the port was plugged.

Figure 47:
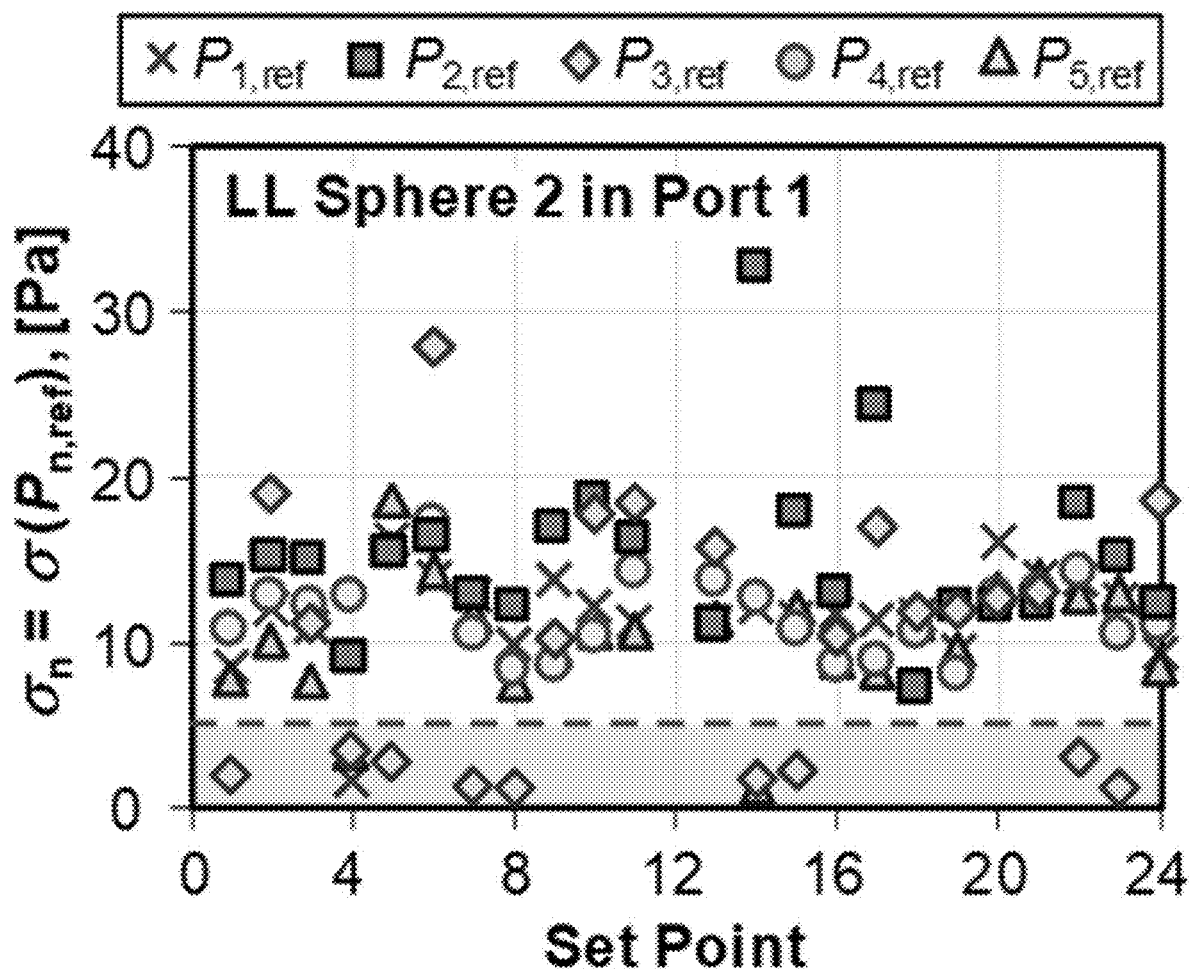
FIG. 47 shows standard deviation of pressure signals ($\sigma_n$) at n=1 to 5 pressure ports on the spherical probe head, wherein values of $\sigma_n$ below the dashed line indicate that port n was plugged.

FIG. 47 shows data obtained for the statistical approach to detect plugged pressure ports. This example focuses on the non-nulling measurements made at low load using spherical probe 2. The 24 set points on the x-axis correspond to the 4 traverse points for port 1 multiplied by the 6 repeated runs (see Test #4, FIG. 41). The y-axis is the standard deviation of the pressure signals $\sigma_n=\sigma(P_{n,ref})$ measured at the n=1 to 5 pressure ports on the probe head. We considered a pressure port plugged if the standard deviation was below the statistical limit indicated by the dashed line (--). For simplicity FIG. 9 only shows a single limit; however, in practice we used separate limits for each of the 5 pressure signals. The statistical limit for the $n^{th}$ probe was $$\mathrm{limit}_n = \langle \sigma_n \rangle - k\sigma(\sigma_n) \quad (3)$$

wherein $\langle \sigma_n \rangle$ is the average of the 24 values of $\sigma_n$; $\sigma(\sigma_n)$ is the standard deviation of the 24 values of $\sigma_n$; and k is the coverage factor which we set equal to 1.5. The computed normalized velocities had only a weak sensitivity to the value of k.

FIG. 48A compares two normalized velocity profiles, one affected by plugging, and the other calculated excluding the subset of data affected by plugging. The figure corresponds to traverses performed at low load using the spherical probes. The velocity ($V_{RATA}$) was determined using the non-nulling algorithm with the probe oriented at zero yaw angle. Each open triangle is the average of 6 repeated runs. The dashed line connecting the triangles shows the normalized axial velocity profile of the 8 traverse points between port 1 and port 3 (i.e., the x-axis). The first 4 points along x/D are traversed by the spherical probe 2 installed in port 1. The statistical approach illustrated in FIG. 47 might indicate that several of these points were affected by plugging. If these points are omitted when calculating the average axial velocity at each traverse point, we obtain the solid triangles. The solid line connecting the solid triangles shows the normalized velocity profile corrected to account for plugging.

If the normalized velocity profile (indicated by filled triangles) in FIG. 48A is correct, one might find the same profile at low load independent probe type (i.e., spherical or custom) and independent of the method (i.e., non-nulling or Method 2F). Moreover, for these high Reynolds number flows ($3 \times 10^6$ to $6.5 \times 10^6$) we expect that the high load normalized velocity profile will have essentially the same shape as the low load. FIG. 48B shows that all normalized profiles agree with the corrected profile. The agreement of these profiles provides evidence that we successfully identified and removed data affected by plugging, and that the non-nulling method performed well independent of probe type and flow load.

This example shows results that the non-nulling method accurately measured complex flows in CFPP stacks. We conducted 16-point flow RATAs 3.8 stack diameters downstream of the 90° elbow at the stack inlet, and we measured yaw-null angles approaching −30° near the stack wall. We found excellent agreement between the non-nulling method and Method 2F using spherical probes. The results from FIG. 37 show agreement of −0.1% at a high load of 16 m/s and 0.0% at a low load of 7 m/s. Similar levels of agreement occurred between Method 2F and the non-nulling method when we conducted flow RATAs in NIST Scale-Model Smokestack Simulator (SMSS). The non-nulling method gives the same flow results but is more time and cost efficient than Method 2F.

The SMSS facility uses air as a surrogate for flue gas and has a 1.2 m diameter test section. The facility can generate complex flows that have yaw-null angles of almost 40° at the wall. The excellent non-nulling flow results found in the SMSS are analogous to those found in this study of a CFPP stack. Thus, the SMSS facility is a satisfactory research facility for characterizing probes used for flow RATAs, ultrasonic CEMS, and other flow monitors for use in CFPP stacks.

We developed hemispherical and conical non-nulling pitot probes and compared their performance in a CFPP stack with the EPA-sanctioned spherical probe using the non-nulling method. The non-nulling flow velocities at high and low loads were consistent for all probe types. After normalizing the measured axial velocities by the CEMS velocity, we found essentially the same characteristic profiles at low and high loads across both orthogonal chords. The normalized Method 2F axial velocities also exhibited the same profiles across the chords.

The non-nulling method measured consistent pitch and yaw-null angles using all the probe types at both high and low loads. Therefore, in future flow RATA testing, a hybrid non-nulling method can be implemented. That is, if while performing a flow RATA using the non-nulling method one has reason to question the axial velocity measurement, the RATA tester can rotate the probe to the calculated yaw-null angle and take a Method 2F measurement.

The non-nulling method requires bidirectional, fast response differential pressure transducers. We used industrial grade differential transducers for our stack measurements. We measured the pressure (minus a common reference pressure) at each of the 5 ports on the 3-D probe. Pressure measurements were sampled at 10 Hz. They revealed periodic pressure fluctuations with periods ranging between 3 s and 5 s. These transients could not be observed or adequately accounted for (e.g., averaging over the periods) using Method 2F. In contrast, the non-nulling data processing could easily be modified to perform averages over the period.

We used an automated traverse system to reduce the RATA times and to improve the accuracy of nulling the probes. The benefits of automated traverses are less important for the non-nulling method than for nulling methods because the non-nulling method does not rotate the probe rotation and eliminates errors from imperfect nulling.

Despite purging every 60 seconds, conventional spherical probes became plugged most frequently at low load. We did not experience the same difficulties with the two non-nulling pitot probes.

For accurate flow measurements, we distinguished fluctuations of the axial velocity from plugging of one or more pressure ports by detecting the reduction in the pressure noise that occurs when a pressure port is plugged. Without plugging, the fluctuations of the pressure signals were often larger than their mean values. For each pressure signal, during each 10 s data collection period, we used the standard deviation of the pressure from its mean as a measure of its noise. We did not process the noise data in real time. After all the measurements were completed, we used a statistical criterion to discard data corrupted by plugging. We can process the noise data as they are acquired during a RATA. If the noise indicates plugging the probe can be purged and the data retaken. Thus, the noise measurements can be a diagnostic to guide the data acquisition and not to discard data.

This example describes a 3000-point calibration on each probe used for the non-nulling measurements. Such an extensive calibration may not be practical for routine flow RATAs. A baseline non-nulling calibration can be applied to all probes of the same type such that a calibration can be done to correct for slight manufacturing differences.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix (s) as used herein is intended to include both the singular and the plural of the term that it modifies, thereby including at least one of that term (e.g., the colorant(s) includes at least one colorants). Option, optional, or optionally means that the subsequently described event or circumstance can or cannot occur, and that the description includes instances where the event occurs and instances where it does not. As used herein, combination is inclusive of blends, mixtures, alloys, reaction products, collection of elements, and the like.

As used herein, a combination thereof refers to a combination comprising at least one of the named constituents, components, compounds, or elements, optionally together with one or more of the same class of constituents, components, compounds, or elements.

All references are incorporated herein by reference.

The use of the terms "a," "an," and "the" and similar referents in the context of describing the invention (especially in the context of the following claims) are to be construed to cover both the singular and the plural, unless otherwise indicated herein or clearly contradicted by context. It can further be noted that the terms first, second, primary, secondary, and the like herein do not denote any order, quantity, or importance, but rather are used to distinguish one element from another. It will also be understood that, although the terms first, second, etc. are, in some instances, used herein to describe various elements, these elements should not be limited by these terms. For example, a first current could be termed a second current, and, similarly, a second current could be termed a first current, without departing from the scope of the various described embodiments. The first current and the second current are both currents, but they are not the same condition unless explicitly stated as such.

The modifier about used in connection with a quantity is inclusive of the stated value and has the meaning dictated by the context (e.g., it includes the degree of error associated with measurement of the particular quantity). The conjunction or is used to link objects of a list or alternatives and is not disjunctive; rather the elements can be used separately or can be combined together under appropriate circumstances.

What is claimed is:

1. A non-nulling gas velocity measurement apparatus for performing non-nulling measurement of gas velocity parameters, the non-nulling gas velocity measurement apparatus comprising:
    a non-nulling pitot probe comprising:
        an aerodynamic flow head comprising a plurality of entrant apertures that comprises a central entrant aperture and a plurality of peripheral entrant aperture arranged radially from the central entrant aperture, such that the entrant apertures receive a gas flow from a gas source;
        an entrant body tube disposed on the aerodynamic flow head;
        an extensor body tube disposed on the entrant body tube such that the entrant body tube is interposed between the aerodynamic flow head and the extensor body tube, such that extensor body tube is arranged at an oblique angle to the entrant body tube; and
        a plurality of pressure channels disposed in the aerodynamic flow head, the entrant body tube, and the extensor body tube, such that each entrant aperture is separately and independently in fluid communication with one of the pressure channels, and each pressure channel independently receives and communicates the gas flow as stagnant gas from the entrant aperture of which the pressure channel is in communication; and
    a plurality of gas valves such that each gas valve:
        is in fluid communication with a different entrant aperture of the non-nulling pitot probe via a different pressure channel;
        receives stagnant gas from the respective entrant aperture;
        receives a reference gas;
        receives a valve control signal; and
        produces a valve-selected gas based on the valve control signal, the valve-selected gas consisting essentially of the reference gas or the stagnant gas; and
    a plurality of differential pressure transducers, such that each differential pressure transducer:
        is separately and independently in fluid communication with a different gas valve, and that gas valve communicates the valve-selected gas to the differential pressure transducer;
        receives the valve-selected gas from the gas valve;
        receives the reference gas at a reference gas pressure;
        compares a pressure of valve-selected gas to the reference gas pressure; and
        produces a differential pressure signal from comparison of the pressure of the valve-selected gas to the reference gas pressure.

2. The non-nulling gas velocity measurement apparatus of claim 1, further comprising a plurality of sample gas lines, such that each sample gas line separately interconnects one pressure channel with one of the gas valves for communicating the gas flow received by the respective entrant aperture to the respective gas valve as the stagnant gas.

3. The non-nulling gas velocity measurement apparatus of claim 1, further comprising a plurality of valve outlet gas lines, such that each valve outlet gas line separately interconnects one gas valve with one of the differential pressure transducers for communicating the valve-selected gas from the gas valve to the respective differential pressure transducer.

4. The non-nulling gas velocity measurement apparatus of claim 1, further comprising a reference gas line in communication with each gas valve and that communicates the reference gas to the gas valves.

5. The non-nulling gas velocity measurement apparatus of claim 1, further comprising a reference gas line in communication with each differential pressure transducer and that communicates the reference gas to the differential pressure transducers.

6. The non-nulling gas velocity measurement apparatus of claim 1, further comprising a reference pressure source that provides the reference gas to each gas valve.

7. The non-nulling gas velocity measurement apparatus of claim 1, further comprising a reference pressure source that provides the reference gas to each differential pressure transducer.

8. The non-nulling gas velocity measurement apparatus of claim 1, further comprising an analyzer in communication with each differential pressure transducer and that:
    receives each differential pressure signal from each differential pressure transducer; and
    produces a gas velocity parameters from the differential pressure signal.

9. The non-nulling gas velocity measurement apparatus of claim 8, further comprising a controller in communication with each gas valve and that:
 produces a plurality of valve control signals; and
 communicates the valve control signals, such that each gas valve receives one of the valve control signals from the controller and produces valve-selected gas based on the valve control signal.

10. The non-nulling gas velocity measurement apparatus of claim 9, wherein the controller further produces a control signal; and communicates the control signal to the analyzer, such that the control signal indicates whether each gas valve produces valve-selected gas from the stagnant gas or the reference gas.

11. The non-nulling gas velocity measurement apparatus of claim 1, wherein the gas source is an emission stack.

12. The non-nulling gas velocity measurement apparatus of claim 1, wherein the aerodynamic flow head comprises a hemispherical surface over which gas flow flows to be received by the entrant aperture that are arranged in the hemispherical surface.

13. The non-nulling gas velocity measurement apparatus of claim 1, wherein the aerodynamic flow head comprises a conical surface over which gas flow flows to be received by the entrant aperture that are arranged in the conical surface.

14. The non-nulling gas velocity measurement apparatus of claim 1, wherein the differential pressure signal from the plurality of differential pressure transducers provide a determination of gas velocity parameters that comprise turbulence intensity, velocity vector, static pressure, or density of gas flow.

15. The non-nulling gas velocity measurement apparatus of claim 1, wherein the gas flow comprises a Mach number from 0.01 to 0.3 at a velocity that is from 5 m/s to 100 m/s.

16. A process for performing non-nulling measurement of gas velocity parameters, the process comprising:
 receiving, by an analyzer, a zeroth differential pressure signal, first differential pressure signal, a second differential pressure signal, and third differential pressure signal;
 producing a zeroth calibrated pressure CP0 from the zeroth differential pressure signal, a first calibrated pressure CP1 from the first differential pressure signal, a second calibrated pressure CP2 from the second differential pressure signal, and a third calibrated pressure CP3 from the third differential pressure signal;
 removing a dependence of a reference gas pressure P0 of a reference gas from the zeroth calibrated pressure CP0, the first calibrated pressure CP1, the second calibrated pressure CP2, and the third calibrated pressure CP3 to produce, respectively, a first adjusted pressure AP1, a second adjusted pressure AP2, and a third adjusted pressure AP3;
 combining the first adjusted pressure AP1, the second adjusted pressure AP2, and the third adjusted pressure AP3 to obtain a pseudo-dynamic pressure scalar;
 individually normalizing the first adjusted pressure AP1, the second adjusted pressure AP2, and the third adjusted pressure AP3 with the pseudo-dynamic pressure scalar to produce, respectively, a first reduced pressure RP1, a second reduced pressure RP2, and a third reduced pressure RP3;
 determining a real dynamic pressure from the first reduced pressure RP1, the second reduced pressure RP2, and the third reduced pressure RP3;
 determining a yaw angle or a pitch angle of the gas flow from the first reduced pressure RP1, the second reduced pressure RP2, and the third reduced pressure RP3; and
 determining velocity of the gas flow from the real dynamic pressure to perform non-nulling measurement of gas velocity parameters.

17. The process for performing non-nulling measurement of gas velocity parameters of claim 16, further comprising:
 disposing a non-nulling pitot probe in an emission stack such that a central entrant aperture of the non-nulling pitot probe is aligned with a stack axis of the emission stack, the non-nulling pitot probe comprising:
  an aerodynamic flow head comprising a plurality of entrant apertures that comprises the central entrant aperture and a plurality of peripheral entrant apertures arranged radially from the central entrant aperture, the peripheral entrant aperture comprising a first peripheral entrant aperture, a second peripheral entrant aperture, and a third peripheral entrant aperture;
  an entrant body tube disposed on the aerodynamic flow head;
  an extensor body tube disposed on the entrant body tube such that the entrant body tube is interposed between the aerodynamic flow head and the extensor body tube, such that extensor body tube is arranged at an oblique angle to the entrant body tube; and
  a plurality of pressure channels disposed in the aerodynamic flow head, the entrant body tube, and the extensor body tube, such that each entrant aperture is separately and independently in fluid communication with one of the pressure channels, and each pressure channel independently receives and communicates the gas flow as stagnant gas from the entrant aperture of which the pressure channel is in communication;
 receiving, by the entrant apertures, the gas flow;
 producing, by the central entrant aperture, a zeroth stagnant gas from the gas flow;
 producing, by the first peripheral entrant aperture, a first stagnant gas from the gas flow;
 producing, by the second peripheral entrant aperture, a second stagnant gas from the gas flow;
 producing, by the third peripheral entrant aperture, a third stagnant gas from the gas flow; and
 obtaining the zeroth differential pressure signal, the first differential pressure signal, the second differential pressure signal, and the third differential pressure signal respectively from the zeroth stagnant gas, the first stagnant gas, the second stagnant gas, and the third stagnant gas.

18. The process for performing non-nulling measurement of gas velocity parameters of claim 16, further comprising:
 disposing a non-nulling pitot probe in an emission stack such that a central entrant aperture of the non-nulling pitot probe is not aligned with a stack axis of the emission stack, the non-nulling pitot probe comprising:
  an aerodynamic flow head comprising a plurality of entrant apertures that comprises the central entrant aperture and a plurality of peripheral entrant apertures arranged radially from the central entrant aperture, the peripheral entrant aperture comprising a first peripheral entrant aperture, a second peripheral entrant aperture, and a third peripheral entrant aperture;

an entrant body tube disposed on the aerodynamic flow head;

an extensor body tube disposed on the entrant body tube such that the entrant body tube is interposed between the aerodynamic flow head and the extensor body tube, such that extensor body tube is arranged at an oblique angle to the entrant body tube; and a plurality of pressure channels disposed in the aerodynamic flow head, the entrant body tube, and the extensor body tube, such that each entrant aperture is separately and independently in fluid communication with one of the pressure channels, and each pressure channel independently receives and communicates the gas flow as stagnant gas from the entrant aperture of which the pressure channel is in communication;

receiving, by the entrant apertures, the gas flow;

producing, by the central entrant aperture, a zeroth stagnant gas from the gas flow;

producing, by the first peripheral entrant aperture, a first stagnant gas from the gas flow;

producing, by the second peripheral entrant aperture, a second stagnant gas from the gas flow; and producing, by the third peripheral entrant aperture, a third stagnant gas from the gas flow; and obtaining the zeroth differential pressure signal, the first differential pressure signal, the second differential pressure signal, and the third differential pressure signal respectively from the zeroth stagnant gas, the first stagnant gas, the second stagnant gas, and the third stagnant gas.

19. The process for performing non-nulling measurement of gas velocity parameters of claim 18, further comprising determining a non-axial orientation factor for a non-axial angle with respect to the stack axis at which non-nulling pitot probe is disposed in the emission stack.

20. The process for performing non-nulling measurement of gas velocity parameters of claim 18, further comprising correcting the real dynamic pressure with the non-axial orientation factor prior to determining the velocity of the gas flow.

21. A non-nulling pitot probe comprising:

an aerodynamic flow head comprising a plurality of entrant apertures that comprises a central entrant aperture and a plurality of peripheral entrant aperture arranged radially from the central entrant aperture, such that the entrant apertures receive a gas flow from a gas source;

an entrant body tube disposed on the aerodynamic flow head;

an extensor body tube disposed on the entrant body tube such that the entrant body tube is interposed between the aerodynamic flow head and the extensor body tube, such that extensor body tube is arranged at an oblique angle to the entrant body tube; and a plurality of pressure channels disposed in the aerodynamic flow head, the entrant body tube, and the extensor body tube, such that each entrant aperture is separately and independently in fluid communication with one of the pressure channels, and each pressure channel independently receives and communicates the gas flow as stagnant gas from the entrant aperture of which the pressure channel is in communication.

22. The non-nulling pitot probe of claim 21, wherein the aerodynamic flow head comprises a hemispherical surface over which gas flow flows to be received by the entrant aperture that are arranged in the hemispherical surface.

23. The non-nulling pitot probe of claim 21, wherein the aerodynamic flow head comprises a conical surface over which gas flow flows to be received by the entrant aperture that are arranged in the conical surface.

24. The non-nulling pitot probe of claim 21, wherein a diameter of the entrant apertures is from 1 millimeter to 50 centimeters.

* * * * *